(12) United States Patent
Peter et al.

(10) Patent No.: US 11,660,586 B2
(45) Date of Patent: May 30, 2023

(54) IN-SITU COPPER ION-EXCHANGE ON PRE-EXCHANGED COPPER ZEOLITIC MATERIAL

(71) Applicant: BASF Corporation, Florham Park, NJ (US)

(72) Inventors: Matthias Peter, Hannover (DE); Karifala Dumbuya, Hannover (DE); Miriam Schubert, Nienburg/Weser (DE); Ahmad Moini, Iselin, NJ (US); Yu Dai, Shanghai (CN); Stefan Maurer, Shanghai (CN); Haiyang Zhu, Iselin, NJ (US); Yi Liu, Huntsville, AL (US); Wen-Mei Xue, Iselin, NJ (US); Ming-Ming Wei, Shanghai (CN); Maria Heenemann, Hannover (DE)

(73) Assignee: BASF Corporation, Florham Park, NJ (US)

( * ) Notice: Subject to any disclaimer, the term of this patent is extended or adjusted under 35 U.S.C. 154(b) by 59 days.

(21) Appl. No.: 17/309,015

(22) PCT Filed: Oct. 30, 2019

(86) PCT No.: PCT/CN2019/114386
§ 371 (c)(1),
(2) Date: Apr. 14, 2021

(87) PCT Pub. No.: WO2020/088531
PCT Pub. Date: May 7, 2020

(65) Prior Publication Data
US 2022/0032277 A1    Feb. 3, 2022

(30) Foreign Application Priority Data
Oct. 30, 2018 (WO) ................ PCT/CN2018/112584

(51) Int. Cl.
| | |
|---|---|
| *B01J 29/76* | (2006.01) |
| *B01D 53/94* | (2006.01) |
| *B01J 37/02* | (2006.01) |
| *B01J 37/04* | (2006.01) |
| *B01J 37/08* | (2006.01) |

(52) U.S. Cl.
CPC ........ *B01J 29/763* (2013.01); *B01D 53/9418* (2013.01); *B01J 37/0215* (2013.01); *B01J 37/04* (2013.01); *B01J 37/082* (2013.01); *B01D 2255/2065* (2013.01); *B01D 2255/2092* (2013.01); *B01D 2255/20707* (2013.01); *B01D 2255/20715* (2013.01); *B01D 2255/20761* (2013.01); *B01D 2255/30* (2013.01); *B01D 2255/50* (2013.01)

(58) Field of Classification Search
None
See application file for complete search history.

(56) References Cited

U.S. PATENT DOCUMENTS

| | | | |
|---|---|---|---|
| 9,289,756 B2 | 3/2016 | Bull et al. | |
| 2012/0014865 A1 | 1/2012 | Bull et al. | |
| 2013/0195731 A1* | 8/2013 | Bull | B01J 29/76 |
| | | | 422/171 |
| 2015/0151286 A1 | 6/2015 | Rivas-Cardona et al. | |
| 2015/0151288 A1 | 6/2015 | Rivas-Cardona et al. | |
| 2017/0282167 A1 | 10/2017 | Yamazaki et al. | |

FOREIGN PATENT DOCUMENTS

| | | |
|---|---|---|
| CN | 105289708 A | 2/2016 |
| CN | 105889291 A | 8/2016 |
| CN | 106163659 A | 11/2016 |
| CN | 107824217 A | 3/2018 |
| GB | 2522752 A | 8/2015 |
| GB | 2522753 A | 8/2015 |
| JP | 2017185461 A | 10/2017 |
| WO | 2017134581 A | 8/2017 |
| WO | WO 2017/153894 A1 | 9/2017 |
| WO | 2018/1017187 A1 | 6/2018 |

OTHER PUBLICATIONS

International Search Report dated Feb. 6, 2020 for International Application No. PCT/CN2019/114386.

* cited by examiner

*Primary Examiner* — Sheng H Davis
(74) *Attorney, Agent, or Firm* — DLA Piper LLP (US)

(57) ABSTRACT

A process for preparing a catalyst comprising a zeolitic material comprising copper, the process comprising (i) preparing an aqueous mixture comprising water, a zeolitic material comprising copper, a source of copper other than the zeolitic material comprising copper, and a non-zeolitic oxidic material selected from the group consisting of alumina, silica, titania, zirconia, ceria, a mixed oxide comprising one or more of Al, Si, Ti, Zr, and Ce and a mixture of two or more thereof; (ii) disposing the mixture obtained in (i) on the surface of the internal walls of a substrate comprising an inlet end, an outlet end, a substrate axial length extending from the inlet end to the outlet end and a plurality of passages defined by internal walls of the substrate extending therethrough; and optionally drying the substrate comprising the mixture disposed thereon; (iii) calcining the substrate obtained in (ii).

20 Claims, 10 Drawing Sheets

IN-SITU COPPER ION-EXCHANGE ON PRE-EXCHANGED COPPER ZEOLITIC MATERIAL

This application is a national stage filing under 35 U.S.C. § 371 of International Application No. PCT/CN2019/114386, filed on Oct. 30, 2019, which claims priority to International Patent Application No. PCT/CN2018/112584, filed on Oct. 30, 2018; the content of each application is incorporated herein by reference in its entirety.

The present invention relates to a process for preparing a catalyst comprising a zeolitic material comprising copper, a catalyst comprising a zeolitic material comprising copper obtained or obtainable by said process, an exhaust gas treatment system comprising said catalyst, an aqueous mixture and a process for preparing it and a zeolitic material having a framework type CHA and comprising copper.

Liquid-phase ion-exchange processes are know for the ion-exchange of zeolitic materials with copper and/or iron, such processes are disclosed in U.S. Pat. No. 8,293,199 B2. Further, WO 2018/101718 A1 discloses a different process for preparing a catalyst comprising a CHA zeolitic material comprising copper ions. This process comprises mixing H-CHA, a copper precursor, Zr-acetate and deionized water. The slurry is further milled and is coated on a substrate, dried and calcined. The obtained catalyst comprises Cu-exchanged CHA. This in-situ ion-exchange process permitted to enhance the high temperature performance in a catalyst comprising the ion-exchanged catalyst compared to a catalyst comprising copper which has been ion-exchanged with a liquid phase ion-exchange process as in U.S. Pat. No. 8,293,199 B2. However, there was still a need to provide a further improved process for preparing a catalyst comprising a zeolitic material comprising copper and a catalyst comprising said zeolitic material exhibiting improved catalytic activities, such as NOx conversion.

Therefore, it was an object of the present invention to provide an improved process for preparing a catalyst comprising a zeolitic material comprising copper which exhibits high catalytic activities, such as NOx conversion.

Surprisingly, it was found that the process of the present invention permits to obtain a catalyst comprising a zeolitic material comprising copper achieving high catalytic activities, such as improved NOx conversion at both low and high temperatures.

I. Process for Preparing a Catalyst Comprising a Zeolitic Material Comprising Copper Therefore, the present invention relates to a process for preparing a catalyst comprising a zeolitic material comprising copper, the process comprising (i) preparing an aqueous mixture comprising water, a zeolitic material comprising copper, a source of copper other than the zeolitic material comprising copper, and a non-zeolitic oxidic material selected from the group consisting of alumina, silica, titania, zirconia, ceria, a mixed oxide comprising one or more of Al, Si, Ti, Zr, and Ce and a mixture of two or more thereof;

(ii) disposing the mixture obtained in (i) on the surface of the internal walls of a substrate comprising an inlet end, an outlet end, a substrate axial length extending from the inlet end to the outlet end and a plurality of passages defined by internal walls of the substrate extending therethrough; and optionally drying the substrate comprising the mixture disposed thereon;

(iii) calcining the substrate obtained in (ii).

As to the aqueous mixture prepared in (i), it is preferred that the zeolitic material comprising copper contained therein has a framework type selected from the group consisting of ABW, ACO, AEI, AEL, AEN, AET, AFG, AFI, AFN, AFO, AFR, AFS, AFT, AFV, AFX, AFY, AHT, ANA, APC, APD, AST, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA, -CHI, -CLO, CON, CSV, CZP, DAC, DDR, DFO, DFT, DOH, DON, EAB, EDI, EEI, EMT, EON, EPI, ERI, ESV, ETR, EUO, *-EWT, EZT, FAR, FAU, FER, FRA, GIS, GIU, GME, GON, GOO, HEU, IFO, IFR, -IFU, IFW, IFY, IHW, IMF, IRN, IRR, -IRY, ISV, ITE, ITG, ITH, *-ITN, ITR, ITT, -ITV, ITW, IWR, IWS, IWV, IWW, JBW, JNT, JOZ, JRY, JSN, JSR, JST, JSW, KFI, LAU, LEV, LIO, -LIT, LOS, LOV, LTA, LTF, LTJ, LTL, LTN, MAR, MAZ, MEI, MEL, MEP, MER, MFI, MFS, MON, MOR, MOZ, *MRE, MSE, MSO, MTF, MTN, MTT, MTW, MVY, MWF, MWW, NAB, NAT, NES, NON, NPO, NPT, NSI, OBW, OFF, OKO, OSI, OSO, OWE, -PAR, PAU, PCR, PHI, PON, POS, PSI, PUN, RHO, -RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, *SFV, SFW, SGT, SIV, SOD, SOF, SOS, SSF, *-SSO, SSY, STF, STI, *STO, STT, STW, -SVR, SVV, SZR, TER, THO, TOL, TON, TSC, TUN, UEI, UFI, UOS, UOV, UOZ, USI, UTL, UWY, VET, VFI, VNI, VSV, WEI, -WEN, YUG, ZON, a mixture of two or more thereof, and a mixed type of two or more thereof, more preferably selected from the group consisting of CHA, AEI, RTH, LEV, DDR, KFI, ERI, AFX, a mixture of two or more thereof and a mixed type of two or more thereof, more preferably selected from the group consisting of CHA, AEI, RTH, AFX, a mixture of two or more thereof and a mixed type of two or more thereof, more preferably selected from the group consisting of CHA and AEI. It is more preferred that the zeolitic material comprising copper contained in the aqueous mixture prepared in (i) has a framework type CHA.

It is preferred that from 95 to 100 weight-%, more preferably from 98 to 100 weight-%, more preferably from 99 to 100 weight-% of the framework structure of the zeolitic material consist of Si, Al, and O, wherein in the framework structure, the molar ratio of Si to Al, calculated as molar $SiO_2:Al_2O_3$, is more preferably in the range of from 2:1 to 50:1, more preferably in the range of from 5:1 to 45:1, more preferably in the range of from 10:1 to 35:1, more preferably in the range of from 16:1 to 28:1. It is more preferred that the zeolitic material comprising copper contained in the aqueous mixture prepared in (i) has a framework type CHA with a molar ratio of Si to Al, calculated as molar $SiO_2:Al_2O_3$, in the range of from 2:1 to 50:1, more preferably in the range of from 5:1 to 45:1, more preferably in the range of from 10:1 to 35:1, more preferably in the range of from 16:1 to 28:1, more preferably in the range of from 16:1 to 19:1 or more preferably in the range of from 23:1 to 27:1.

It is preferred that the zeolitic material contained in the aqueous mixture prepared in (i), more preferably which has a framework type CHA, has a mean crystallite size of at least 0.1 micrometer, more preferably in the range of from 0.1 to 3.0 micrometers, more preferably in the range of from 0.3 to 1.5 micrometer, more preferably in the range of from 0.4 to 1.0 micrometer determined via scanning electron microscopy.

It is preferred that the zeolitic material contained in the aqueous mixture prepared in (i) has a BET specific surface area in the range of from 400 to 650 $m^2/g$, preferably in the range of from 550 to 620 $m^2/g$, determined as described in Reference Example 1 herein.

As to the amount of copper comprised in the zeolitic material contained in the aqueous mixture prepared in (i), it is preferred that said amount of copper, calculated as CuO, is in the range of from 0.05 to 3.5 weight-%, more preferably in the range of from 0.1 to 3 weight-%, more preferably in the range of from 0.2 to 2 weight-%, more preferably in the range of from 0.5 to 1.75 weight-%, more preferably in the range of from 1 to 1.75 weight-%, or more preferably in the range of from 1.9 to 2.5 weight-%, based on the weight of the zeolitic material comprised in the aqueous mixture prepared in (i).

As to the source of copper other than the zeolitic material comprising copper contained in the aqueous mixture prepared in (i), it is preferred that said source of copper is selected from the group consisting of copper acetate, copper nitrate, copper sulfate, copper formate, copper oxide, and a mixture of two or more thereof, more preferably selected from the group consisting of copper acetate, copper oxide, and a mixture of thereof, more preferably copper oxide, more preferably CuO.

It is preferred that the aqueous mixture prepared in (i) comprises the source of copper other than the zeolitic material comprising copper, calculated as CuO, at an amount in the range of from 0.1 to 14 weight-%, preferably in the range of from 0.5 to 12 weight-%, more preferably in the range of from 1 to 10 weight-%, more preferably in the range of from 1.5 to 5.0 weight-%, more preferably in the range of from 1.5 to 4.5 weight-%, based on the weight of the zeolitic material comprised in the aqueous mixture prepared in (i). It is more preferred that the aqueous mixture prepared in (i) comprises the source of copper other than the zeolitic material comprising copper, calculated as CuO, at an amount in the range of from 2.0 to 4.0 weight-%, based on the weight of the zeolitic material comprised in the aqueous mixture prepared in (i).

Therefore, the present invention preferably relates to a process for preparing a catalyst comprising a zeolitic material comprising copper, the process comprising
(i) preparing an aqueous mixture comprising water, a zeolitic material comprising copper, a source of copper other than the zeolitic material comprising copper, and a non-zeolitic oxidic material selected from the group consisting of alumina, silica, titania, zirconia, ceria, a mixed oxide comprising one or more of Al, Si, Ti, Zr, and Ce and a mixture of two or more thereof, wherein the zeolitic material has a framework type selected from the group consisting of CHA, AEI, RTH, LEV, DDR, KFI, ERI, AFX, a mixture of two or more thereof and a mixed type of two or more thereof, more preferably selected from the group consisting of CHA, AEI, RTH, AFX, a mixture of two or more thereof and a mixed type of two or more thereof, more preferably selected from the group consisting of CHA and AEI, more preferably having a framework type CHA and wherein the source of copper other than the zeolitic material comprising copper contained in the aqueous mixture prepared in (i) is selected from the group consisting of copper acetate, copper oxide, a mixture of thereof, more preferably copper oxide, more preferably CuO;
(ii) disposing the mixture obtained in (i) on the surface of the internal walls of a substrate comprising an inlet end, an outlet end, a substrate axial length extending from the inlet end to the outlet end and a plurality of passages defined by internal walls of the substrate extending therethrough; and optionally drying the substrate comprising the mixture disposed thereon;
(iii) calcining the substrate obtained in (ii).

In the context of the present invention, it is preferred that the non-zeolitic oxidic material contained in the aqueous mixture prepared in (i) is selected from the group consisting of alumina, silica, and titania, a mixed oxide comprising one or more of Al, Si, and Ti and a mixture of two or more thereof, more preferably selected from the group consisting of alumina, silica, a mixed oxide comprising one or more of Al and Si, and a mixture of two or more thereof, more preferably a mixture of alumina and silica. It is more preferred that from 80 to 99 weight-%, more preferably from 85 to 98 weight-%, more preferably from 90 to 98 weight-%, of the mixture of alumina and silica consist of alumina and that more preferably from 1 to 20 weight-%, more preferably from 2 to 15 weight-%, more preferably from 2 to 10 weight-% of the mixture of alumina and silica consist of silica.

It is preferred that the aqueous mixture prepared in (i) comprises the non-zeolitic oxidic material at an amount in the range of from 2 to 20 weight-%, more preferably in the range of from 5 to 15 weight-%, more preferably in the range of from 7 to 13 weight-%, based on the weight of the zeolitic material comprised in the aqueous mixture prepared in (i).

It is preferred that the non-zeolitic oxidic material comprised in the aqueous mixture prepared in (i) have a Dv90 in the range of from 0.5 to 10 micrometers, preferably in the range of from 2 to 8 micrometers, more preferably in the range of from 4 to 6 micrometers, the Dv90 being determined as described in Reference Example 3 herein.

Alternatively, it is preferred that the non-zeolitic oxidic material comprised in the aqueous mixture prepared in (i) have a Dv90 in the range of from 12 to 30 micrometers, preferably in the range of from 13 to 25 micrometers, more preferably in the range of from 15 to 20 micrometers, more preferably in the range of from 17 to 19 micrometers, the Dv90 being determined as described in Reference Example 3 herein.

Preferably, in the aqueous mixture prepared in (i), from 10 to 90 weight-%, more preferably from 40 to 85 weight-%, more preferably from 55 to 80 weight-%, of the aqueous mixture consist of water.

As to the aqueous mixture prepared in (i), it is preferred that the aqueous mixture further comprises a precursor of an oxidic component, wherein the precursor is more preferably one or more of an aluminum salt, a silicon salt, a zirconium salt, and a titanium salt, more preferably one or more of a zirconium salt, and an aluminum salt, more preferably a zirconium salt, more preferably zirconium acetate. It is more preferred that, in the aqueous mixture prepared in (i), the amount of precursor calculated as oxide, more preferably as alumina, silica, zirconia or titania, more preferably of the zirconium salt calculated as $ZrO_2$, is in the range of from 1 to 10 weight-%, more preferably in the range of from 2 to 8 weight-%, more preferably in the range 3 to 7 weight-%, based on the weight of the zeolitic material comprised in the aqueous mixture prepared in (i).

It is preferred that the aqueous mixture prepared in (i) further comprises one or more additional non-zeolitic oxidic materials, wherein the one or more non-zeolitic oxidic materials are selected from the group consisting of alumina, silica, titania, zirconia, ceria, a mixed oxide comprising one or more of Al, Si, Ti, Zr, and Ce and a mixture of two or more thereof.

As to the aqueous mixture prepared in (i), it is preferred that the aqueous mixture further comprises one or more acids, more preferably two acids, more preferably two organic acids, more preferably tartaric acid and acetic acid, at an amount more preferably in the range of from 0.1 to 2 weight-%, more preferably in the range of from 0.2 to 1.5 weight-%, more preferably in the range of from 0.4 to 1.2 weight-%, based on the weight of the zeolitic material comprised in the aqueous mixture prepared in (i).

It is preferred that the aqueous mixture prepared in (i) comprises water, the zeolitic material comprising copper, the source of copper other than the zeolitic material comprising copper, the non-zeolitic oxidic material selected from the group consisting of alumina, silica, titania, zirconia, ceria, a mixed oxide comprising one or more of Al, Si, Ti, Zr, and Ce and a mixture of two or more thereof, and one or more acids as defined in the foregoing.

Alternatively, it is preferred that the aqueous mixture prepared in (i) comprises water, the zeolitic material comprising copper, the source of copper other than the zeolitic material comprising copper, the non-zeolitic oxidic material selected from the group consisting of alumina, silica, titania, zirconia, ceria, a mixed oxide comprising one or more of Al, Si, Ti, Zr, and Ce and a mixture of two or more thereof, a precursor of an oxidic component as defined in the foregoing, and more preferably one or more acids as defined in the foregoing.

It is preferred that the aqueous mixture prepared in (i) further comprises particles of a carbon-containing additive, wherein the carbon-containing additive contained in the aqueous mixture prepared in (i) more preferably is one or more of graphite, synthetic graphite, carbon black, graphene, diamond, fullerene, carbon nanotubes and amorphous carbon, more preferably is one or more of graphite, synthetic graphite, graphene, fullerene, carbon nanotubes and amorphous carbon, more preferably one or more of graphite, synthetic graphite and graphene, more preferably one or more of graphite and synthetic graphite. The carbon-containing additive has a removal temperature in the range of from 120 to 900° C., preferably in the range of from 400 to 850° C., more preferably in the range of from 500 to 800° C.

Furthermore, in the context of the present invention, the term "removal temperature" is to be understood as the temperature at which at least 95 weight-% of the carbon-containing additive is removed/burnt off, preferably the temperature at which from 97 to 100 weight-% of the carbon-containing additive, more preferably from 98 to 100 weight-% of the carbon-containing additive is removed/burnt off. Thus, according to the present invention, this means that at most 5 weight-%, preferably from 0 to 3 weight-%, more preferably from 0 to 2 weight-%, of the carbon-containing additive, used in the process of the present invention, is present in the final catalyst.

It is preferred that the particles of the carbon-containing additive comprised in the aqueous mixture prepared in (i) have a Dv50 in the range of from 0.5 to 30 micrometers, more preferably in the range of from 2 to 15 micrometers, more preferably in the range of from 3 to 12 micrometers, more preferably in the range of from 4 to 10 micrometers, more preferably in the range of from 5 to 8 micrometers, the Dv50 being determined according to Reference Example 3 herein.

Alternatively, the particles of the carbon-containing additive comprised in the aqueous mixture prepared in (i) preferably have a Dv50 in the range of from 0.5 to 30 micrometers, more preferably in the range of from 1 to 22 micrometers, more preferably in the range of from 2 to 20 micrometers, more preferably in the range of from 5 to 19 micrometers, the Dv50 being determined according to Reference Example 3 herein.

It is more preferred that the particles of the carbon-containing additive comprised in the aqueous mixture prepared in (i) have a Dv90 in the range of from 4 to 60 micrometers, more preferably in the range of from 6 to 30 micrometers, more preferably in the range of from 8 to 20 micrometers, more preferably in the range of from 9 to 14 micrometers, more preferably in the range of from 10 to 13 micrometers, the Dv90 being determined according to Reference Example 3 herein.

Alternatively, it is preferred that the particles of the carbon-containing additive comprised in the aqueous mixture prepared in (i) have a Dv90 in the range of from 4 to 80 micrometers, more preferably in the range of from 4.5 to 60 micrometers, more preferably in the range of from 5 to 45 micrometers, the Dv90 being determined according to Reference Example 3 herein.

It is preferred that the particles of the carbon-containing additive comprised in the aqueous mixture prepared in (i) are not dissolved in water, more preferably at a temperature in the range of from 10 to 40° C., more preferably in the range of from 15 to 35° C., more preferably in the range of from 17 to 25° C.

It is preferred that the aqueous mixture prepared in (i) comprises the particles of the carbon-containing additive in an amount in the range of from 2 to 40 weight-%, more preferably in the range of from 4 to 30 weight-%, more preferably in the range of from 5 to 25 weight-%, more preferably in the range of from 5.5 to 15 weight-%, based on the weight of the zeolitic material and of the non-zeolitic oxidic material in the aqueous mixture prepared in (i).

Alternatively, it is preferred that the carbon-containing additive comprised in the aqueous mixture prepared in (i) is one or more of polyacrylate, microcrystalline cellulose, corn starch, styrene, poly(methyl methacrylate-co-ethylene glycol), polymethylurea, and polymethyl methacrylate, more preferably one or more of polymethylurea and polymethyl methacrylate, more preferably polymethylurea, or more preferably polymethyl methacrylate. It is more preferred that the carbon-containing additive has a removal temperature in the range of from 150 to 550° C., more preferably in the range of from 180 to 500° C.

In the context of the present invention, preferably from 98 to 100 weight-%, more preferably from 99 to 100 weight-%, more preferably from 99.5 to 100 weight-%, more preferably from 99.9 to 100 weight-%, of the aqueous mixture prepared in (i) consist of water, the zeolitic material comprising copper, the source of copper other than the zeolitic material comprising copper, the non-zeolitic oxidic material selected from the group consisting of alumina, silica, titania, zirconia, ceria, a mixed oxide comprising one or more of Al, Si, Ti, Zr, and Ce and a mixture of two or more thereof, and more preferably one or more acids as defined in the foregoing.

Alternatively, it is preferred that from 98 to 100 weight-%, more preferably from 99 to 100 weight-%, more preferably from 99.5 to 100 weight-%, more preferably from 99.9 to 100 weight %, of the aqueous mixture prepared in (i) consist of water, the zeolitic material comprising copper, the source of copper other than the zeolitic material comprising copper, the non-zeolitic oxidic material selected from the group consisting of alumina, silica, titania, zirconia, ceria, a mixed oxide comprising one or more of Al, Si, Ti, Zr, and Ce and a mixture of two or more thereof, a precursor of an oxidic component as defined in the foregoing, and more preferably one or more acids as defined in the foregoing.

As a further alternative, it is preferred that from 98 to 100 weight-%, more preferably from 99 to 100 weight-%, more preferably from 99.5 to 100 weight-%, more preferably from 99.9 to 100 weight-%, of the aqueous mixture prepared in (i) consist of water, the zeolitic material comprising copper, the source of copper other than the zeolitic material comprising copper, the nonzeolitic oxidic material selected from the group consisting of alumina, silica, titania, zirconia, ceria, a mixed oxide comprising one or more of Al, Si, Ti, Zr, and Ce and a mixture of two or more thereof, a precursor of an oxidic component as defined in the foregoing, particles of a carbon-containing additive, and more preferably one or more acids as de-fined in the foregoing.

As to (i), it is preferred that it comprises
(i.1) preparing a first mixture comprising water and the source of copper other than the zeolitic material comprising copper;
(i.2) more preferably milling the first mixture, more preferably until the particles of the first mixture have a Dv90 in the range of from 0.5 to 20 micrometers, the Dv90 being determined as described in Reference Example 3;
(i.3) optionally adding a precursor of an oxidic component as defined in the foregoing in the first mixture obtained according to (i.1), more preferably (i.2);
(i.4) preparing a second mixture comprising water and the zeolitic material comprising copper;
(i.5) admixing the second mixture obtained in (i.4) with the first mixture obtained in (i.1), more preferably in (i.2) or in (i.3), obtaining a third mixture;
(i.6) preparing a fourth mixture comprising water, the non-zeolitic oxidic material selected from the group consisting of alumina, silica, titania, zirconia, ceria, a mixed oxide comprising one or more of Al, Si, Ti, Zr, and Ce and a mixture of two or more thereof, and more preferably comprising an acid, more preferably an organic acid, more preferably tartaric acid;
(i.7) admixing the fourth mixture obtained in (i.6) with the third mixture obtained in (i.5), more preferably adding an acid, more preferably an organic acid, more preferably acetic acid, and optionally adding the particles of a carbon-containing additive as defined in the foregoing prior to the acid;
wherein (i) optionally consists of (i.1) to (i.7).

Therefore, the present invention preferably relates to a process for preparing a catalyst comprising a zeolitic material comprising copper, the process comprising
(i) preparing an aqueous mixture comprising water, a zeolitic material comprising copper, a source of copper other than the zeolitic material comprising copper, and a non-zeolitic oxidic material selected from the group consisting of alumina, silica, titania, zirconia, ceria, a mixed oxide comprising one or more of Al, Si, Ti, Zr, and Ce and a mixture of two or more thereof, wherein the zeolitic material has a framework type selected from the group consisting of CHA, AEI, RTH, LEV, DDR, KFI, ERI, AFX, a mixture of two or more thereof and a mixed type of two or more thereof, more preferably selected from the group consisting of CHA, AEI, RTH, AFX, a mixture of two or more thereof and a mixed type of two or more thereof, more preferably selected from the group consisting of CHA and AEI, more preferably having a framework type CHA and wherein the source of copper other than the zeolitic material comprising copper contained in the aqueous mixture prepared in (i) is selected from the group consisting of copper acetate, copper oxide, a mixture of thereof, more preferably copper oxide, more preferably CuO, wherein (i) comprises
(i.1) preparing a first mixture comprising water and the source of copper other than the zeolitic material comprising copper;
(i.2) more preferably milling the first mixture, more preferably until the particles of the first mixture have a Dv90 in the range of from 0.5 to 20 micrometers, the Dv90 being determined as described in Reference Example 3;
(i.3) optionally adding a precursor of an oxidic component as defined in the foregoing in the first mixture obtained according to (i.1), more preferably (i.2);
(i.4) preparing a second mixture comprising water and the zeolitic material comprising copper;
(i.5) admixing the second mixture obtained in (i.4) with the first mixture obtained in (i.1), more preferably in (i.2) or in (i.3), obtaining a third mixture;
(i.6) preparing a fourth mixture comprising water, the non-zeolitic oxidic material selected from the group consisting of alumina, silica, titania, zirconia, ceria, a mixed oxide comprising one or more of Al, Si, Ti, Zr, and Ce and a mixture of two or more thereof, and more preferably comprising an acid, more preferably an organic acid, more preferably tartaric acid;
(i.7) admixing the fourth mixture obtained in (i.6) with the third mixture obtained in (i.5), more preferably adding an acid, more preferably an organic acid, more preferably acetic acid, and optionally adding the particles of a carbon-containing additive as defined above prior to the acid;
(ii) disposing the mixture obtained in (i.7) on the surface of the internal walls of a substrate comprising an inlet end, an outlet end, a substrate axial length extending from the inlet end to the outlet end and a plurality of passages defined by internal walls of the substrate extending therethrough; and optionally drying the substrate comprising the mixture disposed thereon;
(iii) calcining the substrate obtained in (ii).

In the context of the present invention, preferably from 90 to 100 weight-%, more preferably from 93 to 99 weight-%, more preferably from 96 to 99 weight-%, of the source of copper other than the zeolitic material comprising copper are present in the mixture prepared in (i.1) and (i.2) in non-dissolved state.

As to milling in (i.2), it is preferred that it is performed until the particles of the first mixture have a Dv90 in the range of from 4 to 15 micrometers, more preferably in the range of from 6 to 12 micrometers, the Dv90 being determined as described in Reference Example 3.

It is preferred that the first mixture obtained in (i.1), more preferably in (i.2), has a solid content in the range of from 4 to 30 weight-%, more preferably in the range of from 4 to 15 weight-%, based on the weight of the first mixture.

It is preferred that the second mixture obtained in (i.4) has a solid content in the range of from 15 to 50 weight-%, more preferably in the range of from 20 to 45 weight-%, more preferably in the range of from 30 to 40 weight-%, based on the weight of the second mixture. It is more preferred that the first mixture obtained in (i.1), more preferably in (i.2), has a solid content in the range of from 4 to 30 weight-%, preferably in the range of from 4 to 15 weight-%, based on the weight of the first mixture and that the second mixture obtained in (i.4) has a solid content in the range of from 15 to 50 weight-%, more preferably in the range of from 20 to 45 weight-%, more preferably in the range of from 30 to 40 weight-%, based on the weight of the second mixture.

As to (i.5), it is preferred that it further comprises milling the third mixture, more preferably until the particles of the third mixture have a Dv90 in the range of from 0.5 to 20 micrometers, more preferably in the range of from 2 to 15 micrometers, more preferably in the range of from 2 to 10 micrometers, the Dv90 being determined as described in Reference Example 3.

It is preferred that the fourth mixture obtained in (i.6) has a solid content in the range of from 15 to 60 weight-%, more preferably in the range of from 25 to 45 weight-%, more preferably in the range of from 28 to 40 weight-%, based on the weight of the fourth mixture.

It is preferred that the aqueous mixture obtained in (i), more preferably in (i.7), has a solid content in the range of from 15 to 50 weight-%, more preferably in the range of from 20 to 45 weight-%, more preferably in the range of from 30 to 40 weight-%, based on the weight of the aqueous mixture.

It is preferred that disposing the mixture according to (ii) is performed by spraying the mixture onto the substrate or by immersing the substrate into the mixture, more preferably by immersing the substrate into the mixture.

It is preferred that the mixture according to (i) is disposed according to (ii) over x % of the substrate axial length from the inlet end to the outlet end of the substrate or from the outlet end to the inlet end of the substrate, wherein x is in the range of from 80 to 100, more preferably in the range of from 90 to 100, more preferably in the range of from 95 to 100, more preferably in the range of from 98 to 100.

It is preferred that the substrate in (ii) is a wall-flow filter substrate, more preferably one or more of a cordierite wall-flow filter substrate, a silicon carbide wall-flow filter substrate and an aluminum titanate wall-flow filter substrate, more preferably one or more of a silicon carbide wall-flow filter substrate and an aluminum titanate wall-flow filter substrate, more preferably a silicon carbide wall-flow filter substrate.

It is more preferred that the substrate in (ii) is a wall-flow filter having a plurality of channels in honeycomb arrangement. The number of channels per square inch (cpsi) more preferably is in the range of from 200 to 800, more preferably in the range of from 250 to 500, more preferably in the range of from 300 to 400, and the average wall thickness is in the range of from 6 to 15 mil, more preferably in the range of from 8 to 13 mil.

It is alternatively preferred that the substrate in (ii) is a flow-through substrate, more preferably one or more of a cordierite flow-through substrate, a silicon carbide flow-through substrate and an aluminum titanate flow-through substrate, more preferably one or more of a silicon carbide flow-through substrate and a cordierite flow-through substrate, more preferably a cordierite flow-through substrate.

Therefore, the present invention preferably relates to a process for preparing a catalyst comprising a zeolitic material comprising copper, the process comprising (i) preparing an aqueous mixture comprising water, a zeolitic material comprising copper, a source of copper other than the zeolitic material comprising copper, and a non-zeolitic oxidic material selected from the group consisting of alumina, silica, titania, zirconia, ceria, a mixed oxide comprising one or more of Al, Si, Ti, Zr, and Ce and a mixture of two or more thereof, wherein the zeolitic material has a framework type selected from the group consisting of CHA, AEI, RTH, LEV, DDR, KFI, ERI, AFX, a mixture of two or more thereof and a mixed type of two or more thereof, more preferably selected from the group consisting of CHA, AEI, RTH, AFX, a mixture of two or more thereof and a mixed type of two or more thereof, more preferably selected from the group consisting of CHA and AEI, more preferably having a framework type CHA and wherein the source of copper other than the zeolitic material comprising copper contained in the aqueous mixture prepared in (i) is selected from the group consisting of copper acetate, copper oxide, a mixture of thereof, more preferably copper oxide, more preferably CuO;

(ii) disposing the mixture obtained in (i) on the surface of the internal walls of a substrate comprising an inlet end, an outlet end, a substrate axial length extending from the inlet end to the outlet end and a plurality of passages defined by internal walls of the substrate extending therethrough; and optionally drying the substrate comprising the mixture disposed thereon, wherein the mixture according to (i) is disposed according to (ii) over x % of the substrate axial length from the inlet end to the outlet end of the substrate or from the outlet end to the inlet end of the substrate, wherein x is in the range of from 80 to 100, more preferably in the range of from 90 to 100, more preferably in the range of from 95 to 100, more preferably in the range of from 98 to 100;

(iii) calcining the substrate obtained in (ii);

wherein the substrate in (ii) is more preferably a wall-flow filter substrate, more preferably one or more of a cordierite wall-flow filter substrate, a silicon carbide wall-flow filter substrate and an aluminum titanate wall-flow filter substrate, more preferably one or more of a silicon carbide wall-flow filter substrate and an aluminum titanate wall-flow filter substrate, more preferably a silicon carbide wall-flow filter substrate.

In the context of the present invention, it is preferred that drying according to (ii) is performed in a gas atmosphere having a temperature in the range of from 60 to 300° C., more preferably in the range of from 90 to 150° C., the gas atmosphere more preferably comprising oxygen.

As to drying according to (ii), it is preferred that it is performed in a gas atmosphere for a duration in the range of from 10 minutes to 4 hours, more preferably in the range of from 20 minutes to 3 hours, more preferably from 50 minutes to 2.5 hours, the gas atmosphere more preferably comprising oxygen.

It is preferred that disposing according to (ii) comprises (ii.1) disposing a first portion of the mixture obtained in (i) on the surface of the internal walls of a substrate comprising an inlet end, an outlet end, a substrate axial length extending from the inlet end to the outlet end and a plurality of passages defined by internal walls of the substrate extending therethrough; and drying the substrate comprising the first portion of the mixture disposed thereon;

(ii.2) disposing a second portion of the mixture obtained in (i) on the substrate comprising the first portion of the mixture disposed thereon obtained in (ii.1), and optionally drying the substrate comprising the first and the second portion of the mixture disposed thereon.

It is preferred that prior to disposing a first portion of the mixture obtained in (i) on the surface of the internal walls of a substrate according to (ii.1), the mixture obtained in (i) is further diluted.

It is preferred that prior to disposing a second portion of the mixture obtained in (i) on the surface of the internal walls of a substrate according to (ii.2), the mixture obtained in (i) is further diluted.

It is preferred that the first portion of the mixture according to (i) is disposed according to (ii.1) over x1% of the substrate axial length from the inlet end to the outlet end of the substrate or from the outlet end to the inlet end of the substrate, wherein x1 is in the range of from 80 to 100, more preferably in the range of from 90 to 100, more preferably in the range of from 95 to 100, more preferably in the range of from 98 to 100. It is more preferred that the second portion of the mixture according to (i) is disposed according to (ii.2) over x2% of the substrate axial length from the inlet end to the outlet end of the substrate or from the outlet end to the inlet end of the substrate, wherein x2 is in the range of from 80 to 100, more preferably in the range of from 90 to 100, more preferably in the range of from 95 to 100, more preferably in the range of from 98 to 100, more preferably wherein x2 is x1.

Therefore, the present invention preferably relates to a process for preparing a catalyst comprising a zeolitic material comprising copper, the process comprising
(i) preparing an aqueous mixture comprising water, a zeolitic material comprising copper, a source of copper other than the zeolitic material comprising copper, and a non-zeolitic oxidic material selected from the group consisting of alumina, silica, titania, zirconia, ceria, a mixed oxide comprising one or more of Al, Si, Ti, Zr, and Ce and a mixture of two or more thereof, wherein the zeolitic material has a framework type selected from the group consisting of CHA, AEI, RTH, LEV, DDR, KFI, ERI, AFX, a mixture of two or more thereof and a mixed type of two or more thereof, more preferably selected from the group consisting of CHA, AEI, RTH, AFX, a mixture of two or more thereof and a mixed type of two or more thereof, more preferably selected from the group consisting of CHA and AEI, more preferably having a framework type CHA and wherein the source of copper other than the zeolitic material comprising copper contained in the aqueous mixture prepared in (i) is selected from the group consisting of copper acetate, copper oxide, a mixture of thereof, more preferably copper oxide, more preferably CuO;
(ii) disposing the mixture obtained in (i) on the surface of the internal walls of a substrate comprising an inlet end, an outlet end, a substrate axial length extending from the inlet end to the outlet end and a plurality of passages defined by internal walls of the substrate extending therethrough; and optionally drying the substrate comprising the mixture disposed thereon, wherein (ii) comprises
(ii.1) disposing a first portion of the mixture obtained in (i) on the surface of the internal walls of a substrate comprising an inlet end, an outlet end, a substrate axial length extending from the inlet end to the outlet end and a plurality of passages defined by internal walls of the substrate extending therethrough; and drying the substrate comprising the first portion of the mixture disposed thereon, wherein more preferably the first portion of the mixture according to (i) is disposed according to (ii.1) over x1% of the substrate axial length from the inlet end to the outlet end of the substrate or from the outlet end to the inlet end of the substrate, wherein x1 is in the range of from 80 to 100, more preferably in the range of from 90 to 100, more preferably in the range of from 95 to 100, more preferably in the range of from 98 to 100;
(ii.2) disposing a second portion of the mixture obtained in (i) on the substrate comprising the first portion of the mixture disposed thereon obtained in (ii.1), and optionally drying the substrate comprising the first and the second portion of the mixture disposed thereon, wherein more preferably the second portion of the mixture according to (i) is disposed according to (ii.2) over x2% of the substrate axial length from the inlet end to the outlet end of the substrate or from the outlet end to the inlet end of the substrate, wherein x2 is in the range of from 80 to 100, more preferably in the range of from 90 to 100, more preferably in the range of from 95 to 100, more preferably in the range of from 98 to 100, more preferably wherein x2 is x1;
(iii) calcining the substrate obtained in (ii.2).

In the context of the present invention, it is preferred that drying according to (ii.1) is performed in a gas atmosphere having a temperature in the range of from 60 to 300° C., more preferably in the range of from 90 to 150° C., the gas atmosphere more preferably comprising oxygen.

As to drying according to (ii.1), it is preferred that it is performed in a gas atmosphere for a duration in the range of from 10 minutes to 4 hours, more preferably in the range of from 20 minutes to 3 hours, more preferably from 50 minutes to 2.5 hours, the gas atmosphere more preferably comprising oxygen.

As to drying according to (ii.2), it is preferred that it is performed in a gas atmosphere having a temperature in the range of from 60 to 300° C., more preferably in the range of from 90 to 150° C., the gas atmosphere more preferably comprising oxygen.

As to drying according to (ii.2), it is preferred that it is performed in a gas atmosphere for a duration in the range of from 10 minutes to 4 hours, more preferably in the range of from 20 minutes to 3 hours, more preferably from 50 minutes to 2.5 hours, the gas atmosphere more preferably comprising oxygen.

As to calcining according to (iii), it is preferred that it is performed in a gas atmosphere having a temperature in the range of from 300 to 900° C., more preferably in the range of from 400 to 650° C., more preferably in the range of from 400 to 500° C. or more preferably in the range of from 550 to 600° C., the gas atmosphere more preferably comprising oxygen. Alternatively, it is preferred that it is performed in a gas atmosphere having a temperature in the range of from 700 to 900° C., the gas atmosphere more preferably comprising oxygen.

As to calcining according to (iii), it is preferred that is performed in a gas atmosphere for a duration in the range of from 0.1 to 4 hours, more preferably in the range of from 0.5 to 2.5 hours, the gas atmosphere more preferably comprising oxygen.

It is preferred that the weight ratio of the copper comprised in the zeolitic material comprised in the substrate obtained in (iii), calculated as CuO, relative to the copper comprised in the zeolitic material comprised in the mixture according to (i), calculated as CuO, is in the range of from 1.5:1 to 10:1, preferably in the range of from 2:1 to 5:1, more preferably in the range of from 2:1 to 4:1.

It is preferred that the process according to the present invention consists of (i), (ii) and (iii).

It is preferred that the aqueous mixture prepared according to (i) in the process for preparing a catalyst comprising a zeolitic material comprising copper according to the present invention is the aqueous mixture according to the present invention and disclosed herein below under paragraph II.

The present invention further relates to a catalyst comprising a zeolitic material comprising copper, said catalyst being obtained or obtainable by a process for preparing a catalyst according to the present invention.

It is preferred that the amount of copper comprised in the catalyst, calculated as CuO, is in the range of from 2 to 10 weight-%, more preferably in the range of from 2.5 to 5.5 weight-%, more preferably in the range of from 2.5 to 5 weight-% based on the weight of the zeolitic material.

Preferably from 75 to 100 weight-%, more preferably from 78 to 100 weight-%, more preferably from 80 to 100 weight-%, of the copper comprised in the catalyst is comprised in the zeolitic material.

It is preferred that the amount of copper in the zeolitic material comprised in the catalyst is higher than the amount of copper comprised in the zeolitic material contained in the mixture according to (i).

It is preferred that the catalyst comprises the zeolitic material at a loading in the range of from 0.8 to 2.6 g/in$^3$, more preferably in the range of from 1.2 to 2.2 g/in$^3$, more preferably in the range of from 1.5 to 2.2 g/in$^3$.

It is preferred that the catalyst comprises the non-zeolitic oxidic material at a loading in the range of from 0.02 to 0.52 g/in$^3$, more preferably in the range of from 0.1 to 0.42 g/in$^3$, more preferably in the range of from 0.1 to 0.21 g/in$^3$.

It is preferred that the catalyst comprises the non-zeolitic material at an amount in the range of from 2 to 20 weight-%, more preferably in the range of from 5 to 15 weight-%, more preferably in the range of from 7 to 13 weight-%, based on the weight of the zeolitic material.

It is preferred that the catalyst further comprises an oxidic component, wherein the oxidic component is selected from the group consisting of alumina, silica, zirconia, titania, a mixed oxide of two of more of Si, Al, Zr and Ti, and a mixture of two or more thereof, more preferably selected from the group consisting of alumina, zirconia, a mixed oxide of Al and Zr, and a mixture of thereof, wherein the oxidic component is more preferably zirconia. It is more preferred that the catalyst comprises the oxidic component at a loading in the range of from 0.2 to 0.26 g/in$^3$, more preferably in the range of from 0.4 to 0.2 g/in$^3$, more preferably in the range of from 0.06 to 0.14 g/in$^3$.

It is preferred that the catalyst comprises a coating disposed on the surface of the internal walls of the substrate, wherein the coating comprises the zeolitic material comprising copper, the nonzeolitic oxidic material, and optionally an oxidic component as defined in the foregoing. It is more preferred that the coating is disposed on the surface of the internal walls of the substrate over 80 to 100%, more preferably over 90 to 100%, more preferably over 95 to 100%, more preferably 98 to 100%, of the substrate axial length.

The catalyst of the present invention preferably exhibits an NOx activity, determined as defined in Example 2, higher than the NOx activity of a catalyst prepared by the same process except for step (i) which is replaced by (I1), wherein (I1) comprises preparing an aqueous mixture comprising water, a zeolitic material in its H-form, a source of copper, and a non-zeolitic oxidic material selected from the group consisting of alumina, silica, titania, zirconia, ceria, a mixed oxide comprising one or more of Al, Si, Ti, Zr, and Ce and a mixture of two or more thereof, wherein the amount of copper comprised in the aqueous mixture prepared in (I1), calculated as CuO, is equal to the amount of copper comprised in the aqueous mixture prepared in (i), wherein the amount of copper comprised in the aqueous mixture prepared in (i) includes the amount of copper comprised in the zeolitic material comprising copper used in (i) and the amount of copper from the source of copper used in (i).

It is preferred that the catalyst has a NOx conversion activity, determined as defined in Example 2, which is higher than the NOx conversion activity, determined as defined in Example 2, of a catalyst comprising a zeolitic material comprising copper other than a catalyst obtained or obtainable by a process according to the present invention under the same conditions and with the same loadings.

It is preferred that the zeolitic material comprising copper comprised in the catalyst according to the present invention is the zeolitic material according to the present invention and as disclosed herein below under paragraph III.

Preferably from 98 to 100 weight-%, more preferably from 99 to 100 weight-%, more preferably from 99.5 to 100 weight-%, of the catalyst consist of the zeolitic material comprising copper, the non-zeolitic oxidic material selected from the group consisting of alumina, silica, titania, zirconia, ceria, a mixed oxide comprising one or more of Al, Si, Ti, Zr, and Ce and a mixture of two or more thereof, and the substrate. Alternatively, it is preferred that from 98 to 100 weight-%, more preferably from 99 to 100 weight-%, more preferably from 99.5 to 100 weight-%, of the catalyst consist of the zeolitic material comprising copper, the non-zeolitic oxidic material selected from the group consisting of alumina, silica, titania, zirconia, ceria, a mixed oxide comprising one or more of Al, Si, Ti, Zr, and Ce and a mixture of two or more thereof, the substrate, and an oxidic component as defined in the foregoing.

It is preferred that the catalyst of the present invention is a selective catalytic reduction catalyst.

The present invention further relates to a use of a catalyst according to the present invention for the selective catalytic reduction of nitrogen oxides.

The present invention further relates to a method for selectively catalytically reducing nitrogen oxides, wherein the nitrogen oxides are comprised in an exhaust gas stream, said method comprising
(1) providing the exhaust gas stream, preferably from a compression ignition engine;
(2) passing the exhaust gas stream provided in (1) through the catalyst according to the present invention.

The present invention further relates to an exhaust gas treatment system for treating an exhaust gas stream exiting a compression ignition engine, said exhaust gas treatment system having an upstream end for introducing said exhaust gas stream into said exhaust gas treatment system, wherein said exhaust gas treatment system comprises a catalyst according to the present invention, one or more of a diesel oxidation catalyst, a selective catalytic reduction catalyst, an ammonia oxidation catalyst, a NOx trap and a particulate filter.

The exhaust gas treatment system preferably comprises a diesel oxidation catalyst disposed downstream of the engine and upstream of the catalyst according to the present invention, wherein optionally said diesel oxidation catalyst contains a NOx storage functionality.

The exhaust gas treatment system preferably further comprises one or more of a selective catalytic reduction catalyst and an ammonia oxidation catalyst disposed downstream of the catalyst according to the present invention.

It is preferred that the exhaust gas treatment system further comprises a selective catalytic reduction catalyst disposed downstream of the diesel oxidation catalyst and upstream of the catalyst according to the present invention.

II. An Aqueous Mixture and a Process for Preparing Said Mixture

The present invention further relates to an aqueous mixture comprising water, a zeolitic material comprising copper, a source of copper other than the zeolitic material comprising copper, and a non-zeolitic oxidic material selected from the group consisting of alumina, silica, titania, zirconia, ceria, a mixed oxide comprising one or more of Al, Si, Ti, Zr, and Ce and a mixture of two or more thereof.

It is preferred that the zeolitic material comprising copper has a framework type selected from the group consisting of ABW, ACO, AEI, AEL, AEN, AET, AFG, AFI, AFN, AFO, AFR, AFS, AFT, AFV, AFX, AFY, AHT, ANA, APC, APD, AST, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA, -CHI, -CLO, CON, CSV, CZP, DAC, DDR, DFO, DFT, DOH, DON, EAB, EDI, EEI, EMT, EON, EPI, ERI, ESV, ETR, EUO, *-EWT, EZT, FAR, FAU, FER, FRA, GIS, GIU, GME, GON, GOO, HEU, IFO, IFR, -IFU, IFW, IFY, IHW, IMF, IRN, IRR, -IRY, ISV, ITE, ITG, ITH, *-ITN, ITR, ITT, -ITV, ITW, IWR, IWS, IWV, IWW, JBW, JNT, JOZ, JRY, JSN, JSR, JST, JSW, KFI, LAU, LEV, LIO, -LIT, LOS, LOV, LTA, LTF, LTJ, LTL, LTN, MAR, MAZ, MEI, MEL, MEP, MER, MFI, MFS, MON, MOR, MOZ, *MRE, MSE, MSO, MTF, MTN, MTT, MTW, MVY, MWF, MWW, NAB, NAT, NES, NON, NPO, NPT, NSI, OBW, OFF, OKO, OSI, OSO, OWE, -PAR, PAU, PCR, PHI, PON, POS, PSI, PUN, RHO, -RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, *SFV, SFW, SGT, SIV, SOD, SOF, SOS, SSF, *-SSO, SSY, STF, STI, *STO, STT, STW, -SVR, SVV, SZR, TER, THO, TOL, TON, TSC, TUN, UEI, UFI, UOS, UOV, UOZ, USI, UTL, UWY, VET, VFI, VNI, VSV, WEI, -WEN, YUG, ZON, a mixture of two or more thereof, and a mixed type of two or more thereof. It is more preferred that the zeolitic material comprising copper has a framework type selected from the group consisting of CHA, AEI, RTH, LEV, DDR, KFI, ERI, AFX, a mixture of two or more thereof and a mixed type of two or more thereof, more preferably selected from the group consisting of CHA, AEI, RTH, AFX, a mixture of two or more thereof and a mixed type of two or more thereof, more preferably selected from the group consisting of CHA and AEI. It is more preferred that the zeolitic material comprising copper has a framework type CHA.

Preferably from 95 to 100 weight-%, more preferably from 98 to 100 weight-%, more preferably from 99 to 100 weight-% of the framework structure of the zeolitic material consist of Si, Al, and O, wherein in the framework structure, the molar ratio of Si to Al, calculated as molar $SiO_2:Al_2O_3$, is more preferably in the range of from 2:1 to 50:1, more preferably in the range of from 5:1 to 45:1, more preferably in the range of from 10:1 to 35:1, more preferably in the range of from 16:1 to 28:1. It is more preferred that the zeolitic material comprising copper has a framework type CHA with a molar ratio of Si to Al, calculated as molar $SiO_2:Al_2O_3$, in the range of from 2:1 to 50:1, more preferably in the range of from 5:1 to 45:1, more preferably in the range of from 10:1 to 35:1, more preferably in the range of from 16:1 to 28:1, more preferably in the range of from 16:1 to 19:1 or more preferably in the range of from 23:1 to 27:1.

It is preferred that the zeolitic material, more preferably which has a framework type CHA, has a mean crystallite size of at least 0.1 micrometer, more preferably in the range of from 0.1 to 3.0 micrometers, more preferably in the range of from 0.3 to 1.5 micrometer, more preferably in the range of from 0.4 to 1.0 micrometer determined via scanning electron microscopy.

It is preferred that the amount of copper comprised in the zeolitic material, calculated as CuO, is in the range of from 0.05 to 3.5 weight-%, more preferably in the range of from 0.1 to 3 weight %, more preferably in the range of from 0.2 to 2 weight-%, more preferably in the range of from 0.5 to 1.75 weight-%, more preferably in the range of from 1 to 1.75 weight-%, or more preferably in the range of from 1.9 to 2.5 weight-%, based on the weight of the zeolitic material.

It is preferred that the source of copper other than the zeolitic material comprising copper is selected from the group consisting of copper acetate, copper nitrate, copper sulfate, copper formate, copper oxide, and a mixture of two or more thereof, more preferably selected from the group consisting of copper acetate, copper oxide, and a mixture of two or more thereof, more preferably copper oxide, more preferably CuO.

It is preferred that the aqueous mixture comprises the source of copper other than the zeolitic material comprising copper, calculated as CuO, at an amount in the range of from 0.1 to 14 weight-%, more preferably in the range of from 0.5 to 12 weight-%, more preferably in the range of from 1 to 10 weight-%, more preferably in the range of from 1.5 to 5 weight-%, more preferably in the range of from 1.5 to 4.5 weight-%, based on the weight of the zeolitic material. It is more preferred that the aqueous mixture comprises the source of copper other than the zeolitic material comprising copper, calculated as CuO, at an amount in the range of from 1.5 to 4 weight-%, based on the weight of the zeolitic material. It is more preferred that the source of copper other than the zeolitic material comprising copper is selected from the group consisting of copper acetate, copper oxide, and a mixture of two or more thereof, more preferably copper oxide, more preferably CuO, wherein the aqueous mixture comprises said source of copper other than the zeolitic material comprising copper, calculated as CuO, at an amount in the range of from 0.5 to 12 weight-%, more preferably in the range of from 1 to 10 weight-%, more preferably in the range of from 1.5 to 5 weight-%, more preferably in the range of from 1.5 to 4 weight-%, based on the weight of the zeolitic material.

It is preferred that the non-zeolitic oxidic material is selected from the group consisting of alumina, silica and titania, a mixed oxide comprising one or more of Al, Si, and Ti and a mixture of two or more thereof, preferably selected from the group consisting of alumina, silica, a mixed oxide comprising one or more of Al and Si, and a mixture of two thereof, more preferably a mixture of alumina and silica. It is more preferred that from 80 to 99 weight-%, more preferably from 85 to 98 weight-%, more preferably from 90 to 98 weight-%, of the mixture of alumina and silica consist of alumina and that more preferably from 1 to 20 weight-%, more preferably from 2 to 15 weight-%, more preferably from 2 to 10 weight-% of the mixture of alumina and silica consist of silica.

The aqueous mixture preferably comprises the non-zeolitic oxidic material at an amount in the range of from 2 to 20 weight-%, preferably in the range of from 5 to 15 weight-%, more preferably in the range of from 7 to 13 weight-%, based on the weight of the zeolitic material.

Preferably from 10 to 90 weight-%, more preferably from 40 to 85 weight-%, more preferably from 55 to 80 weight-%, of the aqueous mixture consist of water The aqueous mixture preferably further comprises a precursor of an oxidic component, wherein the precursor is more preferably one or more of an aluminum salt, a silicon salt, a zirconium salt, and a titanium salt, more preferably one or more of a zirconium salt, and an aluminum salt, more preferably a zirconium salt, more preferably zirconium acetate. It is more preferred that in the aqueous mixture, the amount of precursor calculated as oxide, more preferably as alumina, silica, zirconia or titania, more preferably of the zirconium salt calculated as $ZrO_2$, is in the range of from 1 to 10 weight-%, more preferably in the range of from 2 to 8 weight-%, more preferably in the range 3 to 7 weight-%, based on the weight of the zeolitic material.

The aqueous mixture may further comprise particles of a carbon-containing additive. The carbon-containing additive contained in the mixture preferably is one or more of graphite, synthetic graphite, carbon black, graphene, diamond, fullerene, carbon nanotubes and amorphous carbon, more preferably is one or more of graphite, synthetic graphite, graphene, fullerene, carbon nanotubes and amorphous carbon, more preferably one or more of graphite, synthetic graphite and graphene, more preferably one or more of graphite and synthetic graphite.

The carbon-containing additive has a removal temperature in the range of from 120 to 900° C., preferably in the range of from 400 to 850° C., more preferably in the range of from 500 to 800° C. The term "removal temperature" is to be understood as under paragraph I.

The particles of the carbon-containing additive comprised in the mixture preferably have a Dv50 in the range of from 0.5 to 30 micrometers, more preferably in the range of from 2 to 15 micrometers, more preferably in the range of from 3 to 12 micrometers, more preferably in the range of from 4 to 10 micrometers, more preferably in the range of from 5 to 8 micrometers, the Dv50 being determined according to Reference Example 3 herein.

Alternatively, the particles of the carbon-containing additive comprised in the mixture preferably have a Dv50 in the range of from 0.5 to 30 micrometers, more preferably in the range of from 1 to 22 micrometers, more preferably in the range of from 2 to 20 micrometers, more preferably in the range of from 5 to 19 micrometers, the Dv50 being determined according to Reference Example 3 herein.

The particles of the carbon-containing additive comprised in the mixture preferably have a Dv90 in the range of from 4 to 60 micrometers, more preferably in the range of from 6 to 30 micrometers, more preferably in the range of from 8 to 20 micrometers, more preferably in the range of from 9 to 14 micrometers, more preferably in the range of from 10 to 13 micrometers, the Dv90 being determined according to Reference Example 3 herein.

Alternatively, it is preferred that the particles of the carbon-containing additive comprised in the mixture have a Dv90 in the range of from 4 to 80 micrometers, more preferably in the range of from 4.5 to 60 micrometers, more preferably in the range of from 5 to 45 micrometers, the Dv90 being determined according to Reference Example 3 herein.

The mixture may comprise the particles of the carbon-containing additive in an amount in the range of from 2 to 40 weight-%, preferably in the range of from 4 to 30 weight-%, more preferably in the range of from 5 to 25 weight-%, more preferably in the range of from 5.5 to 15 weight %, based on the weight of the zeolitic material and of the non-zeolitic oxidic material in the mixture.

Alternatively, it is preferred that the carbon-containing additive contained in the mixture is one or more of polyacrylate, microcrystalline cellulose, corn starch, styrene, poly(methyl methacrylate-co-ethylene glycol), polymethylurea, and polymethyl methacrylate, more preferably one or more of polymethylurea and polymethyl methacrylate, more preferably polymethylurea, or more preferably polymethyl methacrylate. It is more preferred that the carbon-containing additive has a removal temperature in the range of from 150 to 550° C., more preferably in the range of from 180 to 500° C.

The aqueous mixture may further comprise one or more additional non-zeolitic oxidic materials, wherein the one or more non-zeolitic oxidic materials are selected from the group consisting of alumina, silica, titania, zirconia, ceria, a mixed oxide comprising one or more of Al, Si, Ti, Zr, and Ce and a mixture of two or more thereof.

The aqueous mixture preferably further comprises one or more acids, more preferably two acids, more preferably two organic acids, more preferably tartaric acid and acetic acid, at an amount more preferably in the range of from 0.1 to 2 weight-%, more preferably in the range of from 0.2 to 1.5 weight-%, more preferably in the range of from 0.4 to 1.2 weight-%, based on the weight of the zeolitic material.

It is preferred that the aqueous mixture has a solid content in the range of from 15 to 50 weight %, more preferably in the range of from 20 to 45 weight-%, more preferably in the range of from 30 to 40 weight-%, based on the weight of the aqueous mixture.

The aqueous mixture preferably comprises water, the zeolitic material comprising copper, the source of copper other than the zeolitic material comprising copper, the non-zeolitic oxidic material selected from the group consisting of alumina, silica, titania, zirconia, ceria, a mixed oxide comprising one or more of Al, Si, Ti, Zr, and Ce and a mixture of two or more thereof, and one or more acids as defined in the foregoing. Alternatively, the aqueous mixture preferably comprises water, the zeolitic material comprising copper, the source of copper other than the zeolitic material comprising copper, the non-zeolitic oxidic material selected from the group consisting of alumina, silica, titania, zirconia, ceria, a mixed oxide comprising one or more of Al, Si, Ti, Zr, and Ce and a mixture of two or more thereof, a precursor of an oxidic component as defined in the foregoing and more preferably one or more acids as defined in the foregoing. As a further alternative, the aqueous mixture preferably comprises water, the zeolitic material comprising copper, the source of copper other than the zeolitic material comprising copper, the non-zeolitic oxidic material selected from the group consisting of alumina, silica, titania, zirconia, ceria, a mixed oxide comprising one or more of Al, Si, Ti, Zr, and Ce and a mixture of two or more thereof, a precursor of an oxidic component as defined in the foregoing, particles of a carbon-containing additive as defined in the foregoing, and more preferably one or more acids as defined in the foregoing.

In the context of the present invention, it is preferred that from 98 to 100 weight-%, more preferably from 99 to 100 weight-%, more preferably from 99.5 to 100 weight-%, more preferably from 99.9 to 100 weight-%, of the mixture consist of water, the zeolitic material comprising copper, the source of copper other than the zeolitic material comprising copper, the non-zeolitic oxidic material selected from the group consisting of alumina, silica, titania, zirconia, ceria, a mixed oxide comprising one or more of Al, Si, Ti, Zr, and Ce and a mixture of two or more thereof, and more preferably one or more acids as defined in the foregoing. It is alternatively preferred that from 98 to 100 weight-%, more preferably from 99 to 100 weight-%, more preferably from 99.5 to 100 weight-%, more preferably from 99.9 to 100 weight-%, of the mixture consist of water, the zeolitic material comprising copper, the source of copper other than the zeolitic material comprising copper, the non-zeolitic oxidic material selected from the group consisting of alumina, silica, titania, zirconia, ceria, a mixed oxide comprising one or more of Al, Si, Ti, Zr, and Ce and a mixture of two or more thereof, a precursor of an oxidic component as defined in the foregoing and more preferably one or more acids as defined in the foregoing. It is preferred as a further alternative that from 98 to 100 weight-%, more preferably from 99 to 100 weight-%, more preferably from 99.5 to 100 weight-%, more preferably from 99.9 to 100 weight-%, of the mixture consist of water, the zeolitic material comprising copper, the source of copper other than the zeolitic material comprising copper, the non-zeolitic oxidic material selected from the group consisting of alumina, silica, titania, zirconia, ceria, a mixed oxide comprising one or more of Al, Si, Ti, Zr, and Ce and a mixture of two or more thereof, a precursor of an oxidic component as defined in the foregoing, particles of a carbon-containing additive as defined in the foregoing, and more preferably one or more acids as defined in the foregoing.

It is preferred that the aqueous mixture according to the present invention is the aqueous mixture prepared in (i) in the process for preparing a catalyst according to the present invention and disclosed in the foregoing under paragraph I.

The present invention further relates to a process for preparing the mixture according to the present invention, the process comprising (i.1) preparing a first mixture comprising water and the source of copper other than the zeolitic material comprising copper;

(i.2) optionally a precursor of an oxidic component as defined in in the foregoing in the first mixture obtained according to (i.1);

(i.3) preparing a second mixture comprising water and the zeolitic material comprising copper;

(i.4) admixing the second mixture obtained in (i.3) with the first mixture obtained in (i.1), or in (i.2), obtaining a third mixture;

(i.5) preparing a fourth mixture comprising water, the non-zeolitic oxidic material selected from the group consisting of alumina, silica, titania, zirconia, ceria, a mixed oxide comprising one or more of Al, Si, Ti, Zr, and Ce and a mixture of two or more thereof, and more preferably comprising an acid, more preferably an organic acid, more preferably tartaric acid;

(i.6) admixing the fourth mixture obtained in (i.5) with the third mixture obtained in (i.4), more preferably adding an acid, more preferably an organic acid, more preferably acetic acid, and optionally adding the particles of a carbon-containing additive as defined in the foregoing prior to the acid.

Preferably from 90 to 100 weight-%, more preferably from 95 to 100 weight-%, more preferably from 96 to 99 weight-%, of the source of copper other than the zeolitic material comprising copper are present in the mixture prepared in (i.1) in non-dissolved state.

As to (i.1), it is preferred that it further comprises milling the first mixture, more preferably until the particles of the first mixture have a Dv90 in the range of from 0.5 to 20 micrometers, more preferably in the range of from 4 to 15 micrometers, more preferably in the range of from 6 to 12 micrometers, the Dv90 being determined as described in Reference Example 3.

It is preferred that the first mixture obtained in (i.1) has a solid content in the range of from 4 to 30 weight-%, more preferably in the range of from 4 to 15 weight-%, based on the weight of the first mixture.

It is preferred that the second mixture obtained in (i.3) has a solid content in the range of from 15 to 50 weight-%, more preferably in the range of from 20 to 45 weight-%, more preferably in the range of from 30 to 40 weight-%, based on the weight of the second mixture.

As to (i.4), it is preferred that it further comprises milling the third mixture, more preferably until the particles of the third mixture have a Dv90 in the range of from 0.5 to 20 micrometers, more preferably in the range of from 2 to 15 micrometers, more preferably in the range of from 2 to 10 micrometers, the Dv90 being determined as described in Reference Example 3.

It is preferred that the fourth mixture obtained in (i.5) has a solid content in the range of from 15 to 50 weight-%, more preferably in the range of from 20 to 45 weight-%, more preferably in the range of from 28 to 40 weight-%, based on the weight of the fourth mixture.

It is preferred that the aqueous mixture obtained in (i), more preferably in (i.6), has a solid content in the range of from 15 to 50 weight-%, more preferably in the range of from 20 to 45 weight-%, more preferably in the range of from 30 to 40 weight-%, based on the weight of the aqueous mixture.

It is preferred that the process according to the present invention preferably consists of (i.1), (i.2), (i.3), (i.4), (i.5) and (i.6).

The present invention further relates to an aqueous mixture obtained or obtainable by a process according to the present invention and as disclosed in the foregoing.

The present invention further relates to a use of an aqueous mixture according to the present invention for preparing a catalyst, preferably a selective catalytic reduction catalyst.

It has been surprisingly found that using the aqueous mixture of present invention, in particular in a process for preparing a catalyst, permits to provide a catalyst comprising a zeolitic material comprising copper exhibiting high catalytic activities, such as NOx conversion, at both low and high temperatures.

The present invention further relates to a method for preparing a catalyst, preferably a selective catalytic reduction catalyst, the method comprising using the aqueous mixture according to the present invention.

III. A Zeolitic Material Having a Framework Type CHA and Comprising Copper

The present invention further relates to a zeolitic material having a framework type CHA and comprising copper, wherein the framework structure of the zeolitic material comprises Si, Al, and O, exhibiting an IR-spectrum, determined as described in Example 12, comprising: a first absorption peak (P1) having a maximum in the range of from 930 to 975 cm$^{-1}$, preferably in the range of from 935 to 970 cm$^{-1}$, more preferably in the range of from 945 to 965 cm$^{-1}$; a second absorption peak (P2) having a maximum in the range of from 880 to 920 cm$^{-1}$, preferably in the range of from 885 to 915 cm$^{-1}$, more preferably in the range of from 890 to 910 cm$^{-1}$; wherein the peak area of the first absorption peak relative to the peak area of the second absorption peak, P1:P2, is in the range of from 0.2:1 to 1.55:1, preferably in the range of from 0.5:1 to 1.53:1, more preferably in the range of from 1.05:1 to 1.53:1, more preferably in the range of from 1.07:1 to 1.45:1, more preferably in the range of from 1.10:1 to 1.40:1, more preferably in the range of from 1.12:1 to 1.35:1, more preferably in the range of from 1.15:1 to 1.32:1.

Preferably from 95 to 100 weight-%, more preferably from 98 to 100 weight-%, more preferably from 99 to 100 weight-%, of the framework structure of the zeolitic material consist of Si, Al, and O, wherein in the framework structure, the molar ratio of Si to Al, calculated as molar $SiO_2:Al_2O_3$, is more preferably in the range of from 2:1 to 50:1, more preferably in the range of from 5:1 to 45:1, more preferably in the range of from 10:1 to 35:1, more preferably in the range of from 16:1 to 28:1, more preferably in the range of from 16:1 to 19:1 or more preferably in the range of from 23:1 to 27:1.

It is preferred that the zeolitic material has a mean crystallite size of at least 0.1 micrometer, more preferably in the range of from 0.1 to 3.0 micrometers, more preferably in the range of from 0.3 to 1.5 micrometer, more preferably in the range of from 0.4 to 1.0 micrometer determined via scanning electron microscopy.

It is preferred that the amount of copper comprised in the zeolitic material, calculated as CuO, is in the range of from 0.1 to 14 weight-%, more preferably in the range of from 0.5 to 12 weight %, more preferably in the range of from 1 to 10 weight-%, more preferably in the range of from 1.5 to 5 weight-%, more preferably in the range of from 1.5 to 4.5 weight-%, based on the weight of the zeolitic material.

It is preferred that the ratio of the peak area of the first absorption peak relative to the sum of the peak areas of all absorption peaks having a maximum in the wavelength range of from 890 to 965 $cm^{-1}$, is in the range of from 0.05:1 to 0.50:1, more preferably in the range of from 0.08:1 to 0.5:1, more preferably in the range of from 0.1:1 to 0.5:1, more preferably in the range of from 0.15:1 to 0.49:1, more preferably in the range of from 0.25:1 to 0.48:1, more preferably in the range of from 0.30:1 to 0.45:1, more preferably in the range of from 0.40:1 to 0.45:1

The zeolitic material preferably has a BET specific surface area in the range of from 400 to 800 $m^2/g$, more preferably in the range of from 500 to 700 $m^2/g$, the BET specific surface area being determined as described in Reference Example 1.

It is preferred that the zeolitic material having a framework type CHA and comprising copper is comprised in the catalyst according to the present invention described under paragraph I. above.

The present invention further relates to a process for preparing the zeolitic material according to the present invention, the process comprising
(i) preparing an aqueous mixture comprising water, a zeolitic material having a framework type CHA and comprising copper, and a source of copper other than the zeolitic material comprising copper;
(ii) optionally drying the mixture obtained in (i);
(iii) calcining the mixture obtained in (i), or in (ii).

Preferably from 95 to 100 weight-%, more preferably from 98 to 100 weight-%, more preferably from 99 to 100 weight-% of the framework structure of the zeolitic material consist of Si, Al, and O, wherein in the framework structure, the molar ratio of Si to Al, calculated as molar $SiO_2:Al_2O_3$, is more preferably in the range of from 2:1 to 50:1, more preferably in the range of from 5:1 to 45:1, more preferably in the range of from 10:1 to 35:1, more preferably in the range of from 16:1 to 28:1, more preferably in the range of from 16:1 to 19:1 or more preferably in the range of from 23:1 to 27:1.

It is preferred that the zeolitic material contained in the aqueous mixture prepared in (i) has a mean crystallite size of at least 0.1 micrometer, more preferably in the range of from 0.1 to 3.0 micrometers, more preferably in the range of from 0.3 to 1.5 micrometer, more preferably in the range of from 0.4 to 1.0 micrometer determined via scanning electron microscopy.

It is preferred that the amount of copper comprised in the zeolitic material contained in the aqueous mixture prepared in (i), calculated as CuO, is in the range of from 0.05 to 3.5 weight %, more preferably in the range of from 0.1 to 3 weight-%, more preferably in the range of from 0.2 to 2 weight-%, more preferably in the range of from 0.5 to 1.75 weight-%, more preferably in the range of from 1 to 1.75 weight-%, or more preferably in the range of from 1.9 to 2.5 weight %, based on the weight of the zeolitic material comprised in the aqueous mixture prepared in (i).

It is preferred that the source of copper other than the zeolitic material comprising copper is selected from the group consisting of copper acetate, copper nitrate, copper sulfate, copper formate, copper oxide, and a mixture of two or more thereof, more preferably selected from the group consisting of copper acetate, copper oxide, and a mixture of two or more thereof, more preferably copper oxide, more preferably CuO.

The aqueous mixture prepared in (i) preferably comprises the source of copper other than the zeolitic material comprising copper, calculated as CuO, at an amount in the range of from 0.1 to 14 weight-%, more preferably in the range of from 0.5 to 12 weight-%, more preferably in the range of from 1 to 10 weight-%, more preferably in the range of from 1.5 to 5 weight-%, based on the weight of the zeolitic material comprised in the aqueous mixture prepared in (i). It is more preferred that the aqueous mixture prepared in (i) comprises the source of copper other than the zeolitic material comprising copper, calculated as CuO, at an amount in the range of from 1.5 to 4.5 weight-%, more preferably in the range of from 1.5 to 4 weight-%, based on the weight of the zeolitic material comprised in the aqueous mixture prepared in (i).

It is preferred that, in the aqueous mixture prepared in (i), from 10 to 90 weight-%, more preferably from 40 to 85 weight-%, more preferably from 55 to 80 weight-%, of the aqueous mixture consist of water.

It is preferred that the aqueous mixture prepared in (i) further comprises a non-zeolitic oxidic material selected from the group consisting of alumina, silica, titania, zirconia, ceria, a mixed oxide comprising one or more of Al, Si, Ti, Zr, and Ce and a mixture of two or more thereof. It is more preferred that the non-zeolitic oxidic material contained in the aqueous mixture prepared in (i) is selected from the group consisting of alumina, silica, and titania, a mixed oxide comprising one or more of Al, Si, and Ti and a mixture of two or more thereof, preferably selected from the group consisting of alumina, silica, a mixed oxide comprising one or more of Al and Si, and a mixture of two or more thereof, more preferably a mixture of alumina and silica. It is preferred that the non-zeolitic material is defined as under paragraph I. and II. in the foregoing.

It is preferred that the aqueous mixture prepared in (i) further comprises one or more acids as defined under paragraph I. and II. in the foregoing. Further, optionally, the aqueous mixture prepared in (i) further comprises particles of a carbon-containing additive as defined under paragraph I. and II. in the foregoing.

It is preferred that the aqueous mixture prepared in (i) further comprises a precursor of an oxidic component, wherein the precursor is more preferably one or more of an aluminum salt, a silicon salt, a zirconium salt, and a titanium salt, more preferably one or more of a zirconium salt, and an aluminum salt, more preferably a zirconium salt, more preferably zirconium acetate. It is more preferred that, in the aqueous mixture prepared in (i), the amount of precursor calculated as oxide, more preferably as alumina, silica, zirconia or titania, more preferably of the zirconium salt calculated as $ZrO_2$, is in the range of from 1 to 10 weight-%, more preferably in the range of from 2 to 8 weight-%, more preferably in the range 3 to 7 weight-%, based on the weight of the zeolitic material comprised in the aqueous mixture prepared in (i).

Preferably from 98 to 100 weight-%, more preferably from 99 to 100 weight-%, more preferably from 99.5 to 100 weight-%, more preferably from 99.9 to 100 weight-%, of the aqueous mixture prepared in (i) consist of water, the zeolitic material comprising copper, and the source of copper other than the zeolitic material comprising copper. It is alternatively preferred that from 98 to 100 weight-%, more preferably from 99 to 100 weight-%, more preferably from 99.5 to 100 weight-%, more preferably from 99.9 to 100 weight-%, of the aqueous mixture prepared in (i) consist of water, the zeolitic material comprising copper, the source of copper other than the zeolitic material comprising copper, and a precursor of an oxidic component as defined in the foregoing.

As a further alternative, it is preferred that from 98 to 100 weight-%, more preferably from 99 to 100 weight-%, more preferably from 99.5 to 100 weight-%, more preferably from 99.9 to 100 weight-%, of the aqueous mixture prepared in (i) consist of water, the zeolitic material comprising copper, the source of copper other than the zeolitic material comprising copper, a nonzeolitic oxidic material as defined in the foregoing, preferably one or more acids as defined in the foregoing and optionally a precursor of an oxidic component as defined in the foregoing.

As to (i), it is preferred that it comprises
(i.1) preparing a first mixture comprising water and the source of copper other than the zeolitic material comprising copper;
(i.2) more preferably milling the first mixture, more preferably until the particles of the first mixture have a Dv90 in the range of from 0.5 to 20 micrometers, the Dv90 being determined as in Reference Example 3; and optionally adding a precursor of an oxidic component as defined in the foregoing;
(i.3) preparing a second mixture comprising water and the zeolitic material comprising copper;
(i.4) admixing the second mixture obtained in (i.3) with the first mixture obtained in (i.1), preferably in (i.2).

Preferably from 90 to 100 weight-%, more preferably from 95 to 100 weight-%, more preferably from 98 to 100 weight-%, of the source of copper other than the zeolitic material comprising copper are present in the mixture prepared in (i.1) in non-dissolved state.

As to milling in (i.2), it is preferred that it is performed until the particles of the first mixture have a Dv90 in the range of from 4 to 15 micrometers, more preferably in the range of from 6 to 12 micrometers, the Dv90 being determined as in Reference Example 3.

As to (i.4), it is preferred that it further comprises milling the mixture obtained in (i.4), more preferably until the particles of said mixture have a Dv90 in the range of from 0.5 to 20 micrometers, more preferably in the range of from 2 to 15 micrometers, more preferably in the range of from 2 to 10 micrometers, the Dv90 being determined as in Reference Example 3.

As to drying according to (ii), it is preferred that it is performed in a gas atmosphere having a temperature in the range of from 100 to 200° C., more preferably in the range of from 120 to 140° C., the gas atmosphere more preferably comprising oxygen.

As to drying according to (ii), it is preferred that it is performed in a gas atmosphere for a duration in the range of from 0.25 to 3 hours, more preferably in the range of from 0.5 to 1.5 hours, the gas atmosphere more preferably comprising oxygen.

As to calcining according to (iii), it is preferred that it is performed in a gas atmosphere having a temperature in the range of from 300 to 900° C., more preferably in the range of from 400 to 500° C., the gas atmosphere more preferably comprising oxygen.

As to calcining according to (iii), it is preferred that it is performed in a gas atmosphere for a duration in the range of from 0.5 to 8 hours, more preferably in the range of from 1.5 to 3 hours, the gas atmosphere more preferably comprising oxygen.

It is preferred that the weight ratio of the copper comprised in the zeolitic material obtained in (iii), calculated as CuO, relative to the copper comprised in the zeolitic material comprised in the mixture according to (i), calculated as CuO, is in the range of from 1.5:1 to 10:1, more preferably in the range of from 2:1 to 5:1, more preferably in the range of from 2:1 to 4:1.

It is preferred that the process for preparing a zeolitic material having a framework type CHA and comprising copper consists of (i), (ii) and (iii).

The present invention further relates to a zeolitic material having a framework type CHA and comprising copper, preferably the zeolitic material having a framework type CHA and comprising copper according to the present invention, obtained or obtainable by a process according to the present invention.

The present invention further relates to a use of a zeolitic material having a framework type CHA and comprising copper according to the present invention as a catalyst or as a catalytic article, preferably for the selective catalytic reduction of nitrogen oxides.

In the context of the present invention, the term "based on the weight of the zeolitic material" refers to the weight of the zeolitic material alone, meaning without copper. Further, in the context of the present invention, the term "based on the weight of the Chabazite" refers to the weight of the Chabazite alone, meaning without copper.

Further, in the context of the present invention, the term "the surface of the internal walls" is to be understood as the "naked" or "bare" or "blank" surface of the walls, i.e. the surface of the walls in an untreated state which consists—apart from any unavoidable impurities with which the surface may be contaminated—of the material of the walls.

Furthermore, in the context of the present invention, a term "X is one or more of A, B and C", wherein X is a given feature and each of A, B and C stands for specific realization of said feature, is to be understood as disclosing that X is either A, or B, or C, or A and B, or A and C, or B and C, or A and B and C. In this regard, it is noted that the skilled person is capable of transfer to above abstract term to a concrete example, e.g. where X is a chemical element and A, B and C are concrete elements such as Li, Na, and K, or X is a temperature and A, B and C are concrete temperatures such as 10° C., 20° C., and 30° C. In this regard, it is further noted that the skilled person is capable of extending the above term to less specific realizations of said feature, e.g. "X is one or more of A and B" disclosing that X is either A, or B, or A and B, or to more specific realizations of said feature, e.g. "X is one or more of A, B, C and D", disclosing that X is either A, or B, or C, or D, or A and B, or A and C, or A and D, or B and C, or B and D, or C and D, or A and B and C, or A and B and D, or B and C and D, or A and B and C and D.

The present invention is further illustrated by the following first set of embodiments and combinations of embodiments resulting from the dependencies and back-references as indicated. In particular, it is noted that in each instance where a range of embodiments is mentioned, for example in the context of a term such as "The process of any one of embodiments 1 to 4", every embodiment in this range is meant to be explicitly disclosed for the skilled person, i.e. the wording of this term is to be understood by the skilled person as being synonymous to "The process of any one of embodiments 1, 2, 3, and 4". The following first set of embodiments may be combined with any one of the second set of embodiments and the third set of embodiments herein below.
1. A process for preparing a catalyst comprising a zeolitic material comprising copper, the process comprising
   (i) preparing an aqueous mixture comprising water, a zeolitic material comprising copper, a source of copper other than the zeolitic material comprising copper, and a non-zeolitic oxidic material selected from the group consisting of alumina, silica, titanic, zirconia, ceria, a mixed oxide comprising one or more of Al, Si, Ti, Zr, and Ce and a mixture of two or more thereof;
   (ii) disposing the mixture obtained in (i) on the surface of the internal walls of a substrate comprising an inlet end, an outlet end, a substrate axial length extending from the inlet end to the outlet end and a plurality of passages defined by internal walls of the substrate extending therethrough; and optionally drying the substrate comprising the mixture disposed thereon;
   (iii) calcining the substrate obtained in (ii).
2. The process of embodiment 1, wherein the zeolitic material comprising copper contained in the aqueous mixture prepared in (i) has a framework type selected from the group consisting of ABW, ACO, AEI, AEL, AEN, AET, AFG, AFI, AFN, AFO, AFR, AFS, AFT, AFV, AFX, AFY, AHT, ANA, APC, APD, AST, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA, -CHI, -CLO, CON, CSV, CZP, DAC, DDR, DFO, DFT, DOH, DON, EAB, EDI, EEI, EMT, EON, EPI, ERI, ESV, ETR, EUO, *-EWT, EZT, FAR, FAU, FER, FRA, GIS, GIU, GME, GON, GOO, HEU, IFO, IFR, -IFU, IFW, IFY, IHW, IMF, IRN, IRR, -IRY, ISV, ITE, ITG, ITH, *-ITN, ITR, ITT, -ITV, ITW, IWR, IWS, IWV, IWW, JBW, JNT, JOZ, JRY, JSN, JSR, JST, JSW, KFI, LAU, LEV, LIO, -LIT, LOS, LOV, LTA, LTF, LTJ, LTL, LTN, MAR, MAZ, MEI, MEL, MEP, MER, MFI, MFS, MON, MOR, MOZ, *MRE, MSE, MSO, MTF, MTN, MTT, MTW, MVY, MWF, MWW, NAB, NAT, NES, NON, NPO, NPT, NSI, OBW, OFF, OKO, OSI, OSO, OWE, -PAR, PAU, PCR, PHI, PON, POS, PSI, PUN, RHO, -RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, *SFV, SFW, SGT, SIV, SOD, SOF, SOS, SSF, *-SSO, SSY, STF, STI, *STO, STT, STW, -SVR, SVV, SZR, TER, THO, TOL, TON, TSC, TUN, UEI, UFI, UOS, UOV, UOZ, USI, UTL, UWY, VET, VFI, VNI, VSV, WEI, -WEN, YUG, ZON, a mixture of two or more thereof, and a mixed type of two or more thereof, preferably selected from the group consisting of CHA, AEI, RTH, LEV, DDR, KFI, ERI, AFX, a mixture of two or more thereof and a mixed type of two or more thereof, more preferably selected from the group consisting of CHA, AEI, RTH, AFX, a mixture of two or more thereof and a mixed type of two or more thereof, more preferably selected from the group consisting of CHA and AEI, wherein the zeolitic material comprising copper contained in the aqueous mixture prepared in (i) has a framework type CHA.
3. The process of embodiment 2, wherein from 95 to 100 weight-%, preferably from 98 to 100 weight-%, more preferably from 99 to 100 weight-% of the framework structure of the zeolitic material consist of Si, Al, and O, wherein in the framework structure, the molar ratio of Si to Al, calculated as molar $SiO_2:Al_2O_3$, is preferably in the range of from 2:1 to 50:1, more preferably in the range of from 5:1 to 45:1, more preferably in the range of from 10:1 to 35:1, more preferably in the range of from 16:1 to 28:1, more preferably in the range of from 16:1 to 19:1 or more preferably in the range of from 23:1 to 27:1.
4. The process of any one of embodiments 1 to 3, wherein the zeolitic material contained in the aqueous mixture prepared in (i), preferably which has a framework type CHA, has a mean crystallite size of at least 0.1 micrometer, preferably in the range of from 0.1 to 3.0 micrometers, more preferably in the range of from 0.3 to 1.5 micrometer, more preferably in the range of from 0.4 to 1.0 micrometer determined via scanning electron microscopy.
5. The process of any one of embodiments 1 to 4, wherein the amount of copper, calculated as CuO, comprised in the zeolitic material contained in the aqueous mixture prepared in (i) is in the range of from 0.05 to 3.5 weight-%, preferably in the range of from 0.1 to 3 weight-%, more preferably in the range of from 0.2 to 2 weight-%, more preferably in the range of from 0.5 to 1.75 weight-%, more preferably in the range of from 1 to 1.75 weight %, or more preferably in the range of from 1.9 to 2.5 weight-%, based on the weight of the zeolitic material comprised in the aqueous mixture prepared in (i).
6. The process of any one of embodiments 1 to 5, wherein the source of copper other than the zeolitic material comprising copper contained in the aqueous mixture prepared in (i) is selected from the group consisting of copper acetate, copper nitrate, copper sulfate, copper formate, copper oxide, and a mixture of two or more thereof, preferably selected from the group consisting of copper acetate, copper oxide, and a mixture of thereof, more preferably copper oxide, more preferably CuO.
7. The process of any one of embodiments 1 to 6, wherein the aqueous mixture prepared in (i) comprises the source of copper other than the zeolitic material comprising copper, calculated as CuO, at an amount in the range of from 0.1 to 14 weight-%, more preferably in the range of from 0.5 to 12 weight-%, preferably in the range of from 1 to 10 weight-%, more preferably in the range of from 1.5 to 5.0 weight-%, more preferably in the range of from 1.5 to 4.5 weight-%, based on the weight of the zeolitic material comprised in the aqueous mixture prepared in (i).
8. The process of embodiment 7, wherein the aqueous mixture prepared in (i) comprises the source of copper other than the zeolitic material comprising copper, calculated as CuO, at an amount in the range of from 2.0 to 4.0 weight-%, based on the weight of the zeolitic material comprised in the aqueous mixture prepared in (i).
9. The process of any one of embodiments 1 to 8, wherein the non-zeolitic oxidic material contained in the aqueous mixture prepared in (i) is selected from the group consisting of alumina, silica, and titania, a mixed oxide comprising one or more of Al, Si, and Ti and a mixture of two or more thereof, preferably selected from the group consisting of alumina, silica, a mixed oxide comprising one or more of Al and Si, and a mixture of two or more thereof, more preferably a mixture of alumina and silica; wherein more preferably from 80 to 99 weight-%, more preferably from 85 to 98 weight-%, more preferably from 90 to 98 weight-%, of the mixture of alumina and silica consist of alumina and more preferably from 1 to 20 weight-%, more preferably from 2 to 15 weight %, more preferably from 2 to 10 weight-% of the mixture of alumina and silica consist of silica.

10. The process of any one of embodiments 1 to 9, wherein the aqueous mixture prepared in (i) comprises the non-zeolitic oxidic material at an amount in the range of from 2 to 20 weight-%, preferably in the range of from 5 to 15 weight-%, more preferably in the range of from 7 to 13 weight-%, based on the weight of the zeolitic material comprised in the aqueous mixture prepared in (i).

11. The process of any one of embodiments 1 to 10, wherein in the aqueous mixture prepared in (i), from 10 to 90 weight-%, preferably from 40 to 85 weight-%, more preferably from 55 to 80 weight-%, of the aqueous mixture consist of water.

12. The process of any one of embodiments 1 to 11, wherein the aqueous mixture prepared in (i) further comprises a precursor of an oxidic component, wherein the precursor is preferably one or more of an aluminum salt, a silicon salt, a zirconium salt, and a titanium salt, more preferably one or more of a zirconium salt, and an aluminum salt, more preferably a zirconium salt, more preferably zirconium acetate;
wherein in the aqueous mixture prepared in (i), the amount of precursor calculated as oxide, preferably as alumina, silica, zirconia or titania, preferably of the zirconium salt calculated as $ZrO_2$, preferably is in the range of from 1 to 10 weight-%, more preferably in the range of from 2 to 8 weight-%, more preferably in the range 3 to 7 weight-%, based on the weight of the zeolitic material comprised in the aqueous mixture prepared in (i).

13. The process of any one of embodiments 1 to 12, wherein the aqueous mixture prepared in (i) further comprises particles of a carbon-containing additive;
wherein the carbon-containing additive contained in the aqueous mixture prepared in (i) preferably is one or more of graphite, synthetic graphite, carbon black, graphene, diamond, fullerene, carbon nanotubes and amorphous carbon, more preferably is one or more of graphite, synthetic graphite, graphene, fullerene, carbon nanotubes and amorphous carbon, more preferably one or more of graphite, synthetic graphite and graphene, more preferably one or more of graphite and synthetic graphite; and/or
wherein the particles of the carbon-containing additive comprised in the aqueous mixture prepared in (i) preferably have a Dv50 in the range of from 0.5 to 30 micrometers, more preferably in the range of from 2 to 15 micrometers, more preferably in the range of from 3 to 12 micrometers, more preferably in the range of from 4 to 10 micrometers, more preferably in the range of from 5 to 8 micrometers, the Dv50 being determined according to Reference Example 3 herein; and/or
wherein the particles of the carbon-containing additive comprised in the aqueous mixture prepared in (i) preferably have a Dv90 in the range of from 4 to 60 micrometers, more preferably in the range of from 6 to 30 micrometers, more preferably in the range of from 8 to 20 micrometers, more preferably in the range of from 9 to 14 micrometers, more preferably in the range of from 10 to 13 micrometers, the Dv90 being determined according to Reference Example 3 herein; and/or
wherein the aqueous mixture prepared in (i) preferably comprises the particles of the carbon-containing additive in an amount in the range of from 2 to 40 weight-%, more preferably in the range of from 4 to 30 weight-%, more preferably in the range of from 5 to 25 weight-%, more preferably in the range of from 5.5 to 15 weight-%, based on the weight of the zeolitic material and of the non-zeolitic oxidic material in the aqueous mixture prepared in (i).

14. The process of any one of embodiments 1 to 13, wherein the aqueous mixture prepared in (i) further comprises one or more additional non-zeolitic oxidic materials, wherein the one or more non-zeolitic oxidic materials are selected from the group consisting of alumina, silica, titania, zirconia, ceria, a mixed oxide comprising one or more of Al, Si, Ti, Zr, and Ce and a mixture of two or more thereof.

15. The process of any one of embodiments 1 to 14, wherein the aqueous mixture prepared in (i) further comprises one or more acids, preferably two acids, more preferably two organic acids, more preferably tartaric acid and acetic acid, at an amount preferably in the range of from 0.1 to 2 weight-%, preferably in the range of from 0.2 to 1.5 weight-%, more preferably in the range of from 0.4 to 1.2 weight-%, based on the weight of the zeolitic material comprised in the aqueous mixture prepared in (i).

16. The process of any one of embodiments 1 to 15, wherein from 98 to 100 weight-%, preferably from 99 to 100 weight-%, more preferably from 99.5 to 100 weight-%, more preferably from 99.9 to 100 weight-%, of the aqueous mixture prepared in (i) consist of water, the zeolitic material comprising copper, the source of copper other than the zeolitic material comprising copper, the non-zeolitic oxidic material selected from the group consisting of alumina, silica, titania, zirconia, ceria, a mixed oxide comprising one or more of Al, Si, Ti, Zr, and Ce and a mixture of two or more thereof, and preferably one or more acids as defined in embodiment 15.

17. The process of any one of embodiments 1 to 15, wherein from 98 to 100 weight-%, preferably from 99 to 100 weight-%, more preferably from 99.5 to 100 weight-%, more preferably from 99.9 to 100 weight-%, of the aqueous mixture prepared in (i) consist of water, the zeolitic material comprising copper, the source of copper other than the zeolitic material comprising copper, the non-zeolitic oxidic material selected from the group consisting of alumina, silica, titania, zirconia, ceria, a mixed oxide comprising one or more of Al, Si, Ti, Zr, and Ce and a mixture of two or more thereof, a precursor of an oxidic component as defined in embodiment 12, and preferably one or more acids as defined in embodiment 15.

18. The process of any one of embodiments 1 to 17, wherein (i) comprises
(i.1) preparing a first mixture comprising water and the source of copper other than the zeolitic material comprising copper;
(i.2) preferably milling the first mixture, more preferably until the particles of the first mixture have a Dv90 in the range of from 0.5 to 20 micrometers, the Dv90 being determined as described in Reference Example 3;
(i.3) optionally adding a precursor of an oxidic component as defined in embodiment 12 in the first mixture obtained according to (i.1), preferably (i.2);
(i.4) preparing a second mixture comprising water and the zeolitic material comprising copper;
(i.5) admixing the second mixture obtained in (i.4) with the first mixture obtained in (i.1), preferably in (i.2) or in (i.3), obtaining a third mixture;
(i.6) preparing a fourth mixture comprising water, the non-zeolitic oxidic material selected from the group consisting of alumina, silica, titania, zirconia, ceria, a mixed oxide comprising one or more of Al, Si, Ti, Zr, and Ce and a mixture of two or more thereof, and preferably comprising an acid, more preferably an organic acid, more preferably tartaric acid;
  (i.7) admixing the fourth mixture obtained in (i.6) with the third mixture obtained in (i.5), preferably adding an acid, more preferably an organic acid, more preferably acetic acid, and optionally adding particles of a carbon-containing additive as defined in embodiment 13 prior to the acid;
  wherein (i) optionally consists of (i.1) to (i.7).
19. The process of embodiment 18, wherein from 90 to 100 weight-%, preferably from 93 to 99 weight-%, more preferably from 96 to 99 weight-%, of the source of copper other than the zeolitic material comprising copper are present in the mixture prepared in (i.1) and (i.2) in non-dissolved state.
20. The process of embodiment 18 or 19, wherein milling in (i.2) is performed until the particles of the first mixture have a Dv90 in the range of from 4 to 15 micrometers, preferably in the range of from 6 to 12 micrometers, the Dv90 being determined as described in Reference Example 3.
21. The process of any one of embodiments 18 to 20, wherein the first mixture obtained in (i.1), preferably in (i.2), has a solid content in the range of from 4 to 30 weight-%, preferably in the range of from 4 to 15 weight-%, based on the weight of the first mixture; and/or wherein the second mixture obtained in (i.4) has a solid content in the range of from 15 to 50 weight-%, preferably in the range of from 20 to 45 weight-%, more preferably in the range of from 30 to 40 weight-%, based on the weight of the second mixture.
22. The process of any one of embodiments 18 to 21, wherein (i.5) further comprises milling the third mixture, preferably until the particles of the third mixture have a Dv90 in the range of from 0.5 to 20 micrometers, more preferably in the range of from 2 to 15 micrometers, more preferably in the range of from 2 to 10 micrometers, the Dv90 being determined as described in Reference Example 3.
23. The process of any one of embodiments 18 to 22, wherein the fourth mixture obtained in (i.6) has a solid content in the range of from 15 to 60 weight-%, preferably in the range of from 25 to 45 weight-%, more preferably in the range of from 28 to 40 weight-%, based on the weight of the fourth mixture.
24. The process of any one of embodiments 18 to 23, wherein the aqueous mixture obtained in (i), preferably in (i.7), has a solid content in the range of from 15 to 50 weight-%, preferably in the range of from 20 to 45 weight-%, more preferably in the range of from 30 to 40 weight-%, based on the weight of the aqueous mixture.
25. The process of any one of embodiments 1 to 24, wherein disposing the mixture according to (ii) is performed by spraying the mixture onto the substrate or by immersing the substrate into the mixture, preferably by immersing the substrate into the mixture.
26. The process of any one of embodiments 1 to 25, wherein the mixture according to (i) is disposed according to (ii) over x % of the substrate axial length from the inlet end to the outlet end of the substrate or from the outlet end to the inlet end of the substrate, wherein x is in the range of from 80 to 100, preferably in the range of from 90 to 100, more preferably in the range of from 95 to 100, more preferably in the range of from 98 to 100.
27. The process of any one of embodiments 1 to 26, wherein the substrate in (ii) is a wall-flow filter substrate, preferably one or more of a cordierite wall-flow filter substrate, a silicon carbide wall-flow filter substrate and an aluminum titanate wall-flow filter substrate, preferably one or more of a silicon carbide wall-flow filter substrate and an aluminum titanate wall-flow filter substrate, more preferably a silicon carbide wall-flow filter substrate.
28. The process of any one of embodiments 1 to 26, wherein the substrate in (ii) is a flow-through substrate, preferably one or more of a cordierite flow-through substrate, a silicon carbide flow-through substrate and an aluminum titanate flow-through substrate, more preferably one or more of a silicon carbide flow-through substrate and a cordierite flow-through substrate, more preferably a cordierite flow-through substrate.
29. The process of any one of embodiments 1 to 28, wherein drying according to (ii) is performed in a gas atmosphere having a temperature in the range of from 60 to 300° C., preferably in the range of from 90 to 150° C., the gas atmosphere preferably comprising oxygen.
30. The process of any one of embodiments 1 to 29, wherein drying according to (ii) is performed in a gas atmosphere for a duration in the range of from 10 minutes to 4 hours, preferably in the range of from 20 minutes to 3 hours, more preferably from 50 minutes to 2.5 hours, the gas atmosphere preferably comprising oxygen.
31. The process of any one of embodiments 1 to 30, wherein disposing according to (ii) comprises
  (ii.1) disposing a first portion of the mixture obtained in (i) on the surface of the internal walls of a substrate comprising an inlet end, an outlet end, a substrate axial length extending from the inlet end to the outlet end and a plurality of passages defined by internal walls of the substrate extending therethrough; and drying the substrate comprising the first portion of the mixture disposed thereon;
  (ii.2) disposing a second portion of the mixture obtained in (i) on the substrate comprising the first portion of the mixture disposed thereon obtained in (ii.1), and optionally drying the substrate comprising the first and the second portion of the mixture disposed thereon.
32. The process of embodiment 31, wherein prior to disposing a first portion of the mixture obtained in (i) on the surface of the internal walls of a substrate according to (ii.1), the mixture obtained in (i) is further diluted.
33. The process of embodiment 31 or 32, wherein prior to disposing a second portion of the mixture obtained in (i) on the surface of the internal walls of a substrate according to (ii.2), the mixture obtained in (i) is further diluted.
34. The process of any one of embodiments 31 to 33, wherein the first portion of the mixture according to (i) is disposed according to (ii.1) over x1% of the substrate axial length from the inlet end to the outlet end of the substrate or from the outlet end to the inlet end of the substrate, wherein x1 is in the range of from 80 to 100, preferably in the range of from 90 to 100, more preferably in the range of from 95 to 100, more preferably in the range of from 98 to 100.
35. The process of embodiment 34, wherein the second portion of the mixture according to (i) is disposed according to (ii.2) over x2% of the substrate axial length from the inlet end to the outlet end of the substrate or from the outlet end to the inlet end of the substrate, wherein x2 is in the range of from 80 to 100, preferably in the range of from 90 to 100, more preferably in the range of from 95 to 100, more preferably in the range of from 98 to 100, more preferably wherein x2 is x1.
36. The process of any one of embodiments 31 to 35, wherein drying according to (ii.1) is performed in a gas atmosphere having a temperature in the range of from 60 to 300° C., preferably in the range of from 90 to 150° C., the gas atmosphere preferably comprising oxygen.
37. The process of any one of embodiments 31 to 36, wherein drying according to (ii.1) is performed in a gas atmosphere for a duration in the range of from 10 minutes to 4 hours, preferably in the range of from 20 minutes to 3 hours, more preferably from 50 minutes to 2.5 hours, the gas atmosphere preferably comprising oxygen.
38. The process of any one of embodiments 31 to 37, wherein drying according to (ii.2) is performed in a gas atmosphere having a temperature in the range of from 60 to 300° C., preferably in the range of from 90 to 150° C., the gas atmosphere preferably comprising oxygen.
39. The process of any one of embodiments 31 to 38, wherein drying according to (ii.2) is performed in a gas atmosphere for a duration in the range of from 10 minutes to 4 hours, preferably in the range of from 20 minutes to 3 hours, more preferably from 50 minutes to 2.5 hours, the gas atmosphere preferably comprising oxygen.
40. The process of any one of embodiments 1 to 39, wherein calcining according to (iii) is performed in a gas atmosphere having a temperature in the range of from 300 to 900° C., preferably in the range of from 400 to 650° C., more preferably in the range of from 400 to 500° C. or more preferably in the range of from 550 to 600° C., the gas atmosphere preferably comprising oxygen.
41. The process of any one of embodiments 1 to 40, wherein calcining according to (iii) is performed in a gas atmosphere for a duration in the range of from 0.1 to 4 hours, preferably in the range of from 0.5 to 2.5 hours, the gas atmosphere preferably comprising oxygen.
42. The process of any one of embodiments 1 to 41, wherein the weight ratio of the copper comprised in the zeolitic material comprised in the substrate obtained in (iii), calculated as CuO, relative to the copper comprised in the zeolitic material comprised in the mixture according to (i), calculated as CuO, is in the range of from 1.5:1 to 10:1, preferably in the range of from 2:1 to 5:1, more preferably in the range of from 2:1 to 4:1.
43. The process of any one of embodiments 1 to 42 consisting of (i), (ii) and (iii).
44. A catalyst comprising a zeolitic material comprising copper, said catalyst being obtained or obtainable by a process according to any one of embodiments 1 to 43, preferably embodiment 43.
45. The catalyst of embodiment 44, wherein the amount of copper comprised in the catalyst, calculated as CuO, is in the range of from 2 to 10 weight-%, preferably in the range of from 2.5 to 5.5 weight-%, more preferably in the range of from 2.5 to 5 weight-% based on the weight of the zeolitic material.
46. The catalyst of embodiment 44 or 45, wherein from 75 to 100 weight-%, preferably from 78 to 100 weight-%, more preferably from 80 to 100 weight-%, of the copper comprised in the catalyst is comprised in the zeolitic material.
47. The catalyst of any one of embodiments 44 to 46, wherein the amount of copper in the zeolitic material comprised in the catalyst is higher than the amount of copper comprised in the zeolitic material contained in the mixture according to (i).
48. The catalyst of any one of embodiments 44 to 47, wherein the catalyst comprises the zeolitic material at a loading in the range of from 0.8 to 2.6 g/in$^3$, preferably in the range of from 1.2 to 2.2 g/in$^3$, more preferably in the range of from 1.5 to 2.2 g/in$^3$.
49. The catalyst of any one of embodiments 44 to 48, wherein the catalyst comprises the nonzeolitic oxidic material at a loading in the range of from 0.02 to 0.52 g/in$^3$, preferably in the range of from 0.1 to 0.42 g/in$^3$, more preferably in the range of from 0.1 to 0.21 g/in$^3$.
50. The catalyst of any one of embodiments 44 to 49, wherein the catalyst further comprises an oxidic component, wherein the oxidic component is selected from the group consisting of alumina, silica, zirconia, titania, a mixed oxide of two of more of Si, Al, Zr and Ti, and a mixture of two or more thereof, preferably selected from the group consisting of alumina, zirconia, a mixed oxide of Al and Zr, and a mixture of thereof, wherein the oxidic component is more preferably zirconia;
wherein the catalyst more preferably comprises the oxidic component at a loading in the range of from 0.2 to 0.26 g/in$^3$, more preferably in the range of from 0.4 to 0.2 g/in$^3$, more preferably in the range of from 0.06 to 0.14 g/in$^3$.
51. The catalyst of any one of embodiments 44 to 50, comprising a coating disposed on the surface of the internal walls of the substrate, the coating comprising the zeolitic material comprising copper, the non-zeolitic oxidic material, and optionally an oxidic component as defined in embodiment 50.
52. The catalyst of any one of embodiments 44 to 51, exhibiting an NOx activity, determined as defined in Example 2, higher than the NOx activity of a catalyst prepared by the same process except for step (i) which is replaced by (I1), wherein (I1) comprises preparing an aqueous mixture comprising water, a zeolitic material in its H-form, a source of copper, and a non-zeolitic oxidic material selected from the group consisting of alumina, silica, titania, zirconia, ceria, a mixed oxide comprising one or more of Al, Si, Ti, Zr, and Ce and a mixture of two or more thereof, wherein the amount of copper comprised in the aqueous mixture prepared in (I1), calculated as CuO, is equal to the amount of copper comprised in the aqueous mixture prepared in (i), wherein the amount of copper comprised in the aqueous mixture prepared in (i) includes the amount of copper comprised in the zeolitic material comprising copper used in (i) and the amount of copper from the source of copper used in (i).
53. The catalyst of any one of embodiments 44 to 52, having a NOx conversion activity, determined as defined in Example 2, which is higher than the NOx conversion activity, determined as defined in Example 2, of a catalyst comprising a zeolitic material comprising copper other than a catalyst obtained or obtainable by a process according to any one of embodiments 1 to 43, under the same conditions and with the same loadings.
54. The catalyst of any one of embodiments 44 to 53, wherein the zeolitic material comprising copper is the zeolitic material according to any one of embodiments 1" to 6" and 29" according to the third set of embodiments herein below.
55. The catalyst of any one of embodiments 44 to 54, wherein from 98 to 100 weight-%, preferably from 99 to 100 weight-%, more preferably from 99.5 to 100 weight-%, of the catalyst consist of the zeolitic material comprising copper, the non-zeolitic oxidic material selected from the group consisting of alumina, silica, titania, zirconia, ceria, a mixed oxide comprising one or more of Al, Si, Ti, Zr, and Ce and a mixture of two or more thereof, and the substrate; or
wherein from 98 to 100 weight-%, preferably from 99 to 100 weight-%, more preferably from 99.5 to 100 weight-%, of the catalyst consist of the zeolitic material comprising copper, the non-zeolitic oxidic material selected from the group consisting of alumina, silica, titania, zirconia, ceria, a mixed oxide comprising one or more of Al, Si, Ti, Zr, and Ce and a mixture of two or more thereof, the substrate, and an oxidic component as defined in embodiment 50.

56. Use of a catalyst according to any one of embodiments 44 to 55 for the selective catalytic reduction of nitrogen oxides.

57. A method for selectively catalytically reducing nitrogen oxides, wherein the nitrogen oxides are comprised in an exhaust gas stream, said method comprising
   (1) providing the exhaust gas stream, preferably from a compression ignition engine;
   (2) passing the exhaust gas stream provided in (1) through the catalyst according to any one of embodiments 44 to 55.

58. The process of any one of embodiments 1 to 43, wherein the aqueous mixture prepared according to (i) is the aqueous mixture according to any one of embodiments 1' to 19' according to the second set of embodiments herein below.

59. An exhaust gas treatment system for treating an exhaust gas stream exiting a compression ignition engine, said exhaust gas treatment system having an upstream end for introducing said exhaust gas stream into said exhaust gas treatment system, wherein said exhaust gas treatment system comprises a catalyst according to any one of embodiments 44 to 55, one or more of a diesel oxidation catalyst, a selective catalytic reduction catalyst, an ammonia oxidation catalyst, a NOx trap and a particulate filter.

60. The exhaust gas treatment system of embodiment 59, comprising a diesel oxidation catalyst disposed downstream of the engine and upstream of the catalyst according to any one of embodiments 44 to 55, wherein optionally said diesel oxidation catalyst contains a NOx storage functionality.

61. The exhaust gas treatment system of embodiment 60 further comprising one or more of a selective catalytic reduction catalyst and an ammonia oxidation catalyst disposed downstream of the catalyst according to any one of embodiments 44 to 55.

62. The exhaust gas treatment system of embodiment 60 or 61, further comprising a selective catalytic reduction catalyst disposed downstream of the diesel oxidation catalyst and upstream of the catalyst according to any one of embodiments 44 to 55.

The present invention is further illustrated by the following second set of embodiments and combinations of embodiments resulting from the dependencies and back-references as indicated. The second set of embodiments may be combined with the first set of embodiments above.

1'. An aqueous mixture comprising water, a zeolitic material comprising copper, a source of copper other than the zeolitic material comprising copper, and a non-zeolitic oxidic material selected from the group consisting of alumina, silica, titania, zirconia, ceria, a mixed oxide comprising one or more of Al Si, Ti, Zr, and Ce and a mixture of two or more thereof.

2'. The mixture of embodiment 1', wherein the zeolitic material comprising copper has a framework type selected from the group consisting of ABW, ACO, AEI, AEL, AEN, AET, AFG, AFI, AFN, AFO, AFR, AFS, AFT, AFV, AFX, AFY, AHT, ANA, APC, APD, AST, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA, -CHI, -CLO, CON, CSV, CZP, DAC, DDR, DFO, DFT, DOH, DON, EAB, EDI, EEI, EMT, EON, EPI, ERI, ESV, ETR, EUO, *-EWT, EZT, FAR, FAU, FER, FRA, GIS, GIU, GME, GON, GOO, HEU, IFO, IFR, -IFU, IFW, IFY, IHW, IMF, IRN, IRR, -IRY, ISV, ITE, ITG, ITH, *-ITN, ITR, ITT, -ITV, ITW, IWR, IWS, IWV, IWW, JBW, JNT, JOZ, JRY, JSN, JSR, JST, JSW, KFI, LAU, LEV, LIO, -LIT, LOS, LOV, LTA, LTF, LTJ, LTL, LTN, MAR, MAZ, MEI, MEL, MEP, MER, MFI, MFS, MON, MOR, MOZ, *MRE, MSE, MSO, MTF, MTN, MTT, MTW, MVY, MWF, MWW, NAB, NAT, NES, NON, NPO, NPT, NSI, OBW, OFF, OKO, OSI, OSO, OWE, -PAR, PAU, PCR, PHI, PON, POS, PSI, PUN, RHO, -RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, *SFV, SFW, SGT, SIV, SOD, SOF, SOS, SSF, *-SSO, SSY, STF, STI, *STO, STT, STW, -SVR, SVV, SZR, TER, THO, TOL, TON, TSC, TUN, UEI, UFI, UOS, UOV, UOZ, USI, UTL, UWY, VET, VFI, VNI, VSV, WEI, -WEN, YUG, ZON, a mixture of two or more thereof, and a mixed type of two or more thereof, preferably selected from the group consisting of CHA, AEI, RTH, LEV, DDR, KFI, ERI, AFX, a mixture of two or more thereof and a mixed type of two or more thereof, more preferably selected from the group consisting of CHA, AEI, RTH, AFX, a mixture of two or more thereof and a mixed type of two or more thereof, more preferably selected from the group consisting of CHA and AEI, wherein the zeolitic material comprising copper has a framework type CHA.

3'. The mixture of embodiment 2', wherein from 95 to 100 weight-%, preferably from 98 to 100 weight-%, more preferably from 99 to 100 weight-% of the framework structure of the zeolitic material consist of Si, Al, and O, wherein in the framework structure, the molar ratio of Si to Al, calculated as molar $SiO_2:Al_2O_3$, is preferably in the range of from 2:1 to 50:1, more preferably in the range of from 5:1 to 45:1, more preferably in the range of from 10:1 to 35:1, more preferably in the range of from 16:1 to 28:1, more preferably in the range of from 16:1 to 19:1 or more preferably in the range of from 23:1 to 27:1.

4'. The mixture of any one of embodiments 1' to 3', wherein the zeolitic material, preferably which has a framework type CHA, has a mean crystallite size of at least 0.1 micrometer, preferably in the range of from 0.1 to 3.0 micrometers, more preferably in the range of from 0.3 to 1.5 micrometer, more preferably in the range of from 0.4 to 1.0 micrometer determined via scanning electron microscopy.

5'. The mixture of any one of embodiments 1' to 4', wherein the amount of copper comprised in the zeolitic material, calculated as CuO, is in the range of from 0.05 to 3.5 weight-%, preferably in the range of from 0.1 to 3 weight-%, more preferably in the range of from 0.2 to 2 weight-%, more preferably in the range of from 0.5 to 1.75 weight-%, more preferably in the range of from 1 to 1.75 weight-%, or more preferably in the range of from 1.9 to 2.5 weight-%, based on the weight of the zeolitic material.

6'. The mixture of any one of embodiments 1' to 5', wherein the source of copper other than the zeolitic material comprising copper is selected from the group consisting of copper acetate, copper nitrate, copper sulfate, copper formate, copper oxide, and a mixture of two or more thereof, preferably selected from the group consisting of copper acetate, copper oxide, and a mixture of two or more thereof, more preferably copper oxide, more preferably CuO.

7'. The mixture of any one of embodiments 1' to 6', wherein the aqueous mixture comprises the source of copper other than the zeolitic material comprising copper, calculated as CuO, at an amount in the range of from 0.1 to 14 weight-%, preferably in the range of from 0.5 to 12 weight-%, preferably in the range of from 1 to 10 weight-%, more preferably in the range of from 1.5 to 5 weight-%, based on the weight of the zeolitic material.

8'. The mixture of embodiment 7', wherein the aqueous mixture comprises the source of copper other than the zeolitic material comprising copper, calculated as CuO, at an amount in the range of from 1.5 to 4 weight-%, based on the weight of the zeolitic material.

9'. The mixture of any one of embodiments 1' to 8', wherein the non-zeolitic oxidic material is selected from the group consisting of alumina, silica and titania, a mixed oxide comprising one or more of Al, Si, and Ti and a mixture of two or more thereof, preferably selected from the group consisting of alumina, silica, a mixed oxide comprising one or more of Al and Si, and a mixture of two thereof, more preferably a mixture of alumina and silica; wherein more preferably from 80 to 99 weight-%, more preferably from 85 to 98 weight-%, more preferably from 90 to 98 weight-%, of the mixture of alumina and silica consist of alumina and more preferably from 1 to 20 weight-%, more preferably from 2 to 15 weight %, more preferably from 2 to 10 weight-% of the mixture of alumina and silica consist of silica.

10'. The mixture of any one of embodiments 1' to 9', wherein the aqueous mixture comprises the non-zeolitic oxidic material at an amount in the range of from 2 to 20 weight-%, preferably in the range of from 5 to 15 weight-%, more preferably in the range of from 7 to 13 weight-%, based on the weight of the zeolitic material.

11'. The mixture of any one of embodiments 1' to 10', wherein from 10 to 90 weight-%, preferably from 40 to 85 weight-%, more preferably from 55 to 80 weight-%, of the aqueous mixture consist of water 12'. The mixture of any one of embodiments 1' to 11' further comprising a precursor of oxidic component, wherein the precursor is preferably one or more of an aluminum salt, a silicon salt, a zirconium salt, and a titanium salt, more preferably one or more of a zirconium salt, and an aluminum salt, more preferably a zirconium salt, more preferably zirconium acetate;

wherein in the aqueous mixture, the amount of precursor calculated as oxide, preferably as alumina, silica, zirconia or titania, more preferably of the zirconium salt calculated as $ZrO_2$, is in the range of from 1 to 10 weight-%, preferably in the range of from 2 to 8 weight-%, more preferably in the range 3 to 7 weight-%, based on the weight of the zeolitic material.

13'. The mixture of any one of embodiments 1' to 12', further comprising particles of a carbon-containing additive;

wherein the carbon-containing additive contained in the mixture preferably is one or more of graphite, synthetic graphite, carbon black, graphene, diamond, fullerene, carbon nanotubes and amorphous carbon, more preferably is one or more of graphite, synthetic graphite, graphene, fullerene, carbon nanotubes and amorphous carbon, more preferably one or more of graphite, synthetic graphite and graphene, more preferably one or more of graphite and synthetic graphite; and/or wherein the particles of the carbon-containing additive comprised in the mixture preferably have a Dv50 in the range of from 0.5 to 30 micrometers, more preferably in the range of from 2 to 15 micrometers, more preferably in the range of from 3 to 12 micrometers, more preferably in the range of from 4 to 10 micrometers, more preferably in the range of from 5 to 8 micrometers, the Dv50 being determined according to Reference Example 3 herein; and/or wherein the particles of the carbon-containing additive comprised in the mixture preferably have a Dv90 in the range of from 4 to 60 micrometers, more preferably in the range of from 6 to 30 micrometers, more preferably in the range of from 8 to 20 micrometers, more preferably in the range of from 9 to 14 micrometers, more preferably in the range of from 10 to 13 micrometers, the Dv90 being determined according to Reference Example 3 herein; and/or wherein the mixture comprises the particles of the carbon-containing additive in an amount in the range of from 2 to 40 weight-%, preferably in the range of from 4 to 30 weight-%, more preferably in the range of from 5 to 25 weight-%, more preferably in the range of from 5.5 to 15 weight-%, based on the weight of the zeolitic material and of the non-zeolitic oxidic material in the mixture.

14'. The mixture of any one of embodiments 1' to 13', wherein the aqueous mixture further comprises one or more additional non-zeolitic oxidic materials, wherein the one or more non-zeolitic oxidic materials are selected from the group consisting of alumina, silica, titania, zirconia, ceria, a mixed oxide comprising one or more of Al, Si, Ti, Zr, and Ce and a mixture of two or more thereof.

15'. The mixture of any one of embodiments 1' to 14' further comprising one or more acids, preferably two acids, more preferably two organic acids, more preferably tartaric acid and acetic acid, at an amount preferably in the range of from 0.1 to 2 weight-%, more preferably in the range of from 0.2 to 1 weight-%, based on the weight of the zeolitic material.

16'. The mixture of any one of embodiments 1' to 15' having a solid content in the range of from 15 to 50 weight-%, preferably in the range of from 20 to 45 weight-%, more preferably in the range of from 30 to 40 weight-%, based on the weight of the mixture.

17'. The mixture of any one of embodiments 1' to 16', wherein from 98 to 100 weight-%, preferably from 99 to 100 weight-%, more preferably from 99.5 to 100 weight-%, more preferably from 99.9 to 100 weight-%, of the mixture consist of water, the zeolitic material comprising copper, the source of copper other than the zeolitic material comprising copper, the non-zeolitic oxidic material selected from the group consisting of alumina, silica, titania, zirconia, ceria, a mixed oxide comprising one or more of Al, Si, Ti, Zr, and Ce and a mixture of two or more thereof, and preferably one or more acids as defined in embodiment 15'.

18'. The mixture of any one of embodiments 1' to 16', wherein from 98 to 100 weight-%, preferably from 99 to 100 weight-%, more preferably from 99.5 to 100 weight-%, more preferably from 99.9 to 100 weight-%, of the mixture consist of water, the zeolitic material comprising copper, the source of copper other than the zeolitic material comprising copper, the non-zeolitic oxidic material selected from the group consisting of alumina, silica, titania, zirconia, ceria, a mixed oxide comprising one or more of Al, Si, Ti, Zr, and Ce and a mixture of two or more thereof, a precursor of an oxidic component as defined in embodiment 12' and preferably one or more acids as defined in embodiment 15'.

19'. The mixture of any one of embodiments 1' to 18', wherein the mixture is the aqueous mixture prepared in (i) in the process according to any one of embodiments 1 to 44 according to the first set of embodiments above.

20'. A process for preparing the mixture according to any one of embodiments 1' to 19', the process comprising
  (i.1) preparing a first mixture comprising water and the source of copper other than the zeolitic material comprising copper;
  (i.2) optionally a precursor of an oxidic component as defined in embodiment 12' in the first mixture obtained according to (i.1);
  (i.3) preparing a second mixture comprising water and the zeolitic material comprising copper;
  (i.4) admixing the second mixture obtained in (i.3) with the first mixture obtained in (i.1), or in (i.2), obtaining a third mixture;
  (i.5) preparing a fourth mixture comprising water, the non-zeolitic oxidic material selected from the group consisting of alumina, silica, titania, zirconia, ceria, a mixed oxide comprising one or more of Al, Si, Ti, Zr, and Ce and a mixture of two or more thereof, and preferably comprising an acid, more preferably an organic acid, more preferably tartaric acid;
  (i.6) admixing the fourth mixture obtained in (i.5) with the third mixture obtained in (i.4), preferably adding an acid, more preferably an organic acid, more preferably acetic acid, and optionally adding particles of a carbon-containing additive as defined in embodiment 13' prior to the acid.

21'. The process of embodiment 20', wherein from 90 to 100 weight-%, preferably from 95 to 100 weight-%, more preferably from 96 to 99 weight-%, of the source of copper other than the zeolitic material comprising copper are present in the mixture prepared in (i.1) in non-dissolved state.

22'. The process of embodiment 20' or 21', wherein (i.1) further comprises milling the first mixture, preferably until the particles of the first mixture have a Dv90 in the range of from 0.5 to 20 micrometers, more preferably in the range of from 4 to 15 micrometers, more preferably in the range of from 6 to 12 micrometers, the Dv90 being determined as described in Reference Example 3.

23'. The process of any one of embodiments 20' to 22', wherein the first mixture obtained in (i.1) has a solid content in the range of from 4 to 30 weight-%, preferably in the range of from 4 to 15 weight-%, based on the weight of the first mixture.

24'. The process of any one of embodiments 20' to 23', wherein the second mixture obtained in (i.3) has a solid content in the range of from 15 to 50 weight-%, preferably in the range of from 20 to 45 weight-%, more preferably in the range of from 30 to 40 weight-%, based on the weight of the second mixture.

25'. The process of any one of embodiments 20' to 24', wherein (i.4) further comprises milling the third mixture, preferably until the particles of the third mixture have a Dv90 in the range of from 0.5 to 20 micrometers, more preferably in the range of from 2 to 15 micrometers, more preferably in the range of from 2 to 10 micrometers, the Dv90 being determined as described in Reference Example 3.

26'. The process of any one of embodiments 20' to 25', wherein the fourth mixture obtained in (i.5) has a solid content in the range of from 15 to 50 weight-%, preferably in the range of from 20 to 45 weight-%, more preferably in the range of from 28 to 40 weight-%, based on the weight of the fourth mixture.

27'. The process of any one of embodiments 20' to 26', wherein the aqueous mixture obtained in (i), preferably in (i.6), has a solid content in the range of from 15 to 50 weight-%, preferably in the range of from 20 to 45 weight-%, more preferably in the range of from 30 to 40 weight-%, based on the weight of the aqueous mixture.

28'. The process of any one of embodiments 20' to 27' consisting of (i.1), (i.2), (i.3), (i.4), (i.5) and (i.6).

29'. An aqueous mixture obtained or obtainable by a process according to any one of embodiments 20' to 28', preferably embodiment 28'.

30'. Use of the aqueous mixture according to any one of embodiments 1' to 19' and 29' for preparing a catalyst, preferably a selective catalytic reduction catalyst.

31'. A method for preparing a catalyst, preferably a selective catalytic reduction catalyst, the method comprising using the aqueous mixture according to any one of embodiments 1' to 19' and 29'.

The present invention is further illustrated by the following third set of embodiments and combinations of embodiments resulting from the dependencies and back-references as indicated. The third set of embodiments may be combined with any one of the first set of embodiments and the second set of embodiments above.

1". A zeolitic material having a framework type CHA and comprising copper, wherein the framework structure of the zeolitic material comprises Si, Al, and O, exhibiting an IR-spectrum, determined as described in Example 12, comprising:
  a first absorption peak (P1) having a maximum in the range of from 930 to 975 $cm^{-1}$, preferably in the range of from 935 to 970 $cm^{-1}$, more preferably in the range of from 945 to 965 $cm^{-1}$;
  a second absorption peak (P2) having a maximum in the range of from 880 to 920 $cm^{-1}$, preferably in the range of from 885 to 915 $cm^{-1}$, more preferably in the range of from 890 to 910 $cm^{-1}$;
  wherein the peak area of the first absorption peak relative to the peak area of the second absorption peak, P1:P2, is in the range of from 0.2:1 to 1.55:1, preferably in the range of 0.5:1 to 1.53:1, more preferably in the range of from 1.05:1 to 1.53:1, more preferably in the range of from 1.07:1 to 1.45:1, more preferably in the range of from 1.10:1 to 1.40:1, more preferably in the range of from 1.12:1 to 1.35:1, more preferably in the range of from 1.15:1 to 1.32:1.

2". The zeolitic material of embodiment 1", wherein from 95 to 100 weight-%, preferably from 98 to 100 weight-%, more preferably from 99 to 100 weight-%, of the framework structure of the zeolitic material consist of Si, Al, and O, wherein in the framework structure, the molar ratio of Si to Al, calculated as molar $SiO_2:Al_2O_3$, is preferably in the range of from 2:1 to 50:1, more preferably in the range of from 5:1 to 45:1, more preferably in the range of from 10:1 to 35:1, more preferably in the range of from 16:1 to 28:1, more preferably in the range of from 16:1 to 19:1 or more preferably in the range of from 23:1 to 27:1.

3". The zeolitic material of embodiment 1" or 2", wherein the zeolitic material has a mean crystallite size of at least 0.1 micrometer, preferably in the range of from 0.1 to 3.0 micrometers, more preferably in the range of from 0.3 to 1.5 micrometer, more preferably in the range of from 0.4 to 1.0 micrometer determined via scanning electron microscopy.

4". The zeolitic material of any one of embodiments 1" to 3", wherein the amount of copper comprised in the zeolitic material, calculated as CuO, is in the range of from 1 to 10 weight-%, preferably in the range of from 1.5 to 5 weight-%, more preferably in the range of from 1.5 to 4 weight-%, based on the weight of the zeolitic material.

5". The zeolitic material of any one of embodiments 1" to 4", wherein the ratio of the peak area of the first absorption peak relative to the sum of the peak areas of all absorption peaks having a maximum in the wavelength range of from 890 to 965 cm$^{-1}$, is in the range of from 0.05:1 to 0.50:1, preferably in the range of 0.08:1 to 0.5:1, more preferably in the range of from 0.1:1 to 0.5:1, more preferably in the range of from 0.15:1 to 0.49:1, more preferably in the range of from 0.25:1 to 0.48:1, more preferably in the range of from 0.30:1 to 0.45:1, more preferably in the range of from 0.40:1 to 0.45:1.

6". The zeolitic material of any one of embodiments 1" to 5" having a BET specific surface area in the range of from 400 to 800 m$^2$/g, preferably in the range of from 500 to 700 m$^2$/g, the BET specific surface area being determined as described in Reference Example 1.

7". A process for preparing the zeolitic material according to any one of embodiments 1" to 6", the process comprising
(i) preparing an aqueous mixture comprising water, a zeolitic material having a framework type CHA and comprising copper, and a source of copper other than the zeolitic material comprising copper;
(ii) optionally drying the mixture obtained in (i);
(iii) calcining the mixture obtained in (i), or in (ii).

8". The process of embodiment 7", wherein from 95 to 100 weight-%, preferably from 98 to 100 weight-%, more preferably from 99 to 100 weight-% of the framework structure of the zeolitic material consist of Si, Al, and O, wherein in the framework structure, the molar ratio of Si to Al, calculated as molar SiO$_2$:Al$_2$O$_3$, is preferably in the range of from 2:1 to 50:1, more preferably in the range of from 5:1 to 45:1, more preferably in the range of from 10:1 to 35:1, more preferably in the range of from 16:1 to 28:1, more preferably in the range of from 16:1 to 19:1 or more preferably in the range of from 23:1 to 27:1.

9". The process of embodiment 7" or 8", wherein the zeolitic material contained in the aqueous mixture prepared in (i) has a mean crystallite size of at least 0.1 micrometer, preferably in the range of from 0.1 to 3.0 micrometers, more preferably in the range of from 0.3 to 1.5 micrometer, more preferably in the range of from 0.4 to 1.0 micrometer determined via scanning electron microscopy.

10". The process of any one of embodiments 7" to 9", wherein the amount of copper comprised in the zeolitic material contained in the aqueous mixture prepared in (i), calculated as CuO, is in the range of from 0.1 to 3 weight-%, preferably in the range of from 0.2 to 2 weight-%, more preferably in the range of from 0.5 to 1.75 weight-%, based on the weight of the zeolitic material comprised in the aqueous mixture prepared in (i).

11". The process of any one of embodiments 7" to 10", wherein the source of copper other than the zeolitic material comprising copper is selected from the group consisting of copper acetate, copper nitrate, copper sulfate, copper formate, copper oxide, and a mixture of two or more thereof, preferably selected from the group consisting of copper acetate, copper oxide, and a mixture of two or more thereof, more preferably copper oxide, more preferably CuO.

12". The process of any one of embodiments 7" to 11", wherein the aqueous mixture prepared in (i) comprises the source of copper other than the zeolitic material comprising copper, calculated as CuO, at an amount in the range of from 1 to 10 weight-%, preferably in the range of from 1.5 to 5 weight-%, based on the weight of the zeolitic material comprised in the aqueous mixture prepared in (i).

13". The process of embodiment 12", wherein the aqueous mixture prepared in (i) comprises the source of copper other than the zeolitic material comprising copper, calculated as CuO, at an amount in the range of from 1.5 to 4.5 weight-%, preferably in the range of from 1.5 to 4 weight-%, based on the weight of the zeolitic material comprised in the aqueous mixture prepared in (i).

14". The process of any one of embodiments 7" to 13", wherein in the aqueous mixture prepared in (i), from 10 to 90 weight-%, preferably from 40 to 85 weight-%, more preferably from 55 to 80 weight-%, of the aqueous mixture consist of water.

15". The process of any one of embodiments 7" to 14", wherein the aqueous mixture prepared in (i) further comprises a precursor of an oxidic component, wherein the precursor is preferably one or more of an aluminum salt, a silicon salt, a zirconium salt, and a titanium salt, more preferably one or more of a zirconium salt, and an aluminum salt, more preferably a zirconium salt, more preferably zirconium acetate.

16". The process of embodiment 15", wherein, in the aqueous mixture prepared in (i), the amount of precursor calculated as oxide, preferably as alumina, silica, zirconia or titania, more preferably of the zirconium salt calculated as ZrO$_2$, is in the range of from 1 to 10 weight-%, preferably in the range of from 2 to 8 weight-%, more preferably in the range 3 to 7 weight-%, based on the weight of the zeolitic material comprised in the aqueous mixture prepared in (i).

17". The process of any one of embodiments 7" to 16", wherein from 98 to 100 weight-%, preferably from 99 to 100 weight-%, more preferably from 99.5 to 100 weight-%, more preferably from 99.9 to 100 weight-%, of the aqueous mixture prepared in (i) consist of water, the zeolitic material comprising copper, and the source of copper other than the zeolitic material comprising copper.

18". The process of any one of embodiments 7" to 16", wherein from 98 to 100 weight-%, preferably from 99 to 100 weight-%, more preferably from 99.5 to 100 weight-%, more preferably from 99.9 to 100 weight-%, of the aqueous mixture prepared in (i) consist of water, the zeolitic material comprising copper, the source of copper other than the zeolitic material comprising copper, and a precursor of an oxidic component as defined in embodiment 15" or 16".

19". The process of any one of embodiments 7" to 18", wherein (i) comprises
(i.1) preparing a first mixture comprising water and the source of copper other than the zeolitic material comprising copper;
(i.2) preferably milling the first mixture, more preferably until the particles of the first mixture have a Dv90 in the range of from 0.5 to 20 micrometers, the Dv90 being determined as in Reference Example 3; and optionally adding a precursor of an oxidic component as defined in embodiment 15" or 16";

(i.3) preparing a second mixture comprising water and the zeolitic material comprising copper;

(i.4) admixing the second mixture obtained in (i.3) with the first mixture obtained in (i.1), preferably in (i.2).

20". The process of embodiment 19", wherein from 90 to 100 weight-%, preferably from 95 to 100 weight-%, more preferably from 98 to 100 weight-%, of the source of copper other than the zeolitic material comprising copper are present in the mixture prepared in (i.1) in non-dissolved state.

21". The process of embodiment 19" or 20", wherein milling in (i.2) is performed until the particles of the first mixture have a Dv90 in the range of from 4 to 15 micrometers, preferably in the range of from 6 to 12 micrometers, the Dv90 being determined as in Reference Example 3.

22". The process of any one of embodiments 19" to 21", wherein (i.4) further comprises milling the mixture obtained in (i.4), preferably until the particles of said mixture have a Dv90 in the range of from 0.5 to 20 micrometers, more preferably in the range of from 2 to 15 micrometers, more preferably in the range of from 2 to 10 micrometers, the Dv90 being determined as in Reference Example 3.

23". The process of any one of embodiments 7" to 22", wherein drying according to (ii) is performed in a gas atmosphere having a temperature in the range of from 100 to 200° C., preferably in the range of from 120 to 140° C., the gas atmosphere preferably comprising oxygen.

24". The process of any one of embodiments 7" to 23", wherein drying according to (ii) is performed in a gas atmosphere for a duration in the range of from 0.25 to 3 hours, preferably in the range of from 0.5 to 1.5 hours, the gas atmosphere preferably comprising oxygen.

25". The process of any one of embodiments 7" to 24", wherein calcining according to (iii) is performed in a gas atmosphere having a temperature in the range of from 300 to 900° C., preferably in the range of from 400 to 500° C., the gas atmosphere preferably comprising oxygen.

26". The process of any one of embodiments 7" to 25", wherein calcining according to (iii) is performed in a gas atmosphere for a duration in the range of from 0.5 to 8 hours, preferably in the range of from 1.5 to 3 hours, the gas atmosphere preferably comprising oxygen.

27". The process of any one of embodiments 7" to 26", wherein the weight ratio of the copper comprised in the zeolitic material obtained in (iii), calculated as CuO, relative to the copper comprised in the zeolitic material comprised in the mixture according to (i), calculated as CuO, is in the range of from 1.5:1 to 10:1, preferably in the range of from 2:1 to 5:1, more preferably in the range of from 2:1 to 4:1.

28". The process of any one of embodiments 7" to 27" consisting of (i), (ii) and (iii).

29". A zeolitic material having a framework type CHA and comprising copper, preferably the zeolitic material according to any one of embodiments 1" to 6", obtained or obtainable by a process according to any one of embodiments 7" to 28".

30". Use of a zeolitic material according to any one of embodiments 1" to 6" and 29" as a catalyst or as a catalytic article, preferably for the selective catalytic reduction of nitrogen oxides.

31". The zeolitic material of any one of embodiments 1" to 6" and 29", is comprised in the catalyst according to any one of embodiments 44 to 55 according to the first set of embodiments above.

The present invention is further illustrated by the following Reference Examples, Comparative Examples, and Examples.

EXAMPLES

Reference Example 1 Measurement of the BET Specific Surface Area

The BET specific surface area was determined according to DIN 66131 or DIN-ISO 9277 using liquid nitrogen.

Reference Example 2 Measurement of the Average Porosity and the Average Pore Size of the Porous Wall-Flow Substrate The average porosity of the porous wall-flow substrate was determined by mercury intrusion using mercury porosimetry according to DIN 66133 and ISO 15901-1.

Reference Example 3 Determination of the Volume-Based Particle Size Distributions The particle size distributions were determined by a static light scattering method using Sympatec HELOS (3200) & QUIXEL equipment, wherein the optical concentration of the sample was in the range of from 6 to 10%.

Reference Example 4: Cu-Chabazite Prepared According to Usual Liquid Phase Ion-Exchange (LPIE) Process The zeolitic materials having the framework structure type CHA comprising Cu and used in some of the examples herein were prepared essentially as disclosed in U.S. Pat. No. 8,293,199 B2. Particular reference is made to Inventive Example 2 of U.S. Pat. No. 8,293,199 B2, column 15, lines 26 to 52.

Comparative Example 1: Process for Preparing a Catalyst Comprising a Zeolitic Material Comprising Copper not According to the Present Invention Slurry 1:

Cu-Chabazite with a Cu content of 3.4 weight-%, calculated as CuO, based on the weight of the Chabazite (Dv50 of 20 micrometers, a $SiO_2:Al_2O_3$ molar ratio of 25, a primary particle size of less than 0.5 micrometer and a BET specific surface area of about 600 $m^2/g$), prepared as described in Reference Example 4, was dispersed in water. The obtained mixture had a solid content of 40 weight-% based on the weight of said mixture. The resulting mixture was milled using a continuous milling apparatus so that the Dv90 value of the particles of the mixture was of 5 micrometers.

Slurry 2:

Separately, an aqueous slurry having a solid content of 30 weight-% based on the weight of said slurry and comprising water and alumina ($Al_2O_3$ 94 weight-% with $SiO_2$ 6 weight-% having a BET specific surface area of 173 $m^2/g$, a Dv90 of about 5 micrometers) was prepared. The amount of alumina+silica was calculated such that the amount of alumina+silica after calcination was 10 weight-% based on the weight of the Chabazite after calcination. Tartaric acid was added to the aqueous slurry. The amount of tartaric acid was calculated such that it was 0.7 weight-% based on the weight of the alumina+silica in the coating after calcination.

Subsequently, slurry 1 and slurry 2 were combined. Acetic acid was added to the obtained slurry. The amount of acetic acid was calculated such that it was 1 weight-% based on the weight of the Cu-Chabazite. The solid content of the final slurry was adjusted to 34 weight-% based on the weight of said slurry.

A porous uncoated wall-flow filter substrate, silicon carbide, (an average porosity of 63%, a mean pore size of 20 micrometers and 300 CPSI and 12 mil wall thickness, diameter: 165.1 mm *length: 140.5 mm) was coated twice from the inlet end to the outlet end with the final slurry over 100% of the substrate axial length. To do so, the substrate was dipped in the final slurry from the inlet end until the slurry arrived at the top of the substrate. Further a pressure pulse was applied on the inlet end to distribute the slurry evenly in the substrate. Further, the coated substrate was dried at 130° C. for 2 hours and calcined at 450° C. for 2 hours. This was repeated once. The final coating loading after calcinations was 2.0 g/in$^3$, including about 1.76 g/in$^3$ of Chabazite, 0.18 g/in$^3$ of alumina+silica, and 3.4 weight-% of Cu, calculated as CuO, based on the weight of the Chabazite.

Comparative Example 2: Process for Preparing a Catalyst Comprising a Zeolitic Material Comprising Copper not According to the Present Invention Slurry 1:
A CuO powder having a Dv50 of 33 micrometers was added to water. The amount of CuO was calculated such that the total amount of copper in the coating after calcination was of 3.5 weight-%, calculated as CuO, based on the weight of the Chabazite. The resulting mixture was milled using a continuous milling apparatus so that the Dv50 value of the particles was about 2.5 micrometers and the Dv90 value of the particles was about 9 micrometers. The resulting slurry had a solid content of 5 weight-% based on the weight of said slurry. An aqueous zirconium acetate solution was added to the CuO-containing mixture forming a slurry. The amount of zirconium acetate was calculated such that the amount of zirconia in the coating, calculated as $ZrO_2$, was 5 weight-% based on the weight of the Chabazite. Separately, a H-Chabazite (Dv50 of 20 micrometers, a $SiO_2:Al_2O_3$ of 25, a primary particle size of less than 0.5 micrometer and a BET specific surface area of about 600 m$^2$/g) was added to water to form a mixture having a solid content of 38 weight-% based on the weight of said mixture. The Cu-Chabazite mixture was mixed to the copper containing slurry. The amount of the Cu-Chabazite was calculated such that the loading of Chabazite after calcination was 84.4% of the loading of the coating in the catalyst after calcination. The resulting slurry was milled using a continuous milling apparatus so that the Dv90 value of the particles was of about 5 micrometers.

Slurry 2:
This slurry was prepared as slurry 2 in Comparative Example 1.

Subsequently, slurry 1 and slurry 2 were combined. Acetic acid was added to the obtained slurry. The amount of acetic acid was calculated such that it was 1 weight-% based on the weight of the Chabazite+Cu. The solid content of the final slurry was adjusted to 34 weight-% based on the weight of said slurry.

A porous uncoated wall-flow filter substrate, silicon carbide, (an average porosity of 63%, a mean pore size of 20 micrometers and 300 CPSI and 12 mil wall thickness, diameter: 165.1 mm *length: 140.5 mm) was coated twice from the inlet end to the outlet end with the final slurry over 100% of the substrate axial length. To do so, the substrate was dipped in the final slurry from the inlet end until the slurry arrived at the top of the substrate. Further a pressure pulse was applied on the inlet end to distribute the slurry evenly in the substrate. Further, the coated substrate was dried at 130° C. for 2 hours and calcined at 450° C. for 2 hours.

This was repeated once. The final coating loading after calcinations was 2.0 g/in$^3$, including 1.688 g/in$^3$ of Chabazite, 0.0844 of zirconia, 0.1688 of alumina+silica and 3.5 weight-% of Cu, calculated as CuO, based on the weight of Chabazite.

Example 1: Process for Preparing a Catalyst Comprising a Zeolitic Material Comprising Copper Slurry 1:
A CuO powder having a Dv50 of 33 micrometers was added to water. The amount of CuO was calculated such that the total amount of copper, calculated as CuO, in the coating after calcination was 3.5 weight-% based on the weight of the Chabazite. The resulting mixture was milled using a continuous milling apparatus so that the Dv50 value of the particles was about 2.5 micrometers and the Dv90 value of the particles was about 9 micrometers. The resulting slurry had a solid content of 5 weight-% based on the weight of said slurry. An aqueous zirconium acetate solution was added to the CuO-containing mixture forming a slurry. The amount of zirconium acetate was calculated such that the amount of zirconia in the coating, calculated as $ZrO_2$, was 5 weight-% based on the weight of the Chabazite. Separately, a Cu-Chabazite with a Cu content of 1.30 weight-%, calculated as CuO, based on the weight of the Chabazite (Dv50 of 20 micrometers, a $SiO_2:Al_2O_3$ of 25, a primary particle size of less than 0.5 micrometer and a BET specific surface area of about 600 m$^2$/g), prepared as described in Reference Example 4, was added to water to form a mixture having a solid content of 34 weight-% based on the weight of said mixture. The Cu-Chabazite mixture was mixed to the copper containing slurry. The amount of the Cu-Chabazite was calculated such that the loading of Chabazite after calcination was 84.2% of the loading of the coating in the catalyst after calcination. The resulting slurry was milled using a continuous milling apparatus so that the Dv90 value of the particles was of about 5 micrometers.

Slurry 2:
Separately, an aqueous slurry having a solid content of 30 weight-% based on the weight of said slurry and comprising water and alumina ($Al_2O_3$ 94 weight-% with $SiO_2$ 6 weight-% having a BET specific surface area of 173 m$^2$/g, a Dv90 of about 5 micrometers) was prepared. The amount of alumina+silica was calculated such that the amount of alumina+silica after calcination was 10 weight-% based on the weight of the Chabazite after calcination. Tartaric acid was added to the aqueous slurry. The amount of tartaric acid was calculated such that it was 0.7 weight-% based on the weight of the alumina+silica in the coating after calcination.

Subsequently, slurry 1 and slurry 2 were combined. Acetic acid was added to the obtained slurry. The amount of acetic acid was calculated such that it was 1 weight-% based on the weight of the Chabazite. The solid content of the obtained final slurry was adjusted to 34 weight-% based on the weight of said slurry.

A porous uncoated wall-flow filter substrate, silicon carbide, (an average porosity of 63%, a mean pore size of 20 micrometers and 300 CPSI and 12 mil wall thickness, diameter: 165.1 mm *length: 140.5 mm) was coated twice from the inlet end to the outlet end with the final slurry over 100% of the substrate axial length. To do so, the substrate was dipped in the final slurry from the inlet end until the slurry arrived at the top of the substrate. Further a pressure pulse was applied on the inlet end to distribute the slurry evenly in the substrate. Further, the coated substrate was dried at 130° C. for 2 hours and calcined at 450° C. for 2 hours. This was repeated once. The final coating loading after calcinations was about 2.0 g/in$^3$, including 1.684 g/in$^3$ of Chabazite, 0.1684 g/in$^3$ of alumina+silica, 0.0842 g/in$^3$ of zirconia and 3.5 weight-% of Cu, calculated as CuO, based on the weight of the Chabazite. The weight ratio of copper comprised in the zeolitic material comprised in the coated substrate, calculated as CuO, relative to the copper comprised in the zeolitic material used in slurry 1 (starting zeolitic material) is about 2.5:1.

Example 2: Performance Evaluation of the Catalysts of Example 1, Comparative Examples 1 and 2—NOx Conversion All catalysts were aged in an oven at 800° C. hydrothermally (10% H$_2$O, 20% O$_2$ and 70% N$_2$) for 16 hours. All catalysts were also aged in an oven at 850° C. hydrothermally (10% H$_2$O, 20% O$_2$ and 70% N$_2$) for 16 hours.

The NOx conversion at 20 ppm NH$_3$ slip of the aged catalysts of Example 1 and of Comparative Examples 1 and 2 were measured on an engine bench with a Euro 6 150 kW Engine (OM651) engine at different temperatures namely 200, 230, 600 and 650° C. The results are displayed in FIG. 1 (after hydrothermal ageing at 800° C.) and FIG. 2 (after hydrothermal ageing at 850° C.).

As demonstrated in FIG. 1, the aged catalyst of Example 1 exhibits improved NOx conversion at 200, 230, 600 and 650° C. compared to the aged catalyst of Comparative Example 1 comprising a zeolitic material comprising copper which was prepared according to a liquid phase ion-exchanged process. In particular, the aged catalyst of Example 1 exhibits NOx conversions of about 10-12% higher than those obtained with the aged catalyst of Comparative Example 1. Further, the aged catalyst of Example 1 also exhibits improved NOx conversion at 200, 230 and 600° C. compared to the aged catalyst of Comparative Example 2 comprising a zeolitic material comprising copper which was prepared according to an in-situ ion-exchange (ISIE) procedure, however starting from the H-form of the zeolitic material.

As demonstrated in FIG. 2, the aged catalyst of Example 1 exhibits improved NOx conversion at 200, 230, 600 and 650° C. compared to the aged catalyst of Comparative Example 1 comprising a zeolitic material comprising copper which has been prepared according to a liquid phase ion-exchanged process. In particular, the aged catalyst of Example 1 exhibits NOx conversions of about 10-15% higher than those obtained with the aged catalyst of Comparative Example 1. Further, the aged catalyst of Example 1 also exhibits improve NOx conversion at 200, 230, 600 and 650° C. compared to the aged catalyst of Comparative Example 2 comprising a zeolitic material comprising copper which has been prepared according to an in-situ ion-exchange (ISIE) procedure, however starting from the H-form of the zeolitic material.

Thus, Example 2 shows that the catalyst prepared according to the present invention offers improved catalytic activities, in particular NOx conversion, under aged conditions. Thus, this example demonstrates that using the claimed method for preparing a catalyst comprising a zeolitic material comprising copper, namely using a particular combination of usual liquid phase ion-exchange (LPIE) and in-situ ion-exchange (ISIE) procedures according to the present invention, permits to improve the catalytic activity of said catalyst as well as improve its thermal stability.

Comparative Example 3: Process for Preparing a Catalyst Comprising a Zeolitic Material Comprising Copper not According to the Present Invention The catalyst of Comparative Example 3 was prepared as the catalyst of Comparative Example 2 except that the final slurry was coated on a different substrate. In particular, it was coated on a porous uncoated wall-flow filter substrate, silicon carbide, (an average porosity of 60.5%, a mean pore size of 20 micrometers and 350 CPSI and 0.28 mm wall thickness, diameter: 172.8 mm *length: 127.9 mm). The coating method was the same. The final coating loading after calcination was 2.2 g/in$^3$.

Example 3: Process for Preparing a Catalyst Comprising a Zeolitic Material Comprising Copper The catalyst of Example 3 was prepared as the catalyst of Example 1 except that the final slurry was coated on a different substrate. In particular, it was coated on a porous uncoated wall-flow filter substrate, silicon carbide, (an average porosity of 60.5%, a mean pore size of 20 micrometers and 350 CPSI and 0.28 mm wall thickness, diameter: 172.8 mm *length: 127.9 mm). The coating method was the same. The final coating loading after calcination was 2.2 g/in$^3$.

Example 4: Backpressure Evaluation

The backpressure of the catalysts obtained in Example 3 and Comparative Example 3 was measured on a Superflow 1020 measurement device. In particular, three lots of catalyst prepared according to Example 3 and three lots of catalyst prepared according to Comparative Example 3 were tested. The backpressure data recorded at a volume flow of 600 m$^3$/h was reported on Table 1 below.

TABLE 1

| Backpressure data according to Example 4 | | | | | | |
|---|---|---|---|---|---|---|
| | Comparative Example 3 | | | Example 3 | | |
| | Lot 1 | Lot 2 | Lot 3 | Lot 1 | Lot 2 | Lot 3 |
| Backpressure/mbar | 90 | 68 | 100 | 45 | 46 | 48 |

Table 1 shows that the average back pressure measured from the three lots prepared according to Comparative Example 3 are all above 60 mbar and that the back pressure strongly varies between these different lots. In comparison, the back pressures that were measured for the lots prepared according to Example 3 are all below 50 mbar and the lot to lot variation is lower than 5 mbar. Accordingly, the process that is subject to the present invention leads to more stable and lower back pressures than the process according to the process in which CuO is exchanged completely in the ISIE process using H-form Chabazite as starting material.

Example 5: Process for Preparing a Catalyst Comprising a Zeolitic Material Comprising Copper The catalyst of Example 5 was prepared as the catalyst of Example 1 except that the amount of CuO was increased to 3.75 weight-% based on the weight of the Chabazite. The final coating loading after calcination was 2.0 g/in³. The weight ratio of copper comprised in the zeolitic material comprised in the coated substrate, calculated as CuO, relative to the copper comprised in the zeolitic material used in slurry 1 (starting zeolitic material) is about 3:1.

Example 6: Process for Preparing a Catalyst Comprising a Zeolitic Material Comprising Copper not According to the Present Invention The catalyst of Example 6 was prepared as the catalyst of Example 5 except that no zirconium acetate was added in Slurry 1. The final coating loading after calcination was 2.0 g/in³.

Example 7: Performance Testing of the Catalyst of Examples 5 and 6—NOx Conversion and $NH_3$ Storage Capacity The catalysts were aged in an oven at 800° C. hydrothermally (20% $O_2$, 10% $H_2O$ and 70% $N_2$) for 16 hours. The NOx conversion of the aged catalysts at 20 ppm $NH_3$ Slip of Examples 5 and 6 were measured on a 2 1140 kW Euro 6 (EDC17-ETK SG) engine at different temperatures namely 200, 230 and 680° C. The results are displayed on FIG. 3.

All catalysts were also aged in an oven at 850° C. hydrothermally (10% $H_2O$, 20% $O_2$ and 70% $N_2$) for 16 hours. The NOx conversion at 20 ppm $NH_3$ slip of the aged catalysts of Examples 5 and 6 were measured on a 2 1140 kW Euro 6 (EDC17-ETK SG) engine at different temperatures namely 200 and 230° C. The results are displayed on FIG. 4.

The ammonia storage capacity of the aged catalysts of Examples 5 and 6 was measured after the measurement of the NOx conversion, after stopping urea injection, at different temperatures namely 200 and 230° C. In particular, the measured ammonia storage capacity (stored ammonia in the catalyst) corresponds to the sum of the reacted NOx and the $NH_3$ coming out of the catalyst still after stopping urea injection. The results are displayed on FIG. 5.

FIGS. 3 to 5 show that the catalysts of Examples 5 and 6 exhibit comparable catalytic performance, at different temperatures namely 200, 230 and 680° C. Thus, Example 7 demonstrates that the use of a precursor of an oxidic component, namely zirconium acetate, in the preparation of the slurries for a catalyst comprising a zeolitic material comprising copper is not performance relevant at the testing conditions, at which the performance of the examples from the present application were compared.

Comparative Example 4: Preparation of a Zeolitic Material Having Framework Type CHA and Comprising Copper not According to the Present Invention Slurry 1 and slurry 2 were prepared as in Comparative Example 1. Subsequently, slurry 1 and slurry 2 were combined. Acetic acid was added to the obtained slurry. The amount of acetic acid was calculated such that it was 1 weight-% based on the weight of the Chabazite. Further, the obtained slurry was dried at 130° C. for 1 hour and calcined at 450° C. for 2 hours to obtain a powder comprising 87.4 weight-% of a zeolitic material having a framework type CHA and comprising copper, 4.3 weight-% of zirconia and 8.4 weight-% of a mixture of alumina and silica.

Example 8: Preparation of a Zeolitic Material Having Framework Type CHA and Comprising Copper Slurry 1 and slurry 2 were prepared as in Example 1 except that the amount of Chabazite in slurry 1 was calculated such the amount of Chabazite in the final powder after calcination was 87.2 weight-% based on the weight of the powder and that the amount of alumina+silica such that the amount of alumina+silica after calcination was 8.5 weight-% based on the weight of powder. Subsequently, slurry 1 and slurry 2 were combined. Acetic acid was added to the obtained slurry. The amount of acetic acid was calculated such that it was 1 weight-% based on the weight of the Chabazite. Further, the obtained slurry was dried at 130° C. for 1 hour and calcined at 450° C. for 2 hours to obtain a powder comprising 87.2 weight-% of a zeolitic material having a framework type CHA and comprising copper, 4.3 weight-% of zirconia and 8.5 weight % of a mixture of alumina and silica.

Comparative Example 5: Preparation of a Zeolitic Material Having Framework Type CHA and Comprising Copper not According to the Present Invention The zeolitic material of Comparative Example 5 was prepared as the zeolitic material of Example 8 except that the amount of CuO was calculated such that the amount of copper after calcination was of 3.17 weight-%, calculated as CuO, based on the weight of the Chabazite and that no calcining has been performed after drying at 130° C. for 1 hour.

Example 9: Preparation of a Zeolitic Material Having Framework Type CHA and Comprising Copper The zeolitic material of Example 9 was prepared as the zeolitic material of Comparative Example 5 except that after drying at 130° C. for 1 hour, a calcination step at 450° C. for 2 hours was performed.

Example 10: Preparation of a Zeolitic Material Having Framework Type CHA and Comprising Copper The zeolitic material of Example 10 was prepared as the zeolitic material of Example 8 except that the amount of CuO was calculated such that the total amount of copper after calcination was of 3.31 weight-%, calculated as CuO, based on the weight of the Chabazite and that no zirconium acetate was used.

Example 11: Ammonia Back-Exchange (BEX) Experiment

An ammonia back-exchange (BEX) experiment was carried out on the calcined zeolitic material of Examples 8, 9 and 10, on the calcined zeolitic material of Comparative Example 4 and on the dried zeolitic material of Comparative Example 5. The BEX experiment was also carried out on the starting material of Example 8 (Cu-Chabazite with a Cu content of 1.30 weight-%, calculated as CuO, based on the weight of the Chabazite). The BEX experiment removes the exchanged Cu in the zeolitic material and the residual Cu is the un-exchanged CuO. The amount of residual Cu was determined by ICP and the delta of Cu amount before and after the ammonia back-exchange is the amount of exchanged Cu. The results are displayed in Table 2 below.

TABLE 2

Results of BEX experiment according to Example 11

| | Total amount of Cu* | Residual Cu* | Exchanged Cu* | % of exchanged Cu |
|---|---|---|---|---|
| Starting material of Ex. 8 | 1.30 | 0.05 | 1.25 | 96 |
| Example 8 | 3.49 | 0.64 | 2.85 | 82 |
| Comp. Example 4 | 3.49 | 0.59 | 2.90 | 83 |
| Comp. Example 5 | 3.17 | 0.44 | 2.73 | 86 |
| Example 9 | 3.17 | 0.57 | 2.60 | 82 |
| Example 10 | 3.31 | 0.46 | 2.85 | 86 |

*calculated as CuO, based on the weight of the zeolitic material.

Example 6 shows that the amount of copper exchanged is about the same in the zeolitic material of Example 8 and Comparative Example 4.

Example 12: Diffuse Reflectance Infrared Fourier Transform Spectroscopy (DRIFTS) Measurements Diffuse reflectance infrared Fourier transform spectroscopy (DRIFTS) measurements were performed on a THERMO NICOLET with a MCT (HgCdTe) detector and a Harrick environmental chamber with ZnSe windows. The zeolitic materials of Comparative Examples 4 and 5, and Examples 8-10, as well as the starting zeolitic material of Example 8, were ground to a fine powder with mortar and pestle and placed into the sample cup. The powder was dehydrated at 400° C. for 1 hour in flowing Ar at 40 mL/min and cooled to 30° C. and the spectra was recorded using KBr as a reference. Copper species in zeolitic material can be identified by monitoring the perturbed T-O-T bond (Si—O—Al and Si—O—Si) vibrations by infrared (IR) spectroscopy. The structural vibrations of T-O-T bonds in zeolite have absorption peaks at 1300-1000 $cm^{-1}$ and 850-750 $cm^{-1}$ for asymmetric and symmetric vibration mode, respectively. The frequency of asymmetric T-O-T vibration of the oxygen ring is sensitive to the interaction with cations and therefore the IR band shifts from typical 1000-1300 $cm^{-1}$ (position characteristic of unperturbed ring) to about 850-1000 $cm^{-1}$ when interacting with a cation. The shifted band appears in the transmission window between two strong bands of T-O-T asymmetric and symmetric vibrations. The position of such a shifted band depends on the properties of the cations. Such perturbed T-O-T bond vibrations are observed when copper ions are exchanged into cationic position of zeolite framework structures, due to strong interaction between copper ions and neighbouring oxygen atoms in the framework structure. The peak position depends on the status of compensated cations and the structure of the zeolite framework. The peak intensity depends on the quantity of compensated cations in the exchanged sites. The T-O-T bond DRIFTS are displayed in FIG. 6.

The peak fitting was carried out in Origin 9.1 software. In the peak fitting, the peaks are modeled as Gaussian peaks and peak fitting runs were performed until a chi-squared tolerance value of 1E-6 was reached. The IR signals at the wavelength range of 900-955 $cm^{-1}$ due to perturbed T-O-T bond vibration absorption were attributed to the exchanged copper ions in the zeolitic material. The absorption peak having a maximum at the wavelength of 900 $cm^{-1}$ was attributed to perturbed T-O-T bond vibration by $Cu^{2+}$, the absorption peak having a maximum at the wavelength of 955 $cm^{-1}$ was attributed to perturbed T-O-T bond vibration by $Cu(OH)^+$. The peak position at the wavelength of 935 $cm^{-1}$ was included to enable the peak deconvolution by software. The sum of the peak areas from 955 to 900 $cm^{-1}$ is an indication of total exchanged copper ions in exchanged sites including $CuOH^+$ and $Cu^{2+}$. The results are displayed in Table 3 below.

TABLE 3

Results according to Example 12

| | Peak area of the absorption peak having a maximum of ($cm^{-1}$) | | | Sum of the peak areas* |
|---|---|---|---|---|
| | 955 | 935 | 900 | |
| Cu-Chabazite (starting material of Ex. 8) | 11 | 0 | 39 | 50 |
| Example 8 | 66 | 30 | 56 | 152 |
| Comp. Example 4 | 91 | 8 | 55 | 154 |
| Comp. Example 5 | 41 | 0 | 0 | 41 |
| Example 9 | 60 | 32 | 47 | 139 |
| Example 10 | 67 | 33 | 53 | 153 |

*of all absorption peaks having a maximum in the range of 900 to 955 $cm^{-1}$.

As demonstrated in Table 3, the IR spectrum of the zeolitic material of Example 8 comprises a first absorption peak (P1) having a maximum at about 955 $cm^{-1}$ and a second absorption peak (P2) having a maximum at about 900 $cm^{-1}$ as may be taken from FIGS. 6, 7 and Table 3. The ratio of the peak area of the first absorption peak relative to the peak area of the second absorption peak, P1:P2, was of 1.178:1 (=66:56). The peak area of the first absorption peak (P1) represented 43.42% of the sum of the peak areas of all absorption peaks having a maximum in the range of 900 to 955 $cm^{-1}$. The peak area of the second absorption peak (P2) represented 36.84% of the sum of the peak areas of all absorption peaks having a maximum in the range of 900 to 955 $cm^{-1}$. These perturbed signals are due to T-O-T bond vibration absorption by exchanged copper ions. It is believed that 36.84% of the total copper ions exchanged in the zeolitic material of Example 8 were $Cu(OH)^+$. It is believed that 43.42% of the total copper ions exchanged in the zeolitic material of Example 8 were $Cu^{2+}$.

The IR signals of the zeolitic material of Comparative Example 4 shows a first absorption peak (P1) having a maximum at about 955 $cm^{-1}$ and a second absorption peak (P2) having a maximum at about 900 $cm^{-1}$ as may be taken from FIG. 5 and Table 3. The ratio of the peak area of the first absorption peak relative to the peak area of the second absorption peak, P1:P2, was of 1.65:1 (=91:55). The peak area of the first absorption peak (P1) represented 59.1% of the sum of the peak areas of all absorption peaks having a maximum in the range of 900 to 955 $cm^{-1}$. The peak area of the second absorption peak (P2) represented 35.7% of the sum of the peak areas of all absorption peaks having a maximum in the range of 900 to 955 $cm^{-1}$. These perturbed signals are due to T-O-T bond vibration absorption by exchanged copper ions. It is believed that 35.7% of the total copper ions exchanged in the zeolitic material of Comparative Example 4 were $Cu(OH)^+$. It is believed that 59.1% of the total copper ions exchanged in the zeolitic material of Comparative Example 4 were $Cu^{2+}$.

The IR spectrum of the zeolitic material of Example 9 comprises a first absorption peak (P1) having a maximum at about 955 $cm^{-1}$ and a second absorption peak (P2) having a maximum at about 900 cm$^{-1}$ as may be taken from FIG. 6 and Table 3. The ratio of the peak area of the first absorption peak relative to the peak area of the second absorption peak, P1:P2, was of 1.276:1 (=60:47). The IR spectrum of the zeolitic material of Example 10 comprises a first absorption peak (P1) having a maximum at about 955 cm$^{-1}$ and a second absorption peak (P2) having a maximum at about 900 cm$^{-1}$ as may be taken from FIG. 6 and Table 3. The ratio of the peak area of the first absorption peak relative to the peak area of the second absorption peak, P1:P2, was of 1.264:1 (=67:53).

Comparative Example 6: Preparation of a Catalyst Comprising a Zeolitic Material Comprising Copper not According to the Present Invention Slurry 1:

A CuO powder having a Dv50 of 33 micrometers was added to water. The amount of CuO was calculated such that the total amount of copper, calculated as CuO, in the coating after calcination was 4.15 weight-% based on the weight of the Chabazite. The resulting mixture was milled using a continuous milling apparatus so that the Dv50 value of the particles was about 2.5 micrometers and the Dv90 value of the particles was about 9 micrometers. The resulting slurry had a solid content of 5 weight-% based on the weight of said slurry. An aqueous zirconium acetate solution was added to the CuO-containing mixture forming a slurry. The amount of zirconium acetate was calculated such that the amount of zirconia in the coating, calculated as $ZrO_2$, was 5 weight-% based on the weight of the Chabazite. Separately, a H-form-Chabazite (Dv50 of 13 micrometers, a $SiO_2$:$Al_2O_3$ of 18, a mean crystal size of less than 0.5 micrometer (SEM analysis) and a BET specific surface area of about 560 m$^2$/g), was added to water to form a mixture having a solid content of 37 weight-% based on the weight of said mixture. The H-Chabazite mixture was mixed to the copper containing slurry. The amount of the Chabazite was calculated such that the loading of Chabazite after calcination was about 85% of the loading of the coating in the catalyst after calcination. The resulting slurry was milled using a continuous milling apparatus so that the Dv90 value of the particles was of about 5 micrometers.

Slurry 2:

Separately, an aqueous slurry having a solid content of 30 weight-% based on the weight of said slurry and comprising water and alumina ($Al_2O_3$ 94 weight-% with $SiO_2$ 6 weight-% having a BET specific surface area of 173 m$^2$/g, a Dv90 of about 18 micrometers) was prepared. The amount of alumina+silica was calculated such that the amount of alumina+silica after calcination was 10 weight-% based on the weight of the Chabazite after calcination. Tartaric acid was added to the aqueous slurry.

Subsequently, slurry 1 and slurry 2 were combined, forming an intermediate slurry.

Further, separately, a powder of synthetic graphite (a Dv50 of 6.2 micrometers and a Dv90 of 12.5 micrometers) was dispersed in deionized water for 30 minutes forming an aqueous slurry having a solid content of 35 weight-%. The amount of synthetic graphite was calculated such that it was 10 weight-% based on the weight of the starting Chabazite+alumina-silica. This mixture was added to the intermediate slurry.

Acetic acid was added to the obtained slurry. The amount of acetic acid was calculated such that it was 1.7 weight-% based on the weight of the Chabazite. The solid content of the obtained final slurry was adjusted to 37 weight-% based on the weight of said slurry.

A porous uncoated wall-flow filter substrate, silicon carbide, (an average porosity of 60.5%, a mean pore size of 20 micrometers and 350 CPSI and 0.30 mm (13 mil) wall thickness, diameter: 58 mm *length: 150.5 mm) was coated twice from the inlet end to the outlet end with the final slurry over 100% of the substrate axial length. To do so, the substrate was dipped in the final slurry from the inlet end until the slurry arrived at the top of the substrate. Further a pressure pulse was applied on the inlet end to distribute the slurry evenly in the substrate. Further, the coated substrate was dried at 140° C. for 30 minutes and calcined at 450° C. for 2 hours. Subsequently, a calcination was carried out at 800° C. for 30 minutes. This was repeated once. The final coating loading after calcinations was about 2.0 g/in$^3$, including about 1.7 g/in$^3$ of Chabazite, 0.17 g/in$^3$ of alumina+silica, about 0.085 g/in$^3$ of zirconia and 4.15 weight-% of Cu, calculated as CuO, based on the weight of the Chabazite. The weight ratio of copper comprised in the zeolitic material comprised in the coated substrate, calculated as CuO, relative to the copper comprised in the zeolitic material used in slurry 1 (starting zeolitic material) is about 1:0.

Example 13: Preparation of Catalysts Comprising a Zeolitic Material Comprising Copper The catalysts of Examples 13.1, 13.2 and 13.3 were prepared as the catalyst of Comparative Example 6 except that pre-exchanged Cu-CHA were used in place of the H-form-CHA in slurry 1 (see Table 4 below). The pre-exchanged Cu-CHA were prepared as in Reference Example 4.

TABLE 4

| | Starting zeolite | Cu content of the starting zeolitic material* | Total Cu content in the catalyst* | Weight ratio Cu(c)/Cu(s)** |
|---|---|---|---|---|
| Example 13.1 | Cu-CHA | 1.13 | 4.15 | 3.7:1 |
| Example 13.2 | Cu-CHA | 1.75 | 4.15 | 2.4:1 |
| Example 13.3 | Cu-CHA | 2.38 | 4.15 | 1.7:1 |
| Comp. Example 6 | H-form-CHA | 0 | 4.15 | 1:0 |

*in wt.-%, calculated as CuO, based on the weight of the zeolitic material
**Cu(c): Cu content in the coated substrate/Cu(s): Cu content in the starting zeolitic material Example 14: Performance Evaluation of the Catalysts of Comparative Example 6 and Examples 13.1 to 13.3—NO$_x$ Conversion and Backpressure All catalysts were hydrothermally aged in an aging oven at 800° C. (10% $H_2O$, 20% $O_2$ and 70% $N_2$) for 16 hours.

The NO$_x$ conversion at maximum of the aged catalysts of Comparative Example 6 and Examples 13.1 to 13.3 have been measured on an engine bench with a Euro 6 140 kW engine (2.0 L, 4 Cylinder) at different temperatures namely 216, 235 and 635° C. under steady state conditions. The results are displayed on FIG. 8.

As may be taken from FIG. 8, the aged catalysts of Examples 13.1-13.3 exhibit improved NO$_x$ conversion at 216 and 235° C. compared to the aged catalyst of Comparative Example 6 which was prepared only with an in-situ ion-exchanged process (ISIE) starting from the H-form of the zeolitic material. In particular, the aged catalyst of Example 13.3 exhibits $NO_x$ conversions of about 7% higher than those obtained with the comparative aged catalyst using the non-pre-exchanged starting material. FIG. 9 indicated a correlation between the pre-loaded copper using the liquid phase ion-exchanged process and the NOx conversion. Further, the aged catalyst of Example 13.2 also exhibits improved $NO_x$ conversion at 635° C. compared to the aged catalyst of Comparative Example 6.

Thus, it is demonstrated that the catalysts prepared according to the present invention offers improved catalytic activities under aged conditions. Thus, this example demonstrates that using the inventive method for preparing a catalyst comprising a zeolitic material comprising copper, namely using a particular in-situ ion-exchanged (ISIE) process on a pre-exchanged zeolitic material, permits to improve the catalytic activity of said catalyst as well as its thermal stability.

Further, the backpressure of the catalysts obtained in Comparative Example 6 and Examples 13.1 to 13.3 was measured on a self-designed measurement device. The backpressure data recorded at a volume flow of 65 m³/h was reported on Table 5 below.

TABLE 5

| Backpressure data | | | | |
|---|---|---|---|---|
| | Comp. Example 6 | Example 13.1 | Example 13.2 | Example 13.3 |
| Cold flow back-pressure/mbar | 56 ± 2 | 55 ± 2 | 51 ± 1 | 54 ± 1 |

Comparative Example 7: Preparation of a Catalyst Comprising a Zeolitic Material Comprising Copper not According to the Present Invention Slurry 1:

A CuO powder having a Dv50 of 33 micrometers was added to water. The amount of CuO was calculated such that the total amount of copper, calculated as CuO, in the coating after calcination was 4.34 weight-% based on the weight of the Chabazite. The resulting mixture was milled using a continuous milling apparatus so that the Dv90 value of the particles was about 5.5 micrometers. The resulting slurry had a solid content of 5 weight-% based on the weight of said slurry. An aqueous zirconium acetate solution was added to the CuO-containing mixture forming a slurry. The amount of zirconium acetate was calculated such that the amount of zirconia in the coating, calculated as $ZrO_2$, was 5 weight-% based on the weight of the Chabazite. Separately, a H-form-Chabazite (Dv50 of 13 micrometers, a $SiO_2:Al_2O_3$ of 18, a mean crystal size of less than 0.5 micrometer (SEM analysis) and a BET specific surface area of about 560 m²/g), was added to water to form a mixture having a solid content of 37 weight-% based on the weight of said mixture. The H-Chabazite mixture was mixed to the copper containing slurry. The amount of the Chabazite was calculated such that the loading of Chabazite after calcination was about 85% of the loading of the coating in the catalyst after calcination. The resulting slurry was milled using a continuous milling apparatus so that the Dv90 value of the particles was of about 5 micrometers.

Slurry 2:

Separately, an aqueous slurry having a solid content of 30 weight-% based on the weight of said slurry and comprising water and alumina ($Al_2O_3$ 94 weight-% with $SiO_2$ 6 weight-% having a BET specific surface area of 173 m²/g, a Dv90 of about 18 micrometers) was prepared. The amount of alumina+silica was calculated such that the amount of alumina+silica after calcination was 10 weight-% based on the weight of the Chabazite after calcination.

Subsequently, slurry 1 and slurry 2 were combined. Acetic acid was added to the obtained slurry. The amount of acetic acid was calculated such that it was 1.7 weight-% based on the weight of the Chabazite. The solid content of the obtained final slurry was adjusted to 32 weight-% based on the weight of said slurry.

A porous uncoated wall-flow filter substrate, silicon carbide, (an average porosity of 60.5%, a mean pore size of 20 micrometers and 350 CPSI and 0.33 mm (13 mil) wall thickness, diameter: 58 mm *length: 150.5 mm) was coated twice from the inlet end to the outlet end with the final slurry over 100% of the substrate axial length. To do so, the substrate was dipped in the final slurry from the inlet end until the slurry arrived at the top of the substrate. Further a pressure pulse was applied on the inlet end to distribute the slurry evenly in the substrate. Further, the coated substrate was dried at 140° C. for 30 minutes and calcined at 450° C. for 1 hour. This was repeated once. The final coating loading after calcinations was about 2.0 g/in³, including about 1.7 g/in³ of Chabazite, 0.17 g/in³ of alumina+silica, about 0.085 g/in³ of zirconia and 4.34 weight-% of Cu, calculated as CuO, based on the weight of the Chabazite. The weight ratio of copper comprised in the zeolitic material comprised in the coated substrate, calculated as CuO, relative to the copper comprised in the zeolitic material used in slurry 1 (starting zeolitic material) is about 1:0.

Comparative Example 8: Preparation of a Catalyst Comprising a Zeolitic Material Comprising Copper not According to the Present Invention The catalyst of Comparative Example 8 was prepared as the catalyst of Comparative Example 7 except that the zeolitic starting material was the N $H_4$-form-CHA was used in slurry 1 in place of the H-form-CHA.

Comparative Example 9: Preparation of a Catalyst Comprising a Zeolitic Material Comprising Copper not According to the Present Invention The catalyst of Comparative Example 9 was prepared as the catalyst of Comparative Example 7, except that slurry 1 was prepared as it follows.

Slurry 1:

An aqueous zirconium acetate solution was added to a Cu-CHA zeolitic material (Dv50 of 13 micrometers, a $SiO_2:Al_2O_3$ of 18, a mean crystal size of less than 0.5 micrometer (SEM analysis) and a BET specific surface area of about 560 m²/g), the Cu-CHA being prepared as in Reference Example 4 (LPIE), in water to form a mixture having a solid content of 37 weight-% based on the weight of said mixture. The amount of zirconium acetate was calculated such that the amount of zirconia in the coating, calculated as $ZrO_2$, was 5 weight-% based on the weight of the Chabazite. The amount of the Chabazite was calculated such that the loading of Chabazite after calcination was about 85% of the loading of the coating in the catalyst after calcination. The resulting slurry was milled using a continuous milling apparatus so that the Dv90 value of the particles was of about 5 micrometers.

Example 15: Preparation of Catalysts Comprising a Zeolitic Material Comprising Copper The catalysts of Examples 15.1 and 15.2 were prepared as the catalyst of Comparative Example 7 except that pre-exchanged Cu-CHA were used in place of the H-form-CHA in slurry 1 (see Table 6 below). The pre-exchanged Cu-CHA were prepared as in Reference Example 4.

TABLE 6

|  | Starting zeolite | Cu content of the starting zeolitic material* | Total Cu content in the catalyst* | Weight ratio Cu(c)/Cu(s)** |
|---|---|---|---|---|
| Example 15.1 | Cu-CHA | 2.4 | 4.34 | 1.8:1 |
| Example 15.2 | Cu-CHA | 3.2 | 4.34 | 1.35:1 |
| Comp. Example 7 | H-form-CHA | 0 | 4.34 | 1:0 |
| Comp. Example 8 | $NH_4$-form-CHA | 0 | 4.34 | 1:0 |
| Comp. Example 9 | Cu-CHA | 4.34 | 4.34 | 1:1 |

*in wt.-%, calculated as CuO, based on the weight of the zeolitic material
**Cu(c): Cu content in the coated substrate/Cu(s): Cu content in the starting zeolitic material

Example 16: Performance Evaluation of the Catalysts of Comparative Examples 7 to 9 and Example 15—$NO_x$ Conversion All catalysts were hydrothermally aged in an aging oven at 800° C. (10% $H_2O$, 20% $O_2$ and 70% $N_2$) for 16 hours.

The $NO_x$ conversion at maximum of the aged catalysts of Comparative Examples 7 to 9 and Example 15 have been measured on an engine bench with a Euro 6 140 kW engine (2.0 L, 4 Cylinder) at different temperatures namely at 208 and 238° C. under steady state conditions. The results were displayed on FIG. 10.

As may be taken from FIG. 10, the aged catalyst of Example 15.1 exhibits improved $NO_x$ conversion at 238° C. compared to the aged catalysts of Comparative Examples 7 to 9. This confirm the improved behavior using copper pre-exchanged (LPIE) zeolitic material. Increasing the copper content even further via LPIE leads to activity drop as shown by Comparative Example 9. The aged catalysts of Examples 15.1 and 15.2 also exhibit higher $NO_x$ conversions at 208° C. than those obtained with the aged catalyst of the comparative examples.

Thus, Example 16 demonstrates that the catalyst prepared according to the present invention offers improved catalytic activities. Thus, this example demonstrates that using the claimed method for preparing a catalyst comprising a zeolitic material comprising copper, namely using a particular in-situ ion-exchanged process, permits to improve the catalytic activity of said catalyst as well as its thermal stability.

CITED LITERATURE

Figure 1:
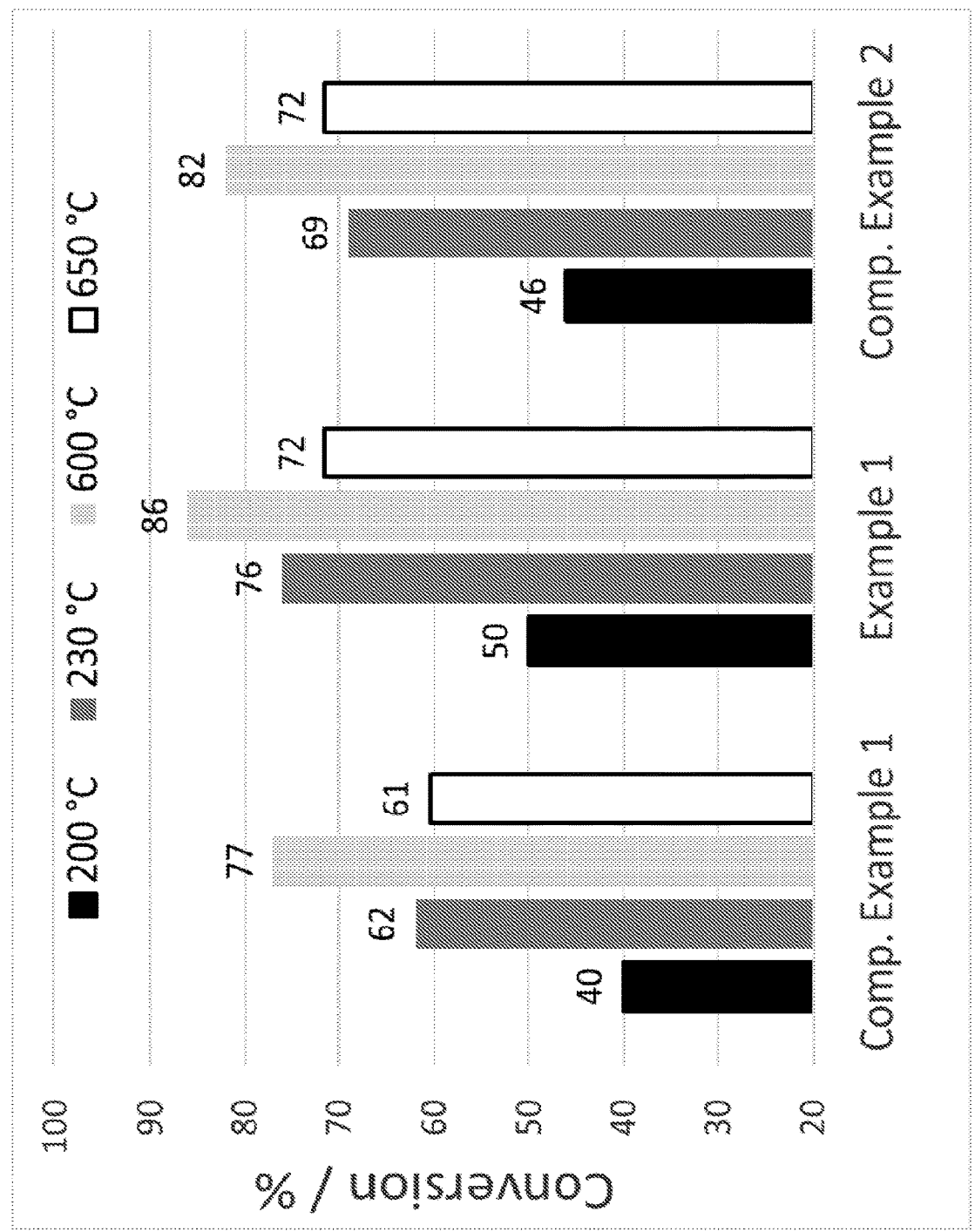
FIG. 1 shows the NOx conversion at 20 ppm $NH_3$ slip of the aged (hydrothermal ageing at 800° C.) catalysts of Example 1, Comparative Examples 1 and 2 at different temperatures, namely at 200, 230, 600 and 650° C.
Figure 2:
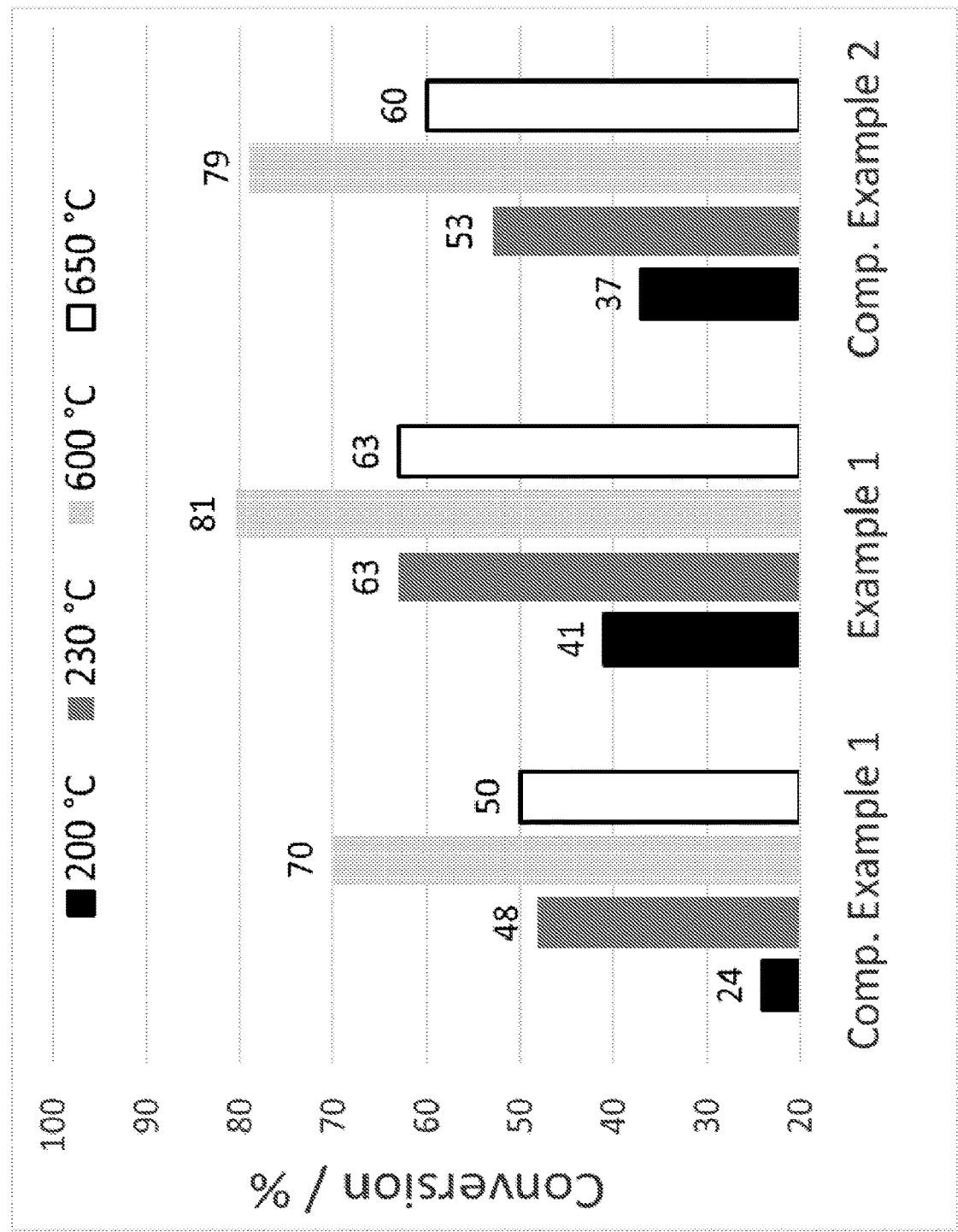
FIG. 2 shows the NOx conversion at 20 ppm $NH_3$ slip of the aged (hydrothermal ageing at 850° C.) catalysts of Example 1, Comparative Examples 1 and 2 at different temperatures, namely at 200, 230, 600 and 650° C.
Figure 3:
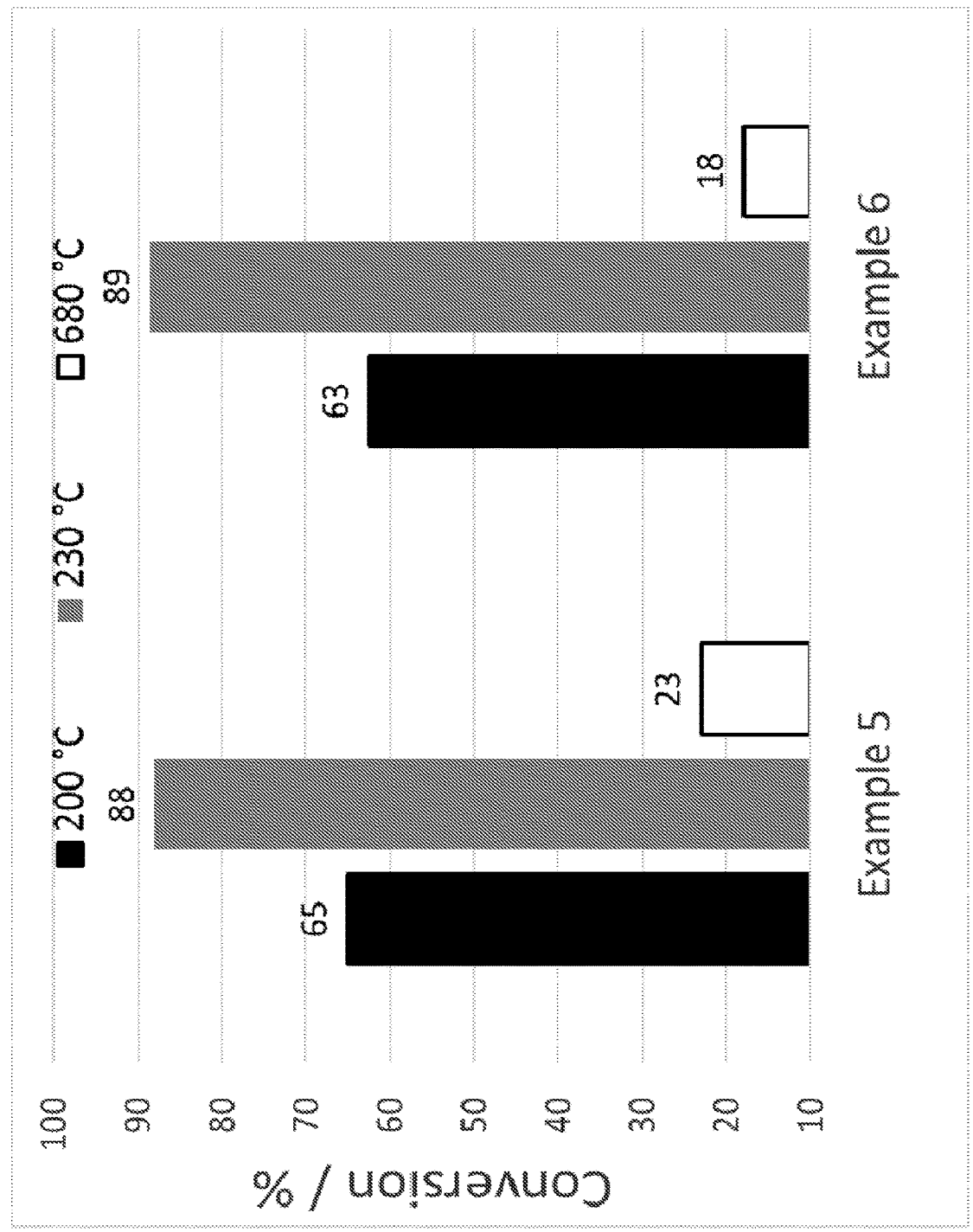
FIG. 3 shows the NOx conversion of the aged catalysts of Examples 5 and 6 at different temperatures, namely at 200, 230 and 680° C.
Figure 4:
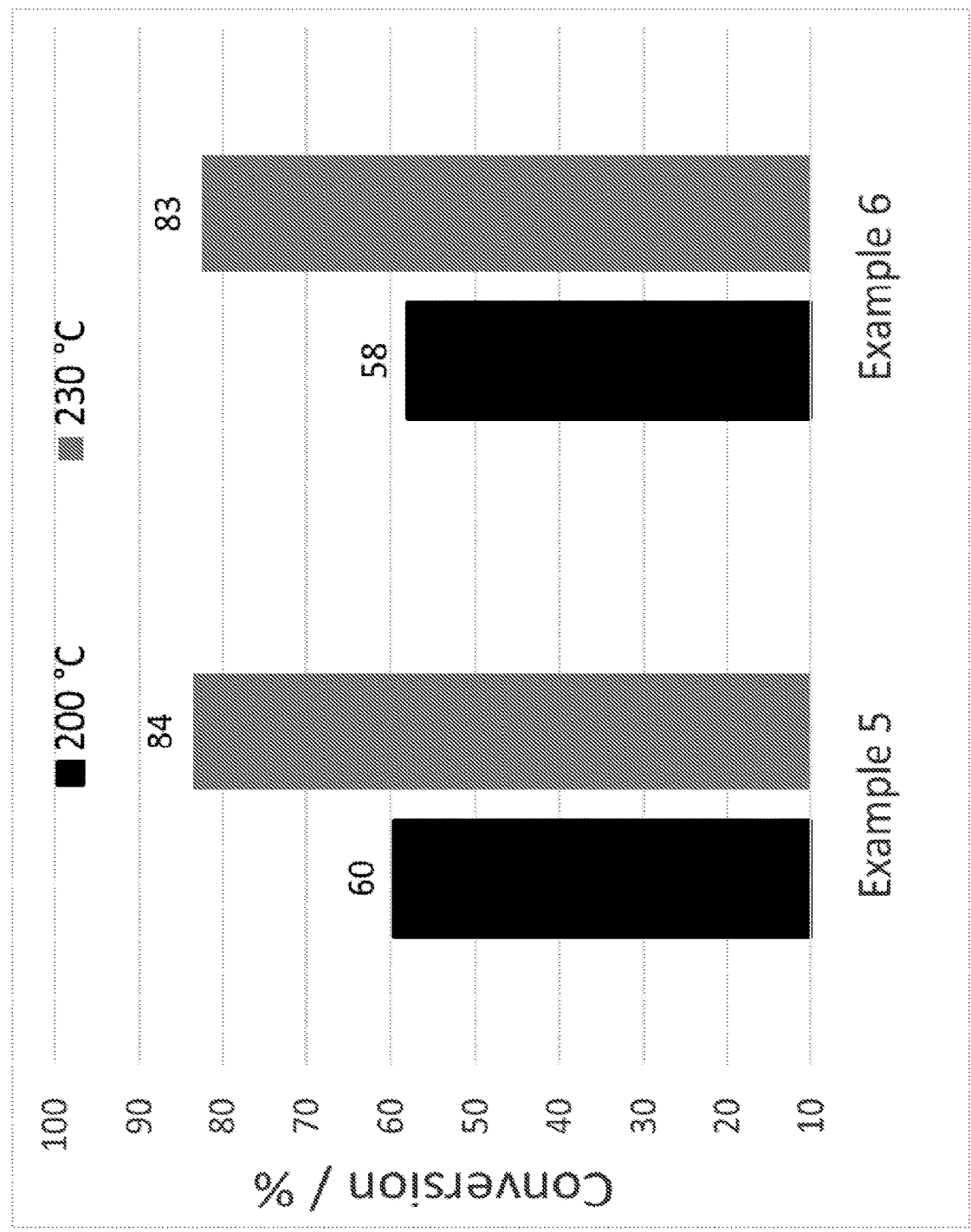
FIG. 4 shows the NOx conversion at 20 ppm $NH_3$ slip of the aged catalysts of Examples 5 and 6 at different temperatures, namely at 200 and 230° C.
Figure 5:
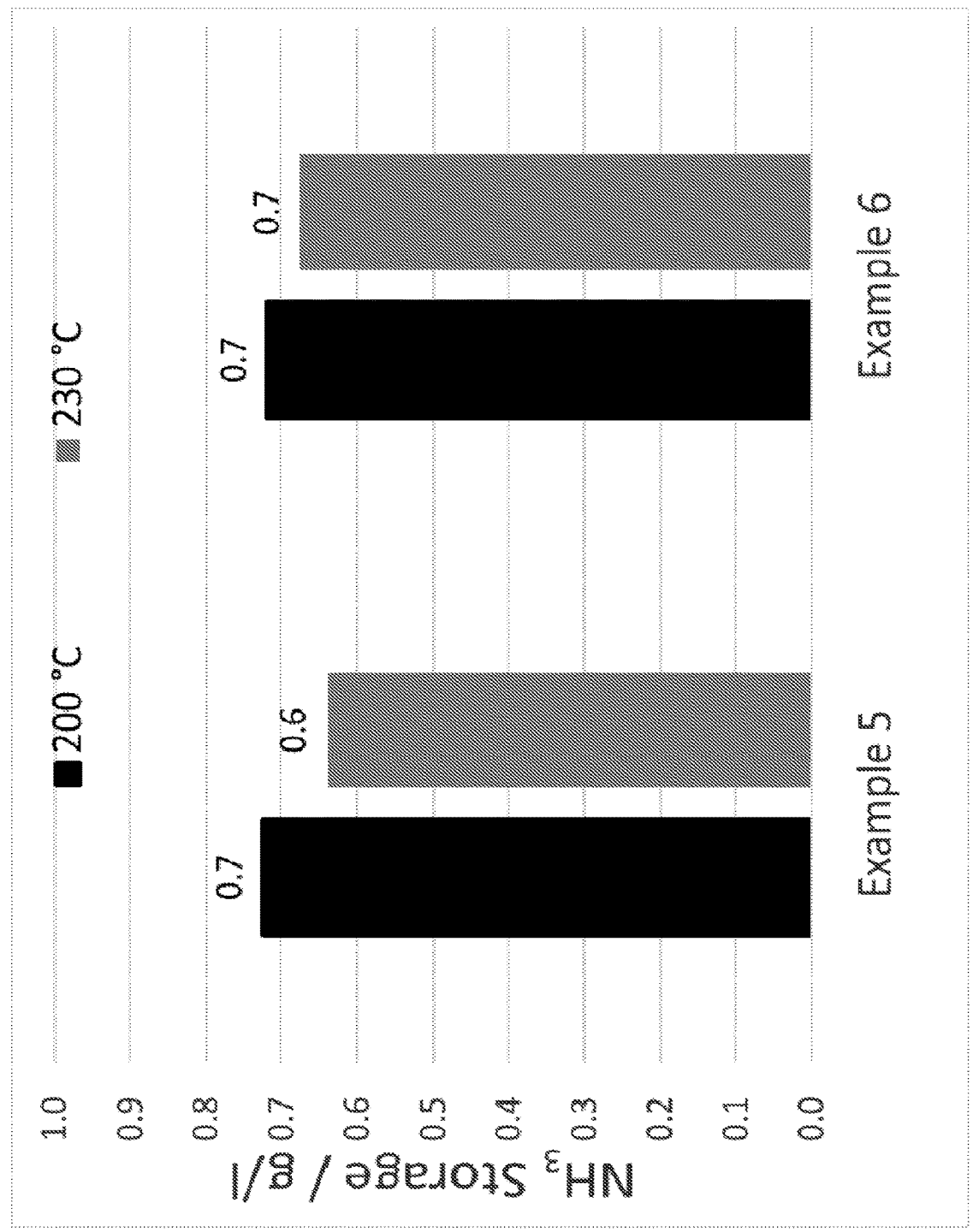
FIG. 5 shows the ammonia storage capacity of the aged catalysts of Examples 5 and 6 at different temperatures, namely at 200 and 230° C.
Figure 6:
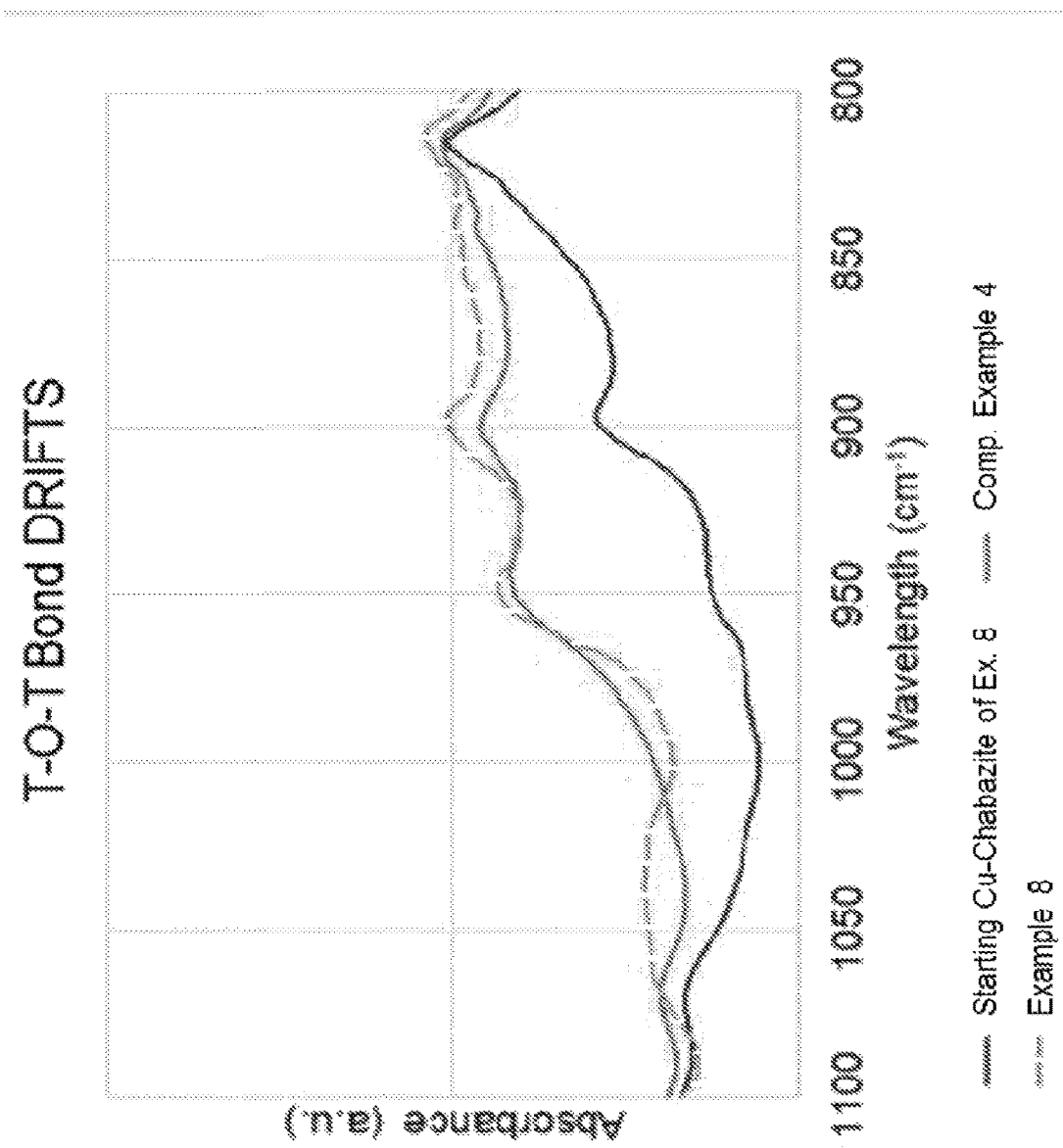
FIG. 6 shows the T-O-T bond DRIFTS of Example 8, the starting material of Example 8 and of Comparative Example 4.
Figure 7:
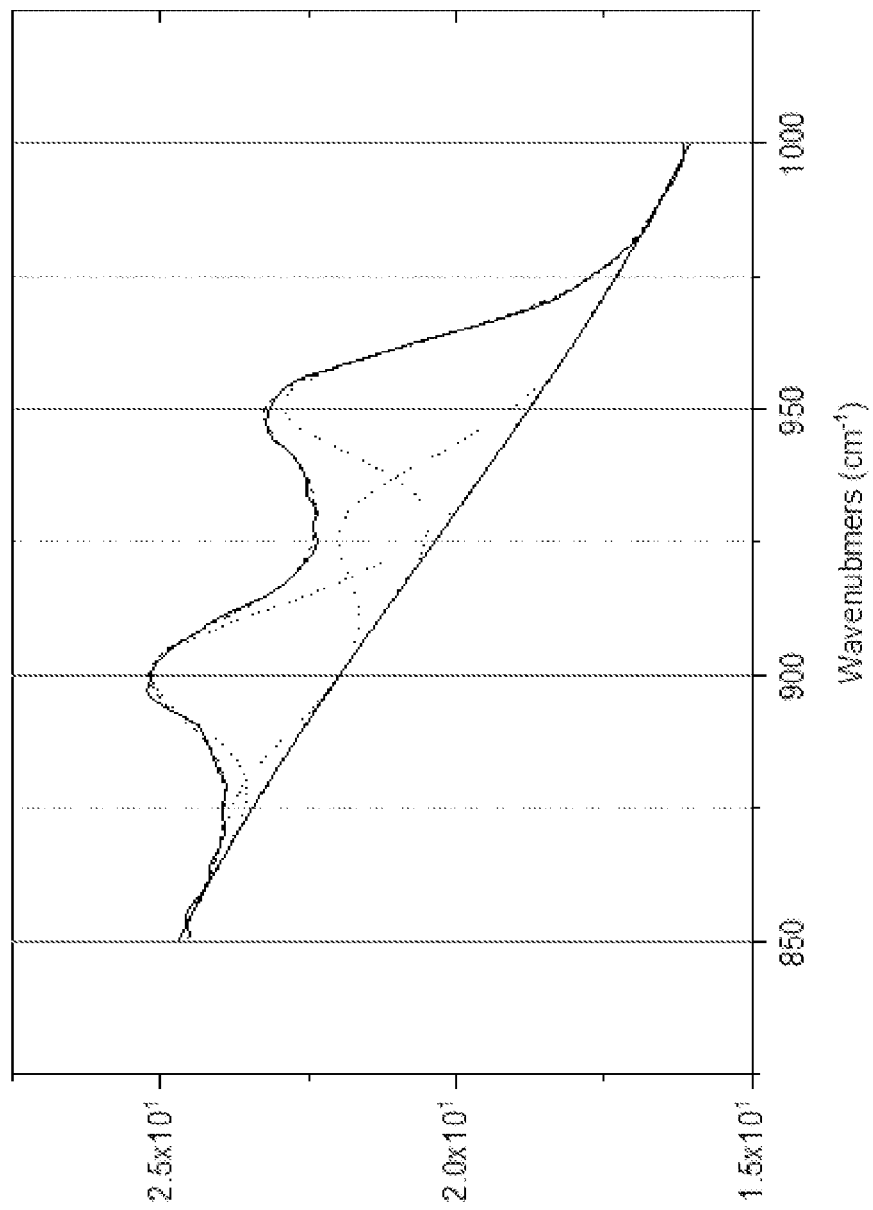
FIG. 7 shows the peak fitting analysis (deconvolution figure) with the peak areas under the first absorption peak and under the second absorption peak of Example 8.
Figure 8:
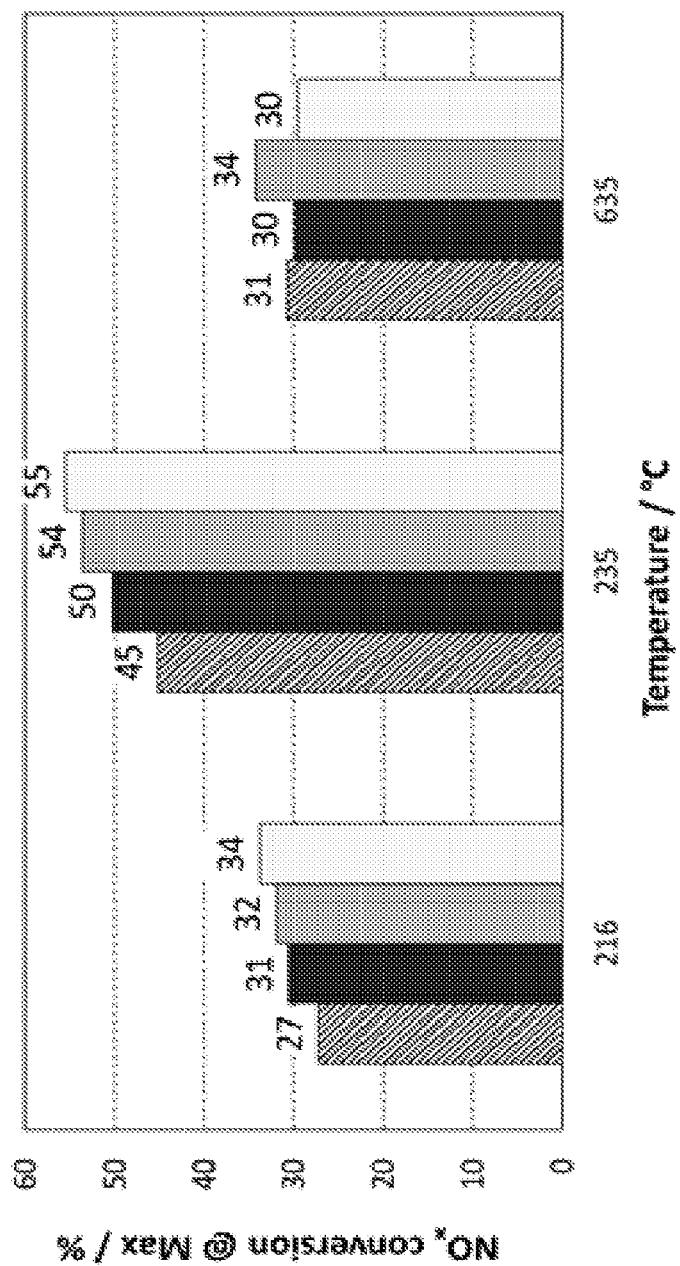
FIG. 8 shows the NO, conversion at maximum of the aged (hydrothermal ageing at 800° C.) catalysts of Comparative Example 6 and Examples 13.1-13.3 at different temperatures, namely at 213, 235, and 635° C.
Figure 9:
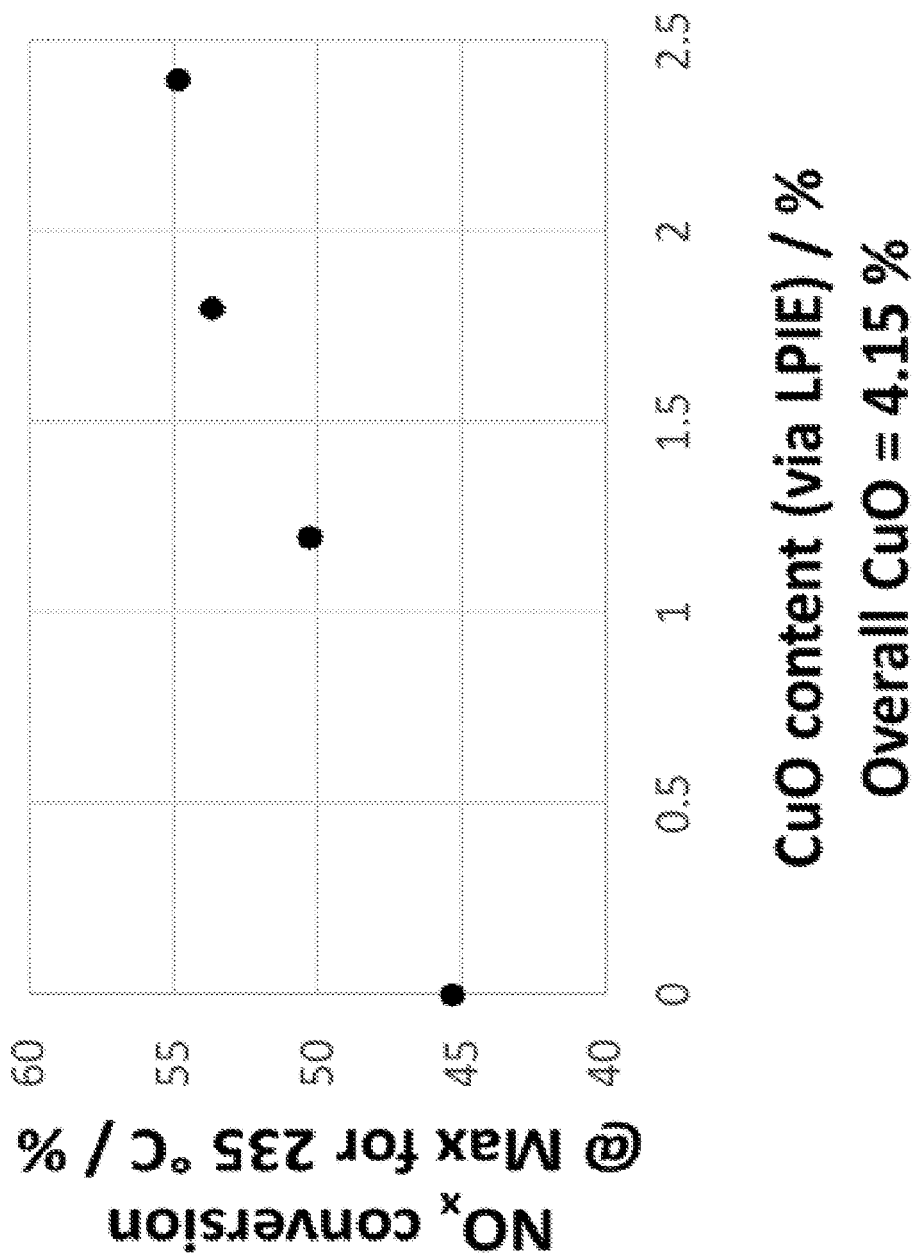
FIG. 9 shows the NO, conversion at 235° C. of the aged (hydrothermal ageing at 800° C.) catalysts of Comparative Example 6 and Examples 13.1-13.3 at different CuO content (added via liquid phase ion-exchanged process process), namely at 0% (Comp. Ex. 6), 1.13%, 1.75% and 2.38% CuO whereas the overall CuO loading was constant (4.15%).
Figure 10:
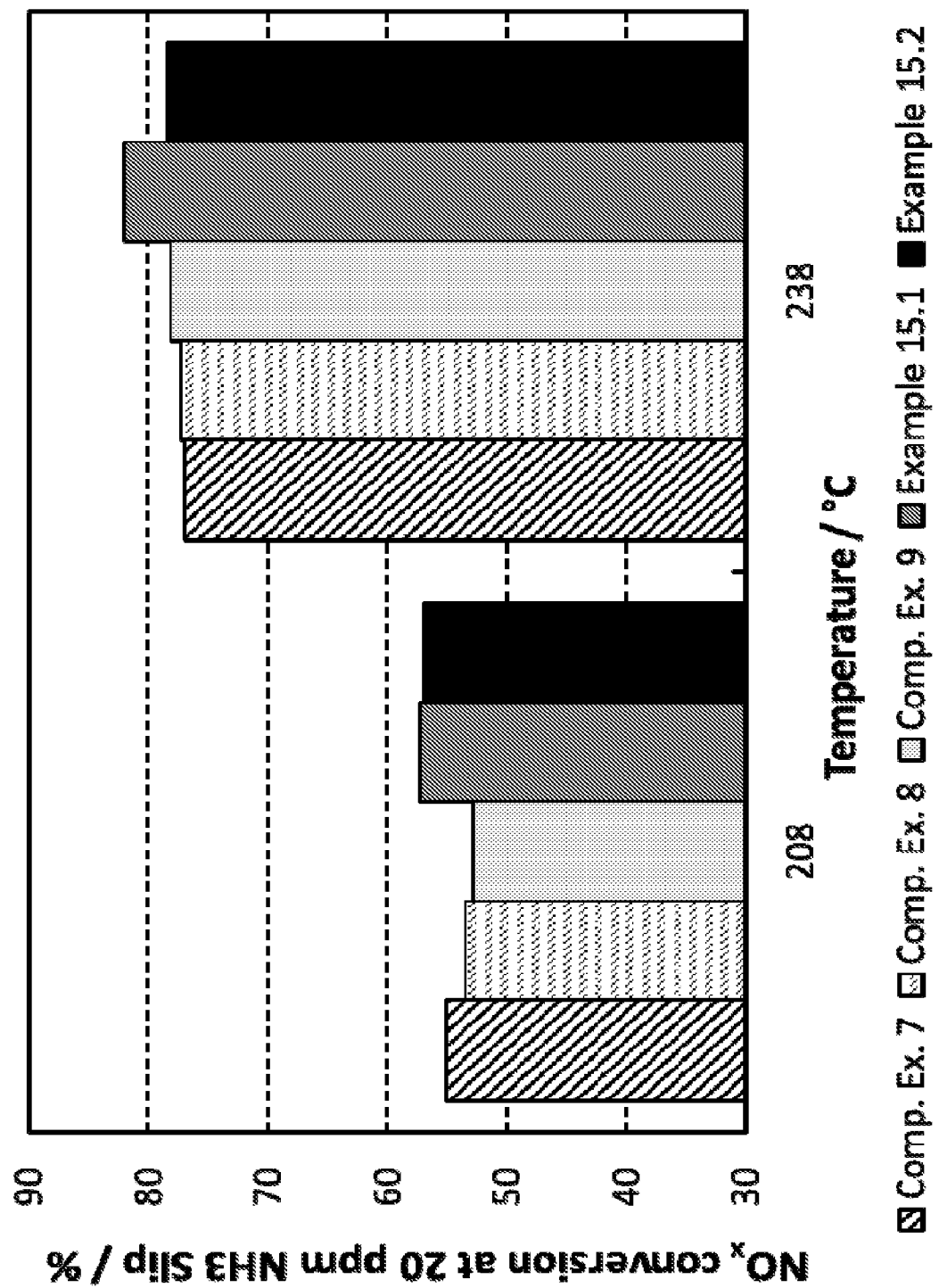
FIG. 10 shows the NO, conversion at maximum of the aged (hydrothermal ageing at 800° C.) catalysts of Example 2 at different temperatures, namely at 208 and 238° C.

WO 2018/101718 A1
U.S. Pat. No. 8,293,199 B2

The invention claimed is:

1. A process for preparing a catalyst comprising:
   (i) preparing an aqueous mixture comprising water, a zeolite material comprising copper, a source of copper other than the zeolite material comprising copper, and a non-zeolite oxide material chosen from alumina, silica, titania, zirconia, ceria, a mixed oxide comprising one or more of Al, Si, Ti, Zr, and Ce and a mixture of two or more thereof;
   (ii) disposing the mixture obtained in (i) on an internal wall surface of a substrate, wherein the substrate comprising an inlet end, an outlet end, a substrate axial length extending from the inlet end to the outlet end, and a plurality of passages defined by internal walls of the substrate extending therethrough; and optionally, drying the substrate comprising the mixture disposed thereon; and
   (iii) calcining the substrate obtained in (ii).

2. The process of claim 1, wherein the zeolite material comprising copper contained in the aqueous mixture prepared in (i) has a framework type chosen from CHA, AEI, RTH, LEV, DDR, KFI, ERI, AFX, and a mixture of two or more thereof, wherein from 95 to 100 weight % of the framework structure of the zeolite material consists of Si, Al, and O, wherein the molar ratio of Si to Al in the framework structure, calculated as molar $SiO_2:Al_2O_3$, is ranges from 2:1 to 50:1.

3. The process of claim 1, wherein the amount of copper, calculated as CuO, comprised in the zeolite material contained in the aqueous mixture prepared in (i) ranges from 0.1 to 3 weight % based on the weight of the zeolite material comprised in the aqueous mixture prepared in (i).

4. The process of claim 1, wherein the source of copper other than the zeolite material comprising copper contained in the aqueous mixture prepared in (i) is chosen from copper acetate, copper nitrate, copper sulfate, copper formate, copper oxide, and a mixture of two or more thereof.

5. The process of claim 1, wherein the non-zeolite oxide material contained in the aqueous mixture prepared in (i) is chosen from alumina, silica, titania, a mixed oxide comprising one or more of Al, Si, and Ti, and a mixture of two or more thereof.

6. The process of claim 1, wherein the aqueous mixture prepared in (i) comprises the non-zeolite oxide material at an amount ranging from 2 to 20 weight % based on the weight of the zeolite material comprised in the aqueous mixture prepared in (i).

7. The process of claim 1, wherein in the aqueous mixture prepared in (i) comprises from 10 to 90 weight % water.

8. The process of claim 1, wherein the aqueous mixture prepared in (i) further comprises a precursor of an oxide component, and wherein in the aqueous mixture prepared in (i), the amount of precursor calculated as oxide is ranges from 1 to 10 weight % based on the weight of the zeolite material comprised in the aqueous mixture prepared in (i).

9. The process of claim 1, wherein the aqueous mixture prepared in (i) further comprises one or more acids at an amount ranging from 0.1 weight-% to 2 weight-% based on the weight of the zeolite material comprised in the aqueous mixture prepared in (i).

10. The process of claim 1, wherein step (i) further comprises:
  (i.1) preparing a first mixture comprising water and the source of copper other than the zeolite material comprising copper;
  (i.2) milling the first mixture;
  (i.3) optionally adding a precursor of an oxide component as defined in claim 8 to the first mixture obtained according to (i.1);
  (i.4) preparing a second mixture comprising water and the zeolite material comprising copper;
  (i.5) admixing the second mixture obtained in (i.4) with the first mixture obtained in (i.1), obtaining a third mixture;
  (i.6) preparing a fourth mixture comprising water, a non-zeolite oxide material chosen from alumina, silica, titania, zirconia, ceria, a mixed oxide comprising one or more of Al, Si, Ti, Zr, and Ce and a mixture of two or more thereof; and
  (i.7) admixing the fourth mixture obtained in (i.6) with the third mixture-obtained in (i.5).

11. The process of claim 1, wherein the weight ratio of the copper, calculated as CuO, comprised in the zeolite material after step (iii), relative to the copper, calculated as CuO, comprised in the zeolite material in the aqueous mixture ranges from 1.5:1 to 10:1.

12. A catalyst comprising a zeolite material comprising copper, the catalyst obtained by a process according to claim 1.

13. The catalyst of claim 12, wherein the amount of copper comprised in the catalyst, calculated as CuO, ranges from 2 weight-% to 10 weight % based on the weight of the zeolite material.

14. An aqueous mixture comprising water, a zeolite material comprising copper, a source of copper other than the zeolite material comprising copper, and a non-zeolite oxide material chosen from alumina, silica, titania, zirconia, ceria, a mixed oxide comprising one or more of Al, Si, Ti, Zr, and Ce and a mixture of two or more thereof.

15. The mixture of claim 14, wherein the zeolite material comprising copper has a framework type chosen from CHA, AEI, RTH, LEV, DDR, KFI, ERI, AFX, a mixture of two or more thereof, and a mixed type of two or more thereof, and wherein the amount of copper comprised in the zeolite material, calculated as CuO, ranges from 0.1 weight-% to 3 weight % based on the weight of the zeolite material.

16. The mixture of claim 14, wherein the source of copper other than the zeolite material comprising copper is chosen from copper acetate, copper oxide, and a mixture of two or more thereof, wherein the aqueous mixture comprises the source of copper other than the zeolite material comprising copper, calculated as CuO, at an amount ranging from 1 weight-% to 10 weight % based on the weight of the zeolite material.

17. The mixture of claim 14, wherein the aqueous mixture comprises the non-zeolite oxide material at an amount ranging from 2 weight-% to 20 weight % based on the weight of the zeolite material.

18. The mixture of claim 14, wherein from 10 weight-% to 90 weight % of the aqueous mixture consists of water.

19. The mixture of claim 14, further comprising one or more acids at an amount in the range of ranging from 0.1 weight-% to 2 weight % based on the weight of the zeolite material.

20. The mixture of claim 14, wherein the mixture is prepared by a process comprising:
  preparing the aqueous mixture comprising water, a zeolite material comprising copper, a source of copper other than the zeolite material comprising copper, and a non-zeolite oxide material chosen from alumina, silica, titania, zirconia, ceria, a mixed oxide comprising one or more of Al, Si, Ti, Zr, and Ce and a mixture of two or more thereof.

* * * * *